(12) United States Patent
Nagumo et al.

(10) Patent No.: US 12,537,944 B2
(45) Date of Patent: Jan. 27, 2026

(54) IMAGE PROCESSING DEVICE AND METHOD

(71) Applicant: SONY SEMICONDUCTOR SOLUTIONS CORPORATION, Kanagawa (JP)

(72) Inventors: Takefumi Nagumo, Kanagawa (JP); Takuya Kitamura, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 18/293,375

(22) PCT Filed: Mar. 7, 2022

(86) PCT No.: PCT/JP2022/009608
§ 371 (c)(1),
(2) Date: Jan. 30, 2024

(87) PCT Pub. No.: WO2023/026526
PCT Pub. Date: Mar. 2, 2023

(65) Prior Publication Data
US 2024/0340411 A1 Oct. 10, 2024

(30) Foreign Application Priority Data
Aug. 24, 2021 (JP) ................................. 2021-136244

(51) Int. Cl.
*H04N 19/11* (2014.01)
*H04N 19/124* (2014.01)
*H04N 19/182* (2014.01)

(52) U.S. Cl.
CPC .......... *H04N 19/11* (2014.11); *H04N 19/124* (2014.11); *H04N 19/182* (2014.11)

(58) Field of Classification Search
CPC ..... H04N 19/11; H04N 19/124; H04N 19/182
See application file for complete search history.

(56) References Cited

U.S. PATENT DOCUMENTS 5,621,467 A * 4/1997 Chien .................. H04N 19/895
375/240.15
2003/0113023 A1 * 6/2003 MacDonald ............ G06T 9/004
382/233

(Continued)

FOREIGN PATENT DOCUMENTS

CN 111050181 * 12/2019
EP 2563012 * 8/2012

(Continued)

OTHER PUBLICATIONS

Chen translation of CN 111050181 Dec. 30, 2019 (Year: 2019).*

(Continued)

*Primary Examiner* — Zaihan Jiang
(74) *Attorney, Agent, or Firm* — CHIP LAW GROUP

(57) ABSTRACT

Provided is an image processing device to suppress a drop in encoding efficiency. One of spatial prediction and phase prediction is set as a prediction method for a pixel to be processed in image data generated by a pixel array in which blocks, each including a plurality of pixels adjacent to each other, are arranged in a predetermined pattern. A prediction value for the pixel to be processed is then derived by applying the prediction method set, and a prediction residual obtained by subtracting the prediction value from each of pixel values in the image data is encoded.

18 Claims, 69 Drawing Sheets

(56) References Cited

U.S. PATENT DOCUMENTS

| | | | | |
|---|---|---|---|---|
| 2008/0260270 | A1* | 10/2008 | Lainema | H04N 19/85 |
| | | | | 375/E7.193 |
| 2011/0310976 | A1* | 12/2011 | Wang | H04N 19/61 |
| | | | | 375/E7.176 |
| 2012/0250764 | A1* | 10/2012 | Martin | H04N 19/97 |
| | | | | 375/E7.243 |
| 2014/0003518 | A1* | 1/2014 | Bang | H04N 19/593 |
| | | | | 375/240.12 |
| 2015/0195573 | A1* | 7/2015 | Aflaki Beni | H04N 19/513 |
| | | | | 375/240.16 |
| 2016/0029043 | A1* | 1/2016 | Chen | H04N 19/593 |
| | | | | 375/240.12 |
| 2022/0109853 | A1* | 4/2022 | Zhang | H04N 19/107 |
| 2022/0109889 | A1* | 4/2022 | Zhang | H04N 19/46 |
| 2022/0345715 | A1* | 10/2022 | Guionnet | H04N 19/107 |
| 2023/0087855 | A1* | 3/2023 | Tang | H04N 19/172 |
| | | | | 375/240.12 |
| 2024/0089904 | A1* | 3/2024 | Balasubramanian | G01S 5/16 |

FOREIGN PATENT DOCUMENTS

| | | | |
|---|---|---|---|
| EP | 4075800 | * | 12/2020 |
| JP | 2000-299866 | A | 10/2000 |
| JP | 2007-329551 | A | 12/2007 |
| JP | 2014-116868 | A | 6/2014 |
| WO | 2020/110771 | A1 | 6/2020 |

OTHER PUBLICATIONS

International Search Report and Written Opinion of PCT Application No. PCT/JP2022/009608, issued on May 24, 2022, 09 pages of ISRWO.

"Draft MIPI Alliance Specification for Camera Serial Interface 2 (CSI-2)", MIPI, Draft Version 1.01.00, Revision 0.04, Apr. 2, 2009, 170 pages.

* cited by examiner

| | | |
|---|---|---|
| 1 | | IN IMAGE SENSOR HAVING ONE ON-CHIP LENS FOR BLOCK HAVING MULTIPLE PIXELS OF SAME COLOR, SELECT ONE OF PHASE PREDICTION AND SPATIAL PREDICTION, DERIVE A PREDICTION RESIDUAL BY APPLYING THE SELECTED PREDICTION METHOD, AND ENCODE DERIVED PREDICTION RESIDUAL |
| 1-1 | | SELECT PREDICTION METHOD BASED ON COST OF EACH PREDICTION METHOD |
| SELECTION METHOD | | |
| | 1-1-1 | SELECT PREDICTION METHOD HAVING LOWER COST |
| | 1-1-1-1 | IF COST OF EACH PREDICTION METHOD IS SUFFICIENTLY LOW, SELECT PREDETERMINED PREDICTION METHOD |
| | 1-1-1-2 | IF COST OF EACH PREDICTION METHOD IS SUFFICIENTLY HIGH, SELECT PCM MODE |
| COST CALCULATION METHOD | | |
| | 1-1-2 | CALCULATE COST FROM PREDICTED VALUE |
| | 1-1-2-1 | ABSOLUTE VALUE OF DIFFERENCE OR SUM OF DIFFERENCES SQUARED BETWEEN PREDICTION VALUE AND ORIGINAL IMAGE |
| | 1-1-2-2 | ABSOLUTE VALUE OF DIFFERENCE OR SUM OF DIFFERENCES SQUARED BETWEEN QUANTIZED PREDICTION VALUE AND ORIGINAL IMAGE |
| | 1-1-2-3 | GENERATED BIT AMOUNT CORRESPONDING TO DIFFERENCE BETWEEN QUANTIZED PREDICTION VALUE AND ORIGINAL IMAGE |
| | 1-1-2-4 | RD COST CORRESPONDING TO DIFFERENCE BETWEEN QUANTIZED PREDICTION VALUE AND ORIGINAL IMAGE |
| | 1-1-3 | CALCULATE COST FROM PERIPHERAL PIXEL VALUE |
| | 1-1-3-1 | DERIVE COST OF SPATIAL PREDICTION BASED ON CORRELATION BETWEEN PIXELS IN PERIPHERAL BLOCK, DERIVE COST OF PHASE PREDICTION BASED ON THE CORRELATION BETWEEN PIXELS IN THE SAME PHASE IN MULTIPLE PERIPHERAL BLOCKS |
| UNIT OF SELECTION | | |
| 1-2 | | SELECT PREDICTION METHOD USING ANY UNIT OF DATA |
| | 1-2-1 | SELECT PREDICTION METHOD EVERY PREDETERMINED REGION IN FRAME |
| | 1-2-2 | SELECT PREDICTION METHOD EVERY FRAME |
| | 1-2-3 | VARIABLE UNIT OF SELECTION |
| APPLIED PREDICTION INFORMATION | | |
| | 1-3 | TRANSMIT APPLIED PREDICTION INFORMATION |
| | 1-3-1 | REFERENCE DIRECTION FLAG |
| | 1-3-2 | PREDICTION METHOD FLAG |

Fig. 6

| 2 | DECODE BITSTREAM TO GENERATE PREDICTION RESIDUAL GENERATED IN IMAGE SENSOR HAVING ONE ON-CHIP LENS FOR BLOCK OF MULTIPLE PIXELS OF SAME COLOR, DERIVE PREDICTION VALUE BY PHASE PREDICTION OR SPATIAL PREDICTION, AND ADD PREDICTION VALUE TO PREDICTION RESIDUAL TO GENERATE RECONFIGURED IMAGE |
|---|---|
| APPLIED PREDICTION INFORMATION | |
| 2-1 | DERIVE PREDICTION VALUE BASED ON APPLIED PREDICTION INFORMATION |
| 2-1-1 | REFERENCE DIRECTION FLAG |
| 2-1-2 | PREDICTION SELECTION FLAG |
| PCM MODE | |
| 2-2 | PCM MODE ENABLED |
| UNIT OF PREDICTION METHOD SELECTION | |
| 2-3 | SELECT PREDICTION METHOD USING ANY UNIT OF DATA |
| 2-3-1 | SELECT PREDICTION METHOD EVERY PREDETERMINED REGION IN FRAME |
| 2-3-2 | SELECT PREDICTION METHOD EVERY FRAME |
| 2-3-3 | VARIABLE UNIT OF SELECTION |

Fig. 39

| | SYNTAX ELEMENTS | BIT LENGTH | MEANING |
|---|---|---|---|
| | //APPLIED PREDICTION INFORMATION SIGNALING | | |
| 1 | PREDICTION METHOD FLAG | 1 | 0: SPATIAL; 1: PHASE |
| 2 | REFERENCE DIRECTION FLAG | 2 | 00: UPPER-LEFT; 01: LEFT; 10: UP; 11: UPPER-RIGHT |
| 3 | QUANTIZATION VALUE | 5 | QUANTIZATION VALUE |
| | //PREDICTION RESIDUAL SIGNALING | | |
| 4 | for(int loop=0; loop< block_size; loop++){ | | |
| 5 | ENCODED DATA | VLC | |
| 6 | } | | |

IMAGE PROCESSING DEVICE AND METHOD

CROSS REFERENCE TO RELATED APPLICATIONS

This application is a U.S. National Phase of International Patent Application No. PCT/JP2022/009608 filed on Mar. 7, 2022, which claims priority benefit of Japanese Patent Application No. JP 2021-136244 filed in the Japan Patent Office on Aug. 24, 2021. Each of the above-referenced applications is hereby incorporated herein by reference in its entirety.

TECHNICAL FIELD

The present disclosure relates to an image processing device and method, and particularly relates to an image processing device and method capable of suppressing a drop in encoding efficiency.

BACKGROUND ART

Conventionally, there have been image sensors having a pixel structure called a "quad" configuration, which is a configuration such as a Bayer format with 2×2 pixels as a single block. As methods for arranging on-chip lenses ("OCL" hereinafter) for this quad configuration, there have been 1×1 OCL, in which a single microlens is provided for a single pixel, and 2×2 OCL, in which microlenses are provided for 2×2 pixels.

In recent years, various methods have been proposed for encoding RAW images generated by an image sensor. For example, comp6, which performs prediction by referring to peripheral pixels and encodes prediction residuals, has been proposed as a method for encoding Bayer-format RAW images (see NPL 1, for example).

However, comp6 is not compatible with the quad configuration described above, and there is a risk that the encoding efficiency will drop.

Meanwhile, a Multi-Pixel Compressor (MPC) has been proposed as an encoding method compatible with RAW images in a quad configuration. This MPC employs a prediction value generation method that takes into account the pixel arrangement in a 2×2-pixel quad configuration. Accordingly, applying the MPC to the encoding of RAW images in a quad configuration makes it possible to suppress a drop in the encoding efficiency.

CITATION LIST

Non Patent Literature

[NPL 1]
MIPI, "DRAFT MIPI Alliance Specification for Camera Serial Interface 2 (CSI-2)", Draft Version 1.01.00 Revision 0.04? 2 Apr. 2009, http://caxapa.ru/thumbs/799244/MIPI_Alliance_Specification_for_Camera_S.pdf

SUMMARY

Technical Problem

However, this MPC is intended for 1×1 OCL and has not been considered for 2×2 OCL. Generally, in the case of 2×2 OCL, the pixel values of four pixels below the on-chip lens have a deviation based on the direction of light rays entering the main lens of a camera. As such, applying the MPC to the encoding of 2×2 OCL RAW images carries a risk of reducing the encoding efficiency.

Having been conceived in light of such a situation, the present disclosure makes it possible to suppress a drop in encoding efficiency.

Solution to Problem

An image processing device according to one aspect of the present technique is an image processing device including: a prediction method setting unit that sets one of spatial prediction and phase prediction as a prediction method for a pixel to be processed in image data generated by a pixel array in which blocks, each including a plurality of pixels adjacent to each other, are arranged in a predetermined pattern; a prediction unit that derives a prediction value for the pixel to be processed by applying the prediction method set by the prediction method setting unit; and an encoding unit that encodes a prediction residual obtained by subtracting the prediction value derived by the prediction unit from each of pixel values in the image data. Each of the plurality of pixels in the block has a filter having identical transmission wavelength characteristics, and is configured to photoelectrically convert incident light incident through a single on-chip lens corresponding to the plurality of pixels and the filter. The spatial prediction is a prediction method that performs prediction by referring to a pixel value of a pixel which is in a block located in a periphery of the pixel to be processed and which is near the pixel to be processed. The phase prediction is a prediction method that performs prediction by referring to a pixel value of a pixel which is in a block located in a periphery of the pixel to be processed and which has a same location in the block as the pixel to be processed.

An image processing method according to one aspect of the present technique is an image processing method including: setting one of spatial prediction and phase prediction as a prediction method for a pixel to be processed in image data generated by a pixel array in which blocks, each including a plurality of pixels adjacent to each other, are arranged in a predetermined pattern; deriving a prediction value for the pixel to be processed by applying the prediction method set; and encoding a prediction residual obtained by subtracting the prediction value from each of pixel values in the image data. Each of the plurality of pixels in the block has a filter having identical transmission wavelength characteristics, and is configured to photoelectrically convert incident light incident through a single on-chip lens corresponding to the plurality of pixels and the filter. The spatial prediction is a prediction method that performs prediction by referring to a pixel value of a pixel which is in a block located in a periphery of the pixel to be processed and which is near the pixel to be processed. The phase prediction is a prediction method that performs prediction by referring to a pixel value of a pixel which is in a block located in a periphery of the pixel to be processed and which has a same location in the block as the pixel to be processed.

An image processing device according to another aspect of the present technique is an image processing device including: a decoding unit that, by decoding a bitstream, generates a prediction residual obtained by subtracting a prediction value from each of pixel values in image data generated by a pixel array in which blocks, each including a plurality of pixels adjacent to each other, are arranged in a predetermined pattern; a prediction unit that derives the prediction value of a pixel to be processed in the image data by applying one of spatial prediction and phase prediction; and an image data generation unit that generates the image data by adding the prediction value derived by the prediction unit to the prediction residual generated by the decoding unit. Each of the plurality of pixels in the block has a filter having identical transmission wavelength characteristics, and is configured to photoelectrically convert incident light incident through a single on-chip lens corresponding to the plurality of pixels and the filter. The spatial prediction is a prediction method that performs prediction by referring to a pixel value of a pixel which is in a block located in a periphery of the pixel to be processed and which is near the pixel to be processed. The phase prediction is a prediction method that performs prediction by referring to a pixel value of a pixel which is in a block located in a periphery of the pixel to be processed and which has a same location in the block as the pixel to be processed.

An image processing method according to another aspect of the present technique is an image processing method including: generating, by decoding a bitstream, a prediction residual obtained by subtracting a prediction value from each of pixel values in image data generated by a pixel array in which blocks, each including a plurality of pixels adjacent to each other, are arranged in a predetermined pattern; deriving the prediction value of a pixel to be processed in the image data by applying one of spatial prediction and phase prediction; and generating the image data by adding the prediction value derived to the prediction residual generated. Each of the plurality of pixels in the block has a filter having identical transmission wavelength characteristics, and is configured to photoelectrically convert incident light incident through a single on-chip lens corresponding to the plurality of pixels and the filter. The spatial prediction is a prediction method that performs prediction by referring to a pixel value of a pixel which is in a block located in a periphery of the pixel to be processed and which is near the pixel to be processed. The phase prediction is a prediction method that performs prediction by referring to a pixel value of a pixel which is in a block located in a periphery of the pixel to be processed and which has a same location in the block as the pixel to be processed.

In the image processing device and method according to one aspect of the present technique, one of spatial prediction and phase prediction is set as a prediction method for a pixel to be processed in image data generated by a pixel array in which blocks, each including a plurality of pixels adjacent to each other, are arranged in a predetermined pattern; a prediction value is derived for the pixel to be processed by applying the prediction method set; and a prediction residual obtained by subtracting the prediction value from each of pixel values in the image data is encoded. Each of the plurality of pixels in the block is provided with a filter having identical transmission wavelength characteristics, and is configured to photoelectrically convert incident light incident through a single on-chip lens corresponding to the plurality of pixels and the filter. The spatial prediction is a prediction method that performs prediction by referring to a pixel value of a pixel which is in a block located in a periphery of the pixel to be processed and which is near the pixel to be processed. The phase prediction is a prediction method that performs prediction by referring to a pixel value of a pixel which is in a block located in a periphery of the pixel to be processed and which has a same location in the block as the pixel to be processed.

In the image processing device and method according to another aspect of the present technique, by decoding a bitstream, a prediction residual obtained by subtracting a prediction value from each of pixel values in image data generated by a pixel array in which blocks, each including a plurality of pixels adjacent to each other, are arranged in a predetermined pattern, is generated; the prediction value of a pixel to be processed in the image data is derived by applying one of spatial prediction and phase prediction; and the image data is generated by adding the prediction value derived to the prediction residual generated. Each of the plurality of pixels in the block is provided with a filter having identical transmission wavelength characteristics, and is configured to photoelectrically convert incident light incident through a single on-chip lens corresponding to the plurality of pixels and the filter. The spatial prediction is a prediction method that performs prediction by referring to a pixel value of a pixel which is in a block located in a periphery of the pixel to be processed and which is near the pixel to be processed. The phase prediction is a prediction method that performs prediction by referring to a pixel value of a pixel which is in a block located in a periphery of the pixel to be processed and which has a same location in the block as the pixel to be processed.

BRIEF DESCRIPTION OF DRAWINGS

FIG. 4 is a diagram illustrating an example of a pixel value distribution trend.

FIG. 5 is a diagram illustrating an example of an image encoding method.

FIG. 6 is a diagram illustrating an example of an image decoding method.

FIG. 39 is a diagram illustrating an example of syntax.

DESCRIPTION OF EMBODIMENTS

Modes for carrying out the present disclosure (called "embodiments") will be described hereinafter. The descriptions will be given in the following order.

1. RAW Image Encoding
2. First Embodiment (Image Encoding Device)
3. Second Embodiment (Image Decoding Device)
4. Third Embodiment (Application of PCM Mode)
5. Application Examples of Present Technique
6. Supplement 1. RAW Image Encoding <Encoding of RAW Image in Quad Configuration>

Figure 1:
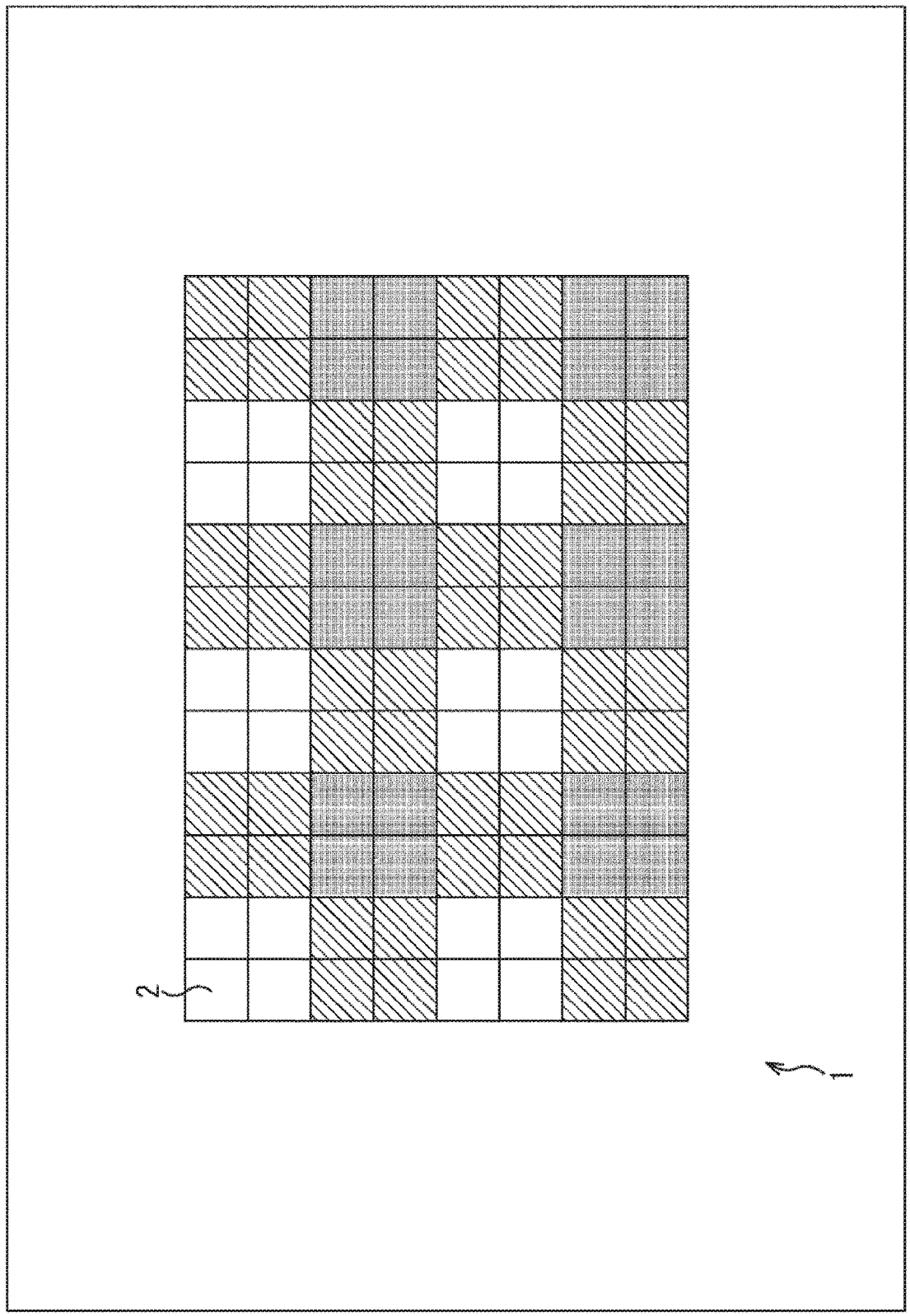
FIG. 1 is a diagram illustrating a quad configuration.

An image sensor having a pixel structure called a "quad" configuration has been developed thus far. This quad-configuration image sensor includes a pixel array having a pixel configuration such as a Bayer format with 2×2 constituting a single cell. FIG. 1 is a diagram illustrating an example of a quad-configuration pixel array. In FIG. 1, each square in a pixel array 1 represents a pixel. In other words, the pixel array 1 is constituted by a plurality of pixels 2 disposed in an array.

Note that in FIG. 1, the sign (2) is indicated only in the square (pixel) at the upper-left corner. Also, in the pixel array 1 in FIG. 1, a pixel 2 indicated by a white square, for example, represents a pixel in which a filter that transmits a red wavelength band is formed and which photoelectrically converts incident light in the red wavelength band incident through the filter (also called a "red pixel"). A pixel 2 indicated by a hatched square, for example, represents a pixel in which a filter that transmits a green wavelength band is formed and which photoelectrically converts incident light in the green wavelength band incident through the filter (also called a "green pixel"). Furthermore, a pixel 2 indicated by a gray square, for example, represents a pixel in which a filter that transmits a blue wavelength band is formed and which photoelectrically converts incident light in the blue wavelength band incident through the filter (also called a "blue pixel").

In other words, the pixel array 1 has 2×2 pixels of the same color as each other disposed in a Bayer array. In the present specification, these 2×2 pixels 2 of the same color as each other (or, in a RAW image, 2×2 pixel data corresponding to these pixels 2) will also be referred to as a "block".

Figure 2B:
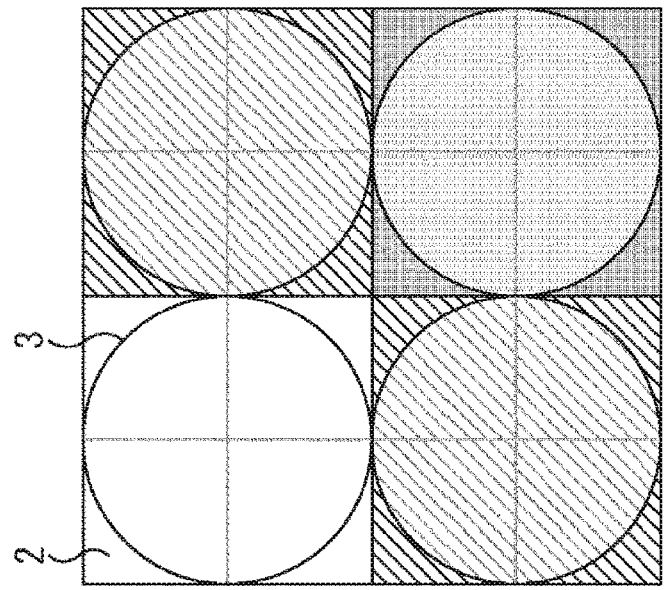
FIGS. 2A and 2B are diagrams illustrating an example of a microlens arrangement pattern.
Figure 2A:
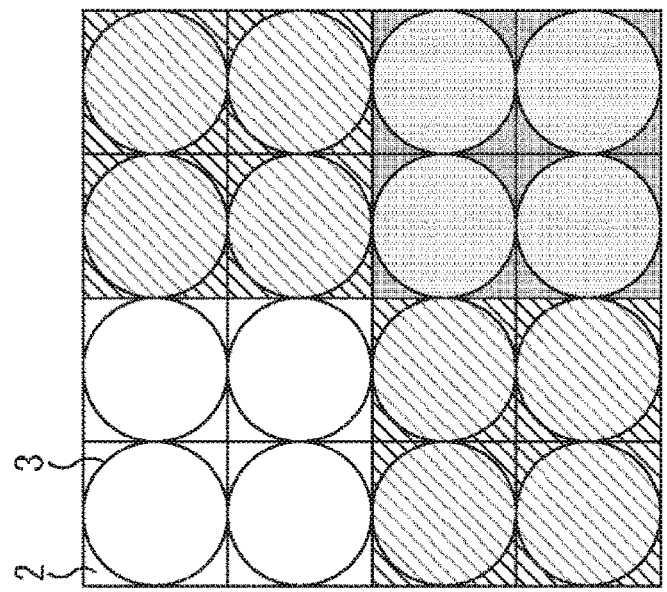

As methods for arranging on-chip lenses ("OCL" hereinafter) in such a quad-configuration image sensor, there have been 1×1 OCL, in which a single microlens is provided for a single pixel, and 2×2 OCL, in which microlenses are provided for 2×2 pixels. FIG. 2A illustrates an example of 1×1 OCL. As illustrated in FIG. 2A, in 1×1 OCL, one microlens 3 is provided for each pixel 2. FIG. 2B illustrates an example of 2×2 OCL. As illustrated in FIG. 2B, in 2×2 OCL, one microlens 3 is provided for each block (2×2 pixels).

Figure 3:
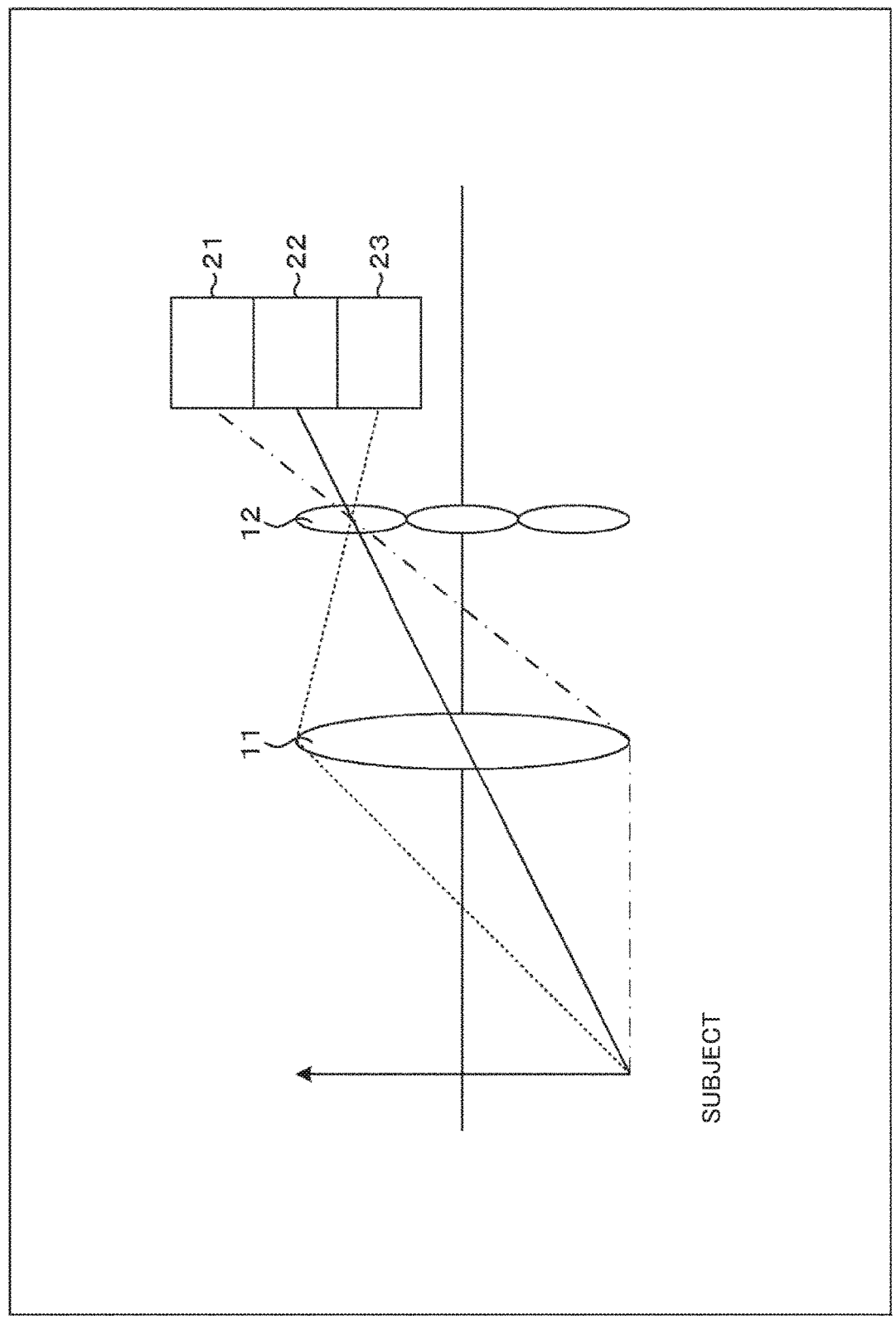
FIG. 3 is a diagram illustrating the occurrence of pixel value deviation.

2×2 OCL has a property in which the pixel values of the four pixels 2 corresponding to the one microlens 3 change (deviation arises in the pixel values) depending on the direction of light rays entering the main lens of the camera. For example, in the example illustrated in FIG. 3, when three pixels (a pixel 21, a pixel 22, and a pixel 23) are provided for a single microlens 12, each pixel photoelectrically converts incident light incident through a main lens 11 and the microlens 12. In this case, the incident light incident on each pixel may be incident through a different path, as illustrated in FIG. 3, and deviation among the pixel values of the pixels may arise in such a case.

Figure 4:
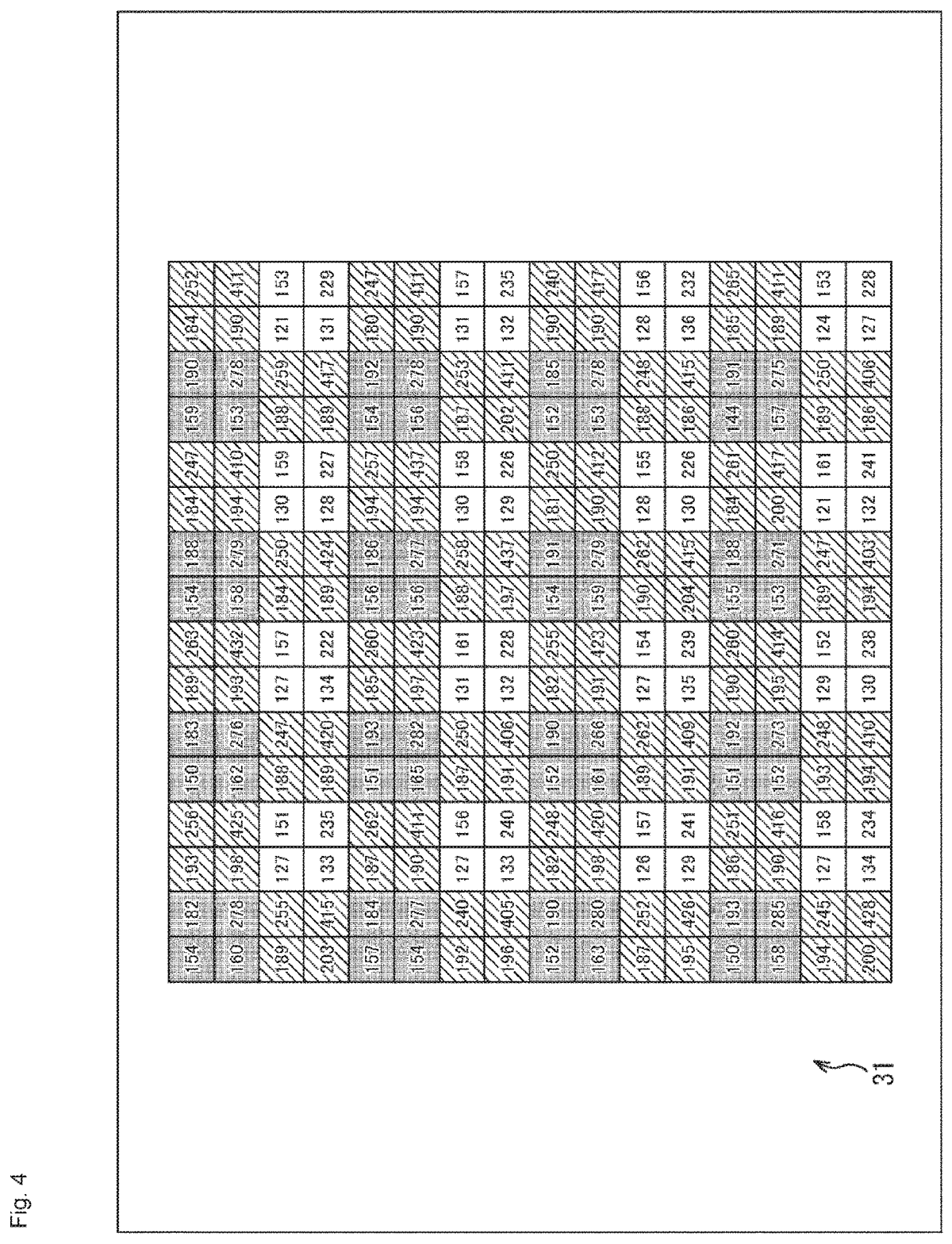

Such deviation among the pixel values is likely to occur, for example, in images that are not in focus (known as "out-of-focus images"), images in which flare or ghosting is present, and the like. FIG. 4 illustrates an example of the distribution of pixel values generated in such a quad-configuration image sensor. A RAW image 31 illustrated in FIG. 4 is an example of a RAW image generated in a 2×2 OCL image sensor when flare occurs. Each square in the RAW image 31 represents pixel data, and the numerical value in each square represents a pixel value. In the example illustrated in FIG. 4, the deviation among the pixel values in the block (2×2 pixels corresponding to the same microlens) is large. The distribution trend of the pixel values within the block is approximated with the neighboring blocks. In some cases, such deviation is utilized to use the pixel data as phase detection data for image plane phase detection AF (autofocus), for example.

Incidentally, using RAW images, such as outputting RAW images from camera devices and the like directly, has become popular in recent years. Encoding RAW images has therefore been proposed as a way to reduce the transmission data bandwidth and reduce transmission costs. For example, comp6, which encodes Bayer-format RAW images, has been proposed, as described in NPL 1. In comp6, prediction is performed by referring to peripheral pixels, and prediction residuals are encoded. However, comp6 is not compatible with the quad configuration described above, and there is a risk that the encoding efficiency will drop.

Meanwhile, a Multi-Pixel Compressor (MPC) has been proposed as an encoding method compatible with RAW images in a quad configuration. This MPC employs a prediction value generation method that takes into account the pixel arrangement in a 2×2-pixel quad configuration. Accordingly, applying the MPC to the encoding of RAW images in a quad configuration makes it possible to suppress a drop in the encoding efficiency.

However, the MPC is intended for 1×1 OCL and has not been considered for the specific data distribution trends of 2×2 OCL as described above. As such, applying the MPC to the encoding of 2×2 OCL RAW images carries a risk of reducing the encoding efficiency at locations where the deviation described above occurs.

<Encoding Images Taking 2×2 OCL into Account>

Accordingly, for a RAW image generated by an image sensor having a single on-chip lens for a block constituted by a plurality of pixels of the same color, such as 2×2 OCL, one of phase prediction and spatial prediction is selected, a prediction residual is derived by applying the selected prediction method, and the derived prediction residual is then encoded, as indicated in the uppermost row of the table in FIG. 5 (Method 1).

For example, an image processing device includes: a prediction method setting unit that sets one of spatial prediction and phase prediction as a prediction method for a pixel to be processed in image data generated by a pixel array in which blocks, each including a plurality of pixels adjacent to each other, are arranged in a predetermined pattern; a prediction unit that derives a prediction value for the pixel to be processed by applying the prediction method set by the prediction method setting unit; and an encoding unit that encodes a prediction residual obtained by subtracting the prediction value derived by the prediction unit from each of pixel values in the image data. Each of the plurality of pixels in the block has a filter having identical transmission wavelength characteristics, and is configured to photoelectrically convert incident light incident through a single on-chip lens corresponding to the plurality of pixels and the filter. The spatial prediction is a prediction method that performs prediction by referring to a pixel value of a pixel which is in a block located in a periphery of the pixel to be processed and which is near the pixel to be processed. The phase prediction is a prediction method that performs prediction by referring to a pixel value of a pixel which is in a block located in a periphery of the pixel to be processed and which has a same location in the block as the pixel to be processed.

For example, an image processing method includes: setting one of spatial prediction and phase prediction as a prediction method for a pixel to be processed in image data generated by a pixel array in which blocks, each including a plurality of pixels adjacent to each other, are arranged in a predetermined pattern; deriving a prediction value for the pixel to be processed by applying the prediction method set; and encoding a prediction residual obtained by subtracting the prediction value from each of pixel values in the image data. Each of the plurality of pixels in the block has a filter having identical transmission wavelength characteristics, and is configured to photoelectrically convert incident light incident through a single on-chip lens corresponding to the plurality of pixels and the filter. The spatial prediction is a prediction method that performs prediction by referring to a pixel value of a pixel which is in a block located in a periphery of the pixel to be processed and which is near the pixel to be processed. The phase prediction is a prediction method that performs prediction by referring to a pixel value of a pixel which is in a block located in a periphery of the pixel to be processed and which has a same location in the block as the pixel to be processed.

Doing so makes it possible to perform the prediction taking into account the pixel value distribution characteristics unique to 2×2 OCL (the occurrence of deviation). In other words, phase prediction, which has a higher prediction accuracy for parts where deviation occurs as described with reference to FIGS. 3 and 4, can be applied to those parts, whereas spatial prediction, which has a higher prediction accuracy for parts where deviation does not occur, can be applied to those parts. In other words, the prediction method having the higher prediction accuracy can be applied to both parts where deviation occurs and parts where no deviation occurs. This makes it possible to suppress a drop in the prediction accuracy, and therefore suppress a drop in the encoding efficiency.

<Decoding Images Taking 2×2 OCL into Account>

In addition, a bitstream is decoded, a prediction residual is generated for a RAW image generated by an image sensor having a single on-chip lens for a block constituted by a plurality of pixels of the same color, a prediction value is derived through phase prediction or spatial prediction, and a reconfigured image (a decoded image) is generated by adding the prediction value derived to the prediction residual, as indicated in the uppermost row of the table in FIG. 6 (Method 2).

For example, an image processing device includes: a decoding unit that, by decoding a bitstream, generates a prediction residual obtained by subtracting a prediction value from each of pixel values in image data generated by a pixel array in which blocks, each including a plurality of pixels adjacent to each other, are arranged in a predetermined pattern; a prediction unit that derives the prediction value of a pixel to be processed in the image data by applying one of spatial prediction and phase prediction; and an image data generation unit that generates the image data by adding the prediction value derived by the prediction unit to the prediction residual generated by the decoding unit. Each of the plurality of pixels in the block has a filter having identical transmission wavelength characteristics, and is configured to photoelectrically convert incident light incident through a single on-chip lens corresponding to the plurality of pixels and the filter. The spatial prediction is a prediction method that performs prediction by referring to a pixel value of a pixel which is in a block located in a periphery of the pixel to be processed and which is near the pixel to be processed. The phase prediction is a prediction method that performs prediction by referring to a pixel value of a pixel which is in a block located in a periphery of the pixel to be processed and which has a same location in the block as the pixel to be processed.

For example, an image processing method includes: generating, by decoding a bitstream, a prediction residual obtained by subtracting a prediction value from each of pixel values in image data generated by a pixel array in which blocks, each including a plurality of pixels adjacent to each other, are arranged in a predetermined pattern; deriving the prediction value of a pixel to be processed in the image data by applying one of spatial prediction and phase prediction; and generating the image data by adding the prediction value derived to the prediction residual generated. Each of the plurality of pixels in the block has a filter having identical transmission wavelength characteristics, and is configured to photoelectrically convert incident light incident through a single on-chip lens corresponding to the plurality of pixels and the filter. The spatial prediction is a prediction method that performs prediction by referring to a pixel value of a pixel which is in a block located in a periphery of the pixel to be processed and which is near the pixel to be processed. The phase prediction is a prediction method that performs prediction by referring to a pixel value of a pixel which is in a block located in a periphery of the pixel to be processed and which has a same location in the block as the pixel to be processed.

Doing so makes it possible to perform the prediction taking into account the pixel value distribution characteristics unique to 2×2 OCL (the occurrence of deviation). In other words, phase prediction, which has a higher prediction accuracy for parts where deviation occurs as described with reference to FIGS. 3 and 4, can be applied to those parts, whereas spatial prediction, which has a higher prediction accuracy for parts where deviation does not occur, can be applied to those parts. In other words, the prediction method having the higher prediction accuracy can be applied to both parts where deviation occurs and parts where no deviation occurs. This makes it possible to suppress a drop in the prediction accuracy, and therefore suppress a drop in the encoding efficiency.

2. First Embodiment

<Image Encoding Device>

Figure 7:
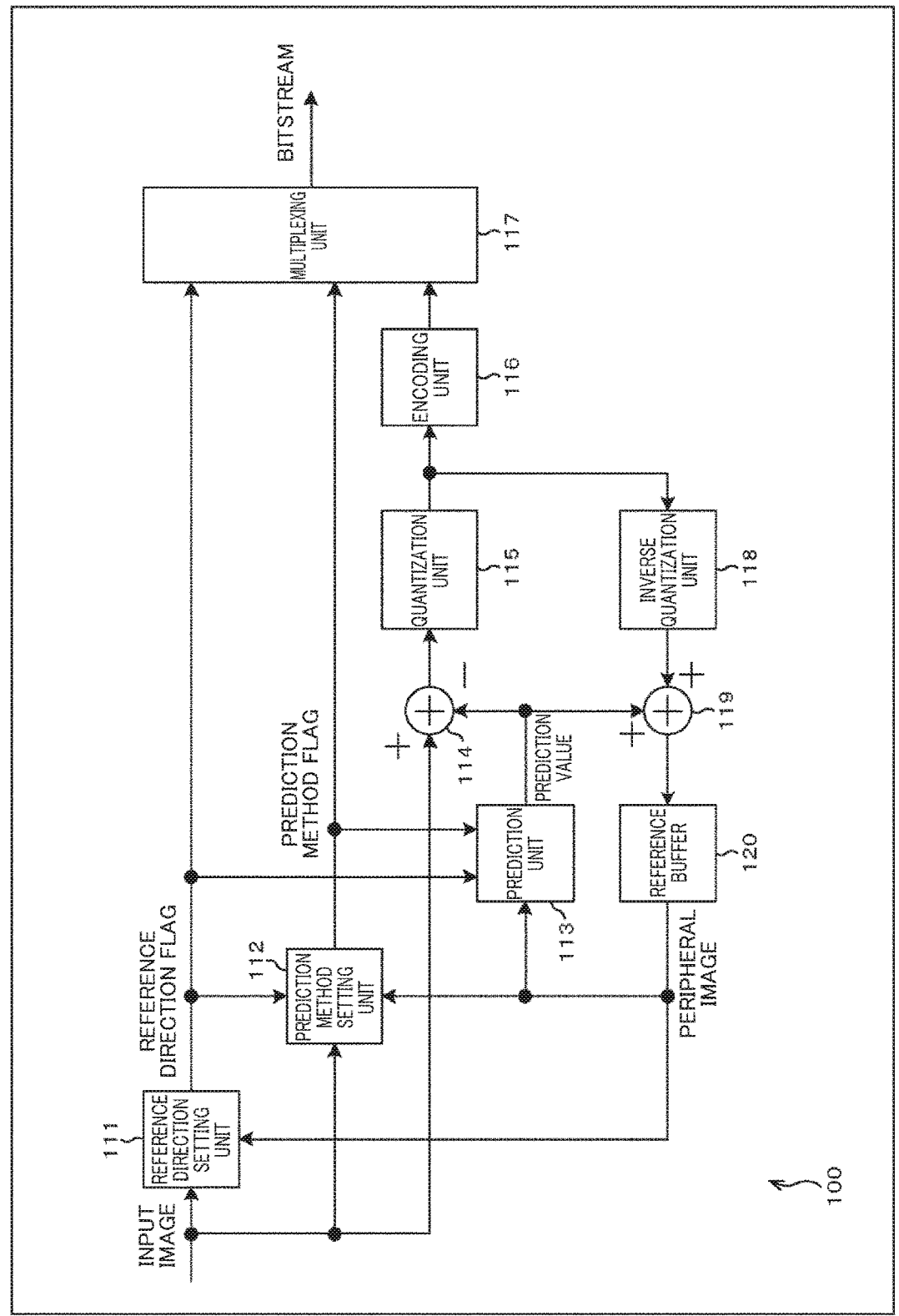
FIG. 7 is a block diagram illustrating an example of the main configuration of an image encoding device.

FIG. 7 is a block diagram illustrating an example of the configuration of an image encoding device serving as one aspect of an image processing device to which the present technique is applied. An image encoding device 100 illustrated in FIG. 7 is a device that encodes a RAW image generated by a 2×2 OCL image sensor in a quad configuration.

Although FIG. 7 illustrates the main components such as processing units (blocks) and data flows, the components are not limited to those illustrated in FIG. 7. In other words, processing units not illustrated in FIG. 7 as blocks and processing and data flows not illustrated in FIG. 7 as arrows or the like may be present in the image encoding device 100.

As illustrated in FIG. 7, the image encoding device 100 includes a reference direction setting unit 111, a prediction method setting unit 112, a prediction unit 113, a computation unit 114, a quantization unit 115, an encoding unit 116, a multiplexing unit 117, an inverse quantization unit 118, a computation unit 119, and a reference buffer 120.

A RAW image generated by an image sensor is input to the image encoding device 100. In the present specification, this RAW image will also be referred to as an "input image". In the following, the image sensor that generates the RAW image is assumed to have a quad-configuration pixel array such as the pixel array 1 illustrated in FIG. 1, and is assumed to have a 2×2 OCL-configuration on-chip lens, as illustrated in FIG. 2B. In other words, in the pixel array, blocks including a plurality of pixels adjacent to each other are arranged in a Bayer pattern. Each of the plurality of pixels in the block has a filter having identical transmission wavelength characteristics. A single microlens is also provided for each block. In other words, the plurality of pixels in the block are configured to photoelectrically convert incident light incident through a single on-chip lens corresponding to that plurality of pixels and the filters.

Accordingly, the input image (the RAW image) has a pixel data configuration similar to the pixel configuration of the pixel array, i.e., a configuration such as that of the RAW image 31 illustrated in FIG. 4. In other words, in the input image, blocks constituted by 2×2 pixel data of the same color are distributed in a Bayer pattern.

The input image is supplied to the reference direction setting unit 111, the prediction method setting unit 112, and the computation unit 114.

The reference direction setting unit 111 obtains the input image. The reference direction setting unit 111 also obtains, from the reference buffer 120, a peripheral image for the pixel to be processed. The peripheral image is an image of a region which is located in the periphery of the pixel to be processed and which has been processed before the pixel to be processed. Based on the obtained input image and peripheral image, the reference direction setting unit 111 sets a reference direction, based on the pixel to be processed, for the peripheral pixel to be referenced when deriving a prediction value for the pixel to be processed. The peripheral pixel is a pixel which is located in the periphery of the pixel to be processed and which has been processed before the pixel to be processed. In other words, the reference direction setting unit 111 sets the direction, relative to the pixel to be processed, in which to reference a peripheral pixel when deriving the prediction value for the pixel to be processed. The reference direction setting unit 111 then generates a reference direction flag, which is information indicating the set reference direction. The reference direction setting unit 111 supplies the generated reference direction flag to the prediction method setting unit 112, the prediction unit 113, and the multiplexing unit 117.

The prediction method setting unit 112 obtains the input image. The prediction method setting unit 112 also obtains the reference direction flag supplied from the reference direction setting unit 111. The prediction method setting unit 112 further obtains, from the reference buffer 120, the peripheral image for the pixel to be processed. The prediction method setting unit 112 sets a prediction method for deriving the prediction value for the pixel to be processed, based at least on the peripheral image. The prediction method setting unit 112 selects one of spatial prediction and phase prediction as the prediction method. The spatial prediction is a prediction method that performs prediction by referring to a pixel value of a pixel which is in a block located in a periphery of the pixel to be processed and which is near the pixel to be processed. The phase prediction is a prediction method that performs prediction by referring to a pixel value of a pixel which is in a block located in a periphery of the pixel to be processed and which has a same location in the block as the pixel to be processed. In other words, the prediction method setting unit 112 sets one of spatial prediction and phase prediction as the prediction method for the pixel to be processed in the image data generated by a pixel array in which blocks, each including a plurality of pixels adjacent to each other, are arranged in a predetermined pattern. The prediction method setting unit 112 then generates a prediction method flag, which is information indicating the set prediction method. The prediction method setting unit 112 supplies the generated prediction method flag to the prediction unit 113 and the multiplexing unit 117.

The prediction unit 113 obtains the reference direction flag supplied from the reference direction setting unit 111. The prediction unit 113 also obtains the prediction method flag supplied from the prediction method setting unit 112. The prediction unit 113 further obtains, from the reference buffer 120, the peripheral image for the pixel to be processed. The prediction unit 113 applies the prediction method indicated by the prediction method flag (spatial prediction or phase prediction) and derives, from the reference direction flag and the peripheral image, the prediction value of the pixel to be processed. The prediction unit 113 supplies the derived prediction value to the computation unit 114 and the computation unit 119.

The computation unit 114 obtains the input image. The computation unit 114 also obtains the prediction value supplied from the prediction unit 113. The computation unit 114 subtracts the prediction value from the pixel value of the pixel to be processed in the input image, and generates a prediction residual. The computation unit 114 supplies the generated prediction residual to the quantization unit 115.

The quantization unit 115 obtains the prediction residual supplied from the computation unit 114. The quantization unit 115 quantizes the prediction residual, and generates a quantization coefficient. The quantization unit 115 supplies the quantization coefficient (the quantized prediction residual) to the encoding unit 116 and the inverse quantization unit 118.

The encoding unit 116 obtains the quantization coefficient (the quantized prediction residual) supplied from the quantization unit 115. The encoding unit 116 encodes the quantization coefficient, and generates encoded data of the (quantized) prediction residual. In other words, the encoding unit 116 encodes the prediction residual obtained by subtracting the prediction value derived by the prediction unit 113 from each pixel value in the image data. Any encoding method may be used. For example, variable-length encoding or the like may be used. The encoding unit 116 supplies the generated encoded data to the multiplexing unit 117.

The multiplexing unit 117 obtains the reference direction flag supplied from the reference direction setting unit 111. The multiplexing unit 117 also obtains the prediction method flag supplied from the prediction method setting unit 112. The multiplexing unit 117 further obtains the encoded data supplied from the encoding unit 116. The multiplexing unit 117 multiplexes these items and generates a bitstream. The multiplexing unit 117 outputs the generated bitstream to the outside of the image encoding device 100. In other words, the multiplexing unit 117 generates a bitstream including information indicating the prediction method set by the prediction method setting unit 112, such as the reference direction flag and the prediction method flag, and the encoded data of the prediction residual. To rephrase, the multiplexing unit 117 outputs information pertaining to the prediction method applied when deriving the prediction value of the pixel to be processed, in association with the encoded data of the prediction residual. The bitstream may, for example, be recorded in a recording medium or transmitted to another device via a communication medium.

The inverse quantization unit 118 obtains the quantization coefficient (the quantized prediction residual) supplied from the quantization unit 115. The inverse quantization unit 118 inverse-quantizes the quantization coefficient, and generates a prediction residual. The inverse quantization unit 118 supplies the generated prediction residual to the computation unit 119.

The computation unit 119 obtains the prediction value supplied from the prediction unit 113. The computation unit 119 also obtains the prediction residual supplied from the inverse quantization unit 118. The computation unit 119 adds the prediction value to the prediction residual, and generates a pixel value for the pixel to be processed (the reconfigured image). The computation unit 119 supplies the generated reconfigured image to the reference buffer 120.

The reference buffer 120 obtains the reconfigured image supplied from the computation unit 119. The reference buffer 120 has a storage medium of any desired type, and stores the reconfigured image therein. The reference buffer 120 also supplies the stored reconfigured image to the reference direction setting unit 111 and the prediction method setting unit 112 as the peripheral image. In other words, the reconfigured image stored in the reference buffer 120 is used as the peripheral image in the processing for the subsequent pixels to be processed.

<Prediction Unit>

Figure 8:
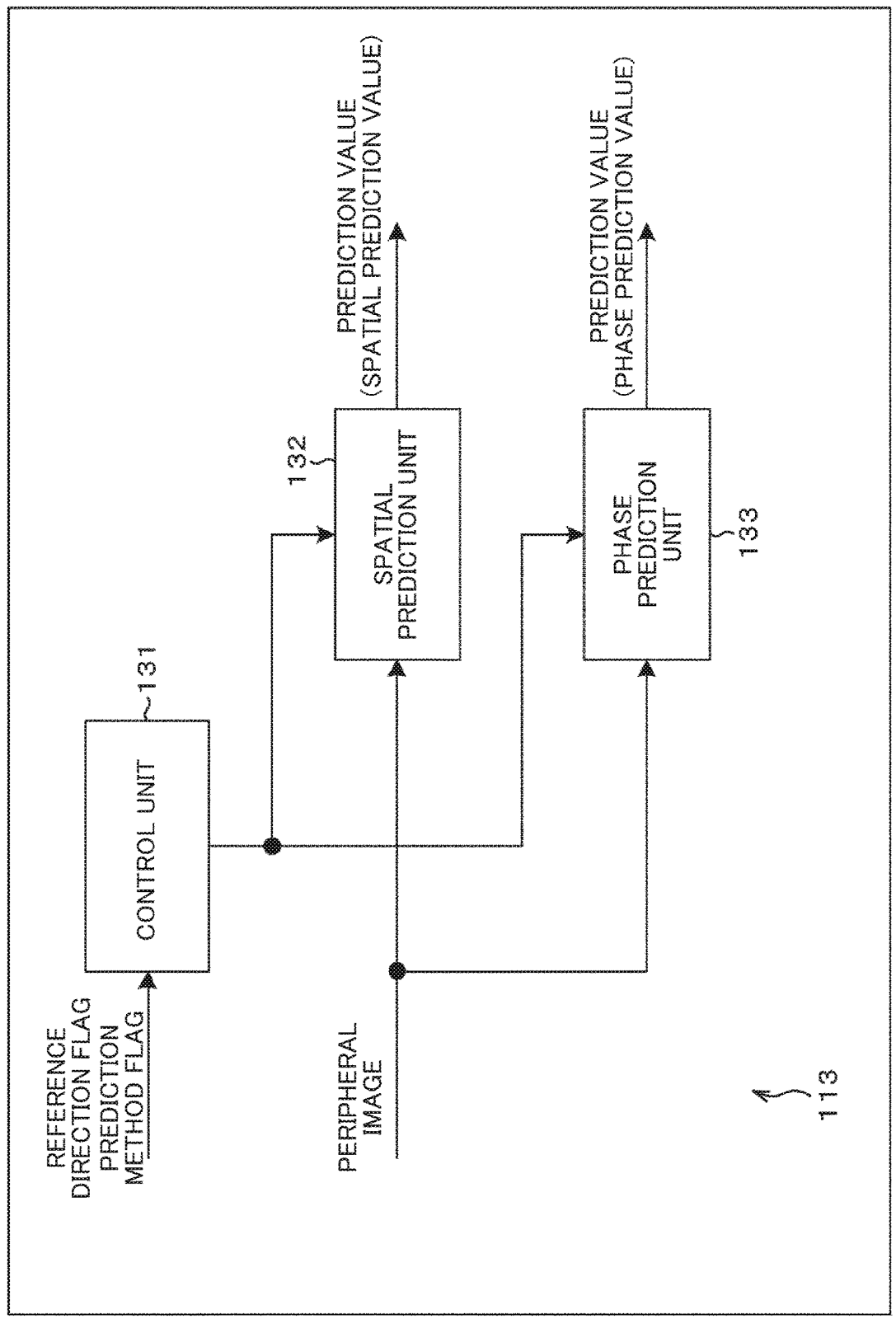
FIG. 8 is a block diagram illustrating an example of the main configuration of a prediction unit.

The processing units will be described next. The prediction unit 113 will be described first. The prediction unit 113 derives the prediction value for the pixel to be processed in the input image by applying the prediction method set by the prediction method setting unit 112. FIG. 8 is a block diagram illustrating an example of the main configuration of the prediction unit 113. As illustrated in FIG. 8, the prediction unit 113 includes a control unit 131, a spatial prediction unit 132, and a phase prediction unit 133.

<Control Unit>

The control unit 131 obtains the reference direction flag supplied from the reference direction setting unit 111. The control unit 131 also obtains the prediction method flag supplied from the prediction method setting unit 112. The control unit 131 selects and applies the one of spatial prediction and phase prediction indicated by the prediction method flag. In other words, if, for example, spatial prediction is specified by the prediction method flag, the control unit 131 controls the spatial prediction unit 132 to derive the prediction value for the pixel to be processed through spatial prediction. If phase prediction is specified by the prediction method flag, the control unit 131 controls the phase prediction unit 133 to derive the prediction value for the pixel to be processed through phase prediction. At this time, the control unit 131 supplies the reference direction flag to the unit being controlled (the spatial prediction unit 132 or the phase prediction unit 133).

<Spatial Prediction Unit>

The spatial prediction unit 132 obtains the peripheral image supplied from the reference buffer 120. Under the control of the control unit 131, the spatial prediction unit 132 performs spatial prediction using the peripheral image and derives the prediction value (also called a "spatial prediction value") for the pixel to be processed. The spatial prediction unit 132 supplies the derived spatial prediction value to the computation unit 114 and the computation unit 119.

Figure 9:
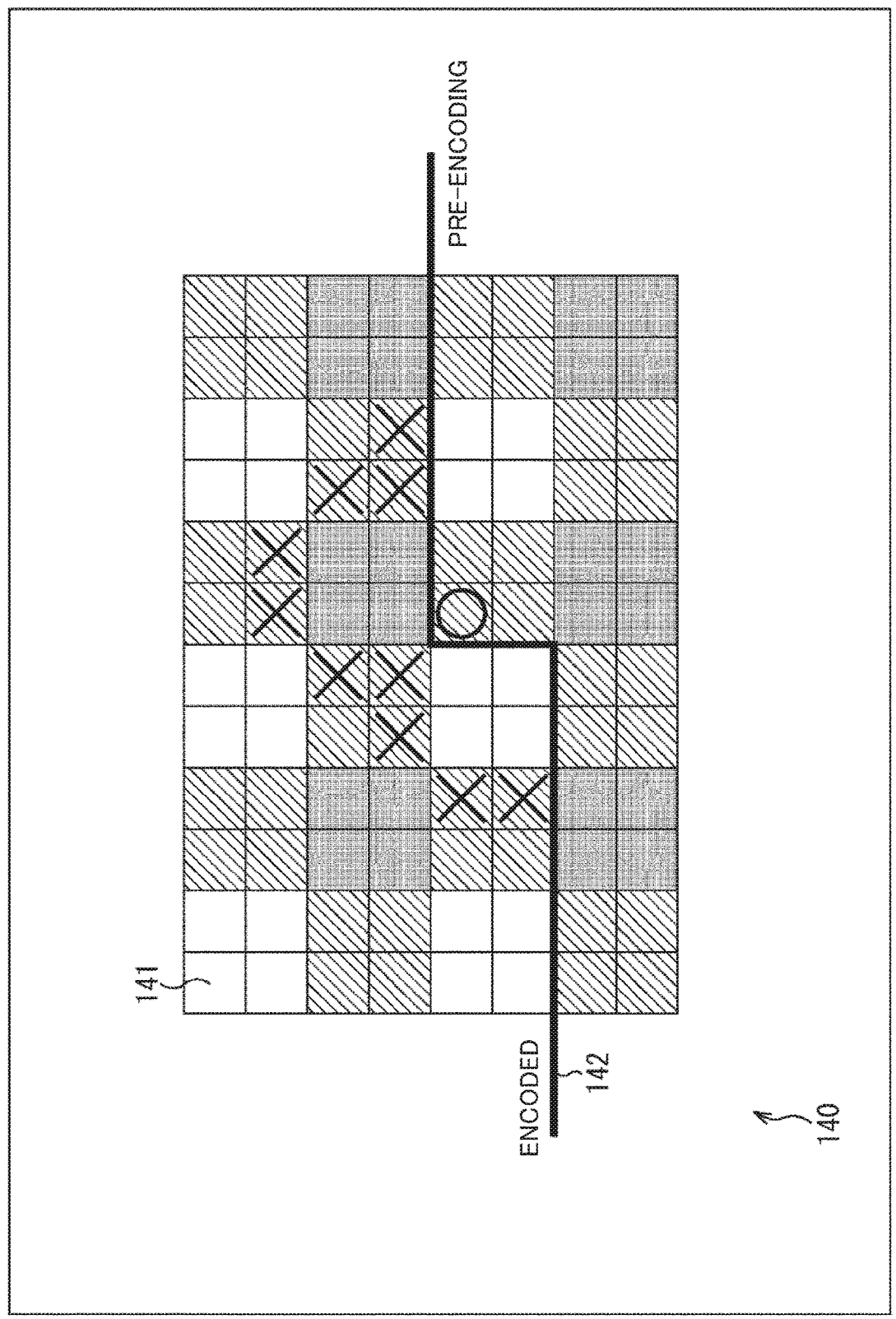
FIG. 9 is a diagram illustrating spatial prediction.

The spatial prediction is a prediction method that performs prediction by referring to a pixel value of a pixel which is in a block located in a periphery of the pixel to be processed and which is near the pixel to be processed. For example, in FIG. 9, it is assumed that each square of a RAW image 140 indicates a pixel 141. In FIG. 9, the sign (141) is indicated only in the pixel at the upper-left corner. Assume that such a RAW image 140 is the input image, and in the figure, the pixel 141 with the circle is the pixel to be processed. For example, if the image encoding device 100 processes each piece of pixel data in the RAW image 140 in raster scanning order on a block-by-block basis, the pixels above the bold line 142 are encoded pixels (processed pixels), and may be referred to as "peripheral pixels" of the pixel to be processed. In the case of spatial prediction, the prediction value is derived by referring to a pixel, which is in a block located in the periphery of the pixel to be processed and constituted by pixels of the same color as the pixel to be processed, and which is near the pixel to be processed. In other words, in the case of spatial prediction, pixels with an x in FIG. 9, for example, are taken as candidates for reference.

The spatial prediction unit 132 derives the prediction value for the pixel to be processed by referring to the pixel, among the candidates, that corresponds to (i) the position of the pixel to be processed in the block and (ii) the reference direction indicated by the reference direction flag. For example, the options for the reference direction are set to four directions, namely left, upper-left, up, and upper-right.

Figure 10:
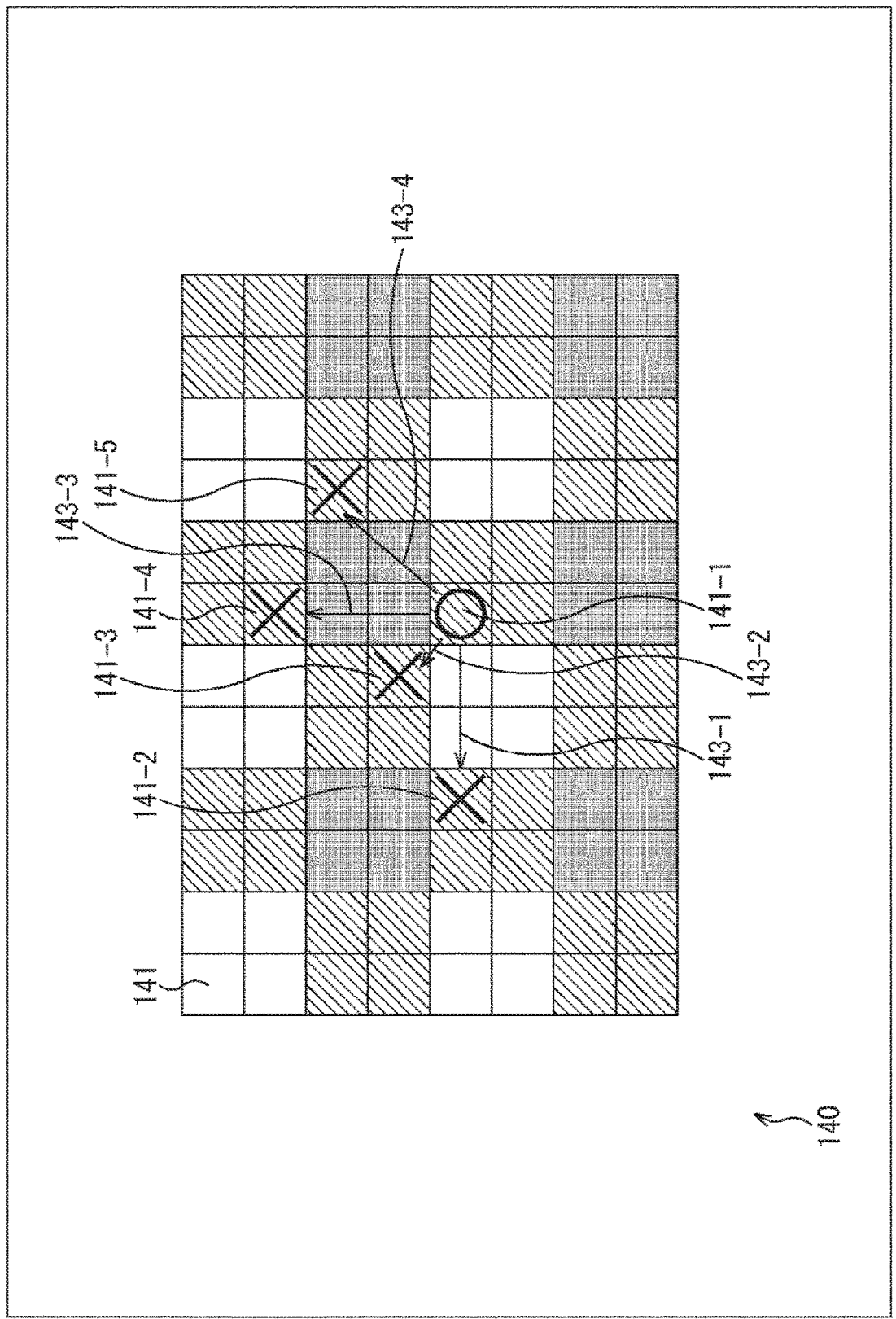
FIG. 10 is a diagram illustrating spatial prediction of green pixels.

FIG. 10 illustrates an example of the peripheral pixels referred to in spatial prediction when the pixel to be processed is a green pixel located in the upper-left corner of the block. In the example illustrated in FIG. 10, it is assumed that a pixel 141-1 located in the upper-left corner of the block constituted by green pixels is the pixel to be processed. For example, if the reference direction is left, as indicated by an arrow 143-1, the spatial prediction unit 132 derives the prediction value for the pixel 141-1 by referring to a pixel 141-2. If the reference direction is upper-left, as indicated by an arrow 143-2, the spatial prediction unit 132 derives the prediction value for the pixel 141-1 by referring to a pixel 141-3. If the reference direction is up, as indicated by an arrow 143-3, the spatial prediction unit 132 derives the prediction value for the pixel 141-1 by referring to a pixel 141-4. If the reference direction is upper-right, as indicated by an arrow 143-4, the spatial prediction unit 132 derives the prediction value for the pixel 141-1 by referring to a pixel 141-5.

Figure 11:
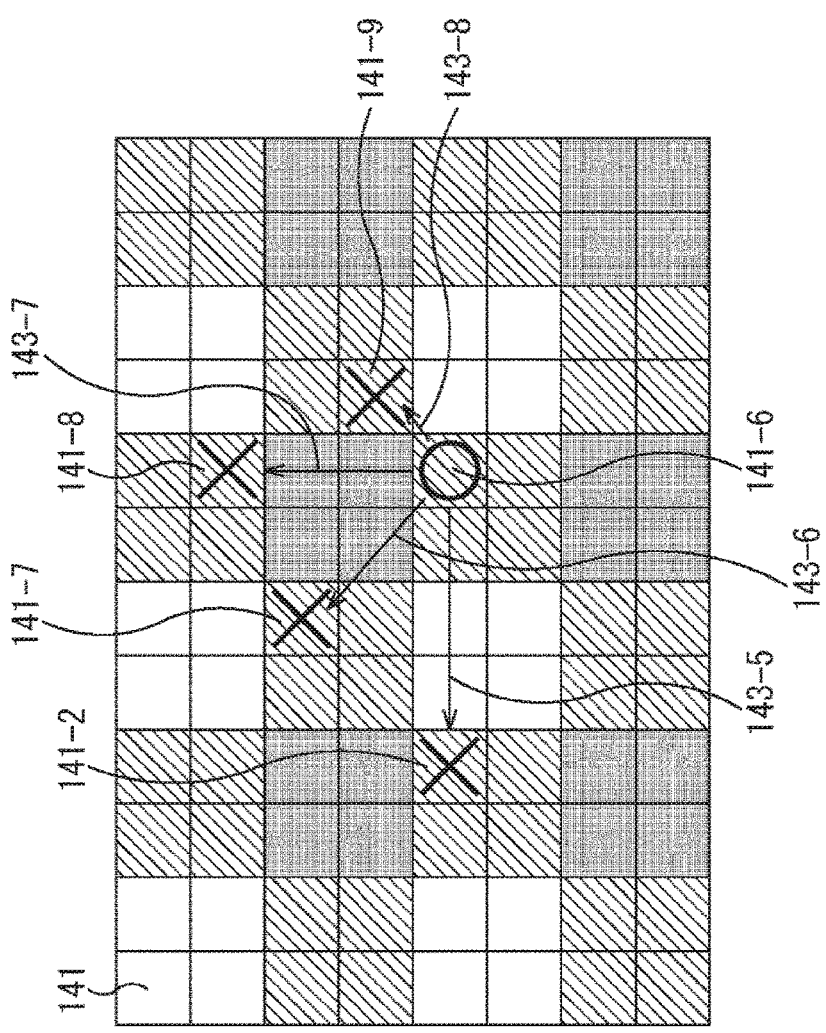
FIG. 11 is a diagram illustrating spatial prediction of green pixels.

FIG. 11 illustrates an example of the peripheral pixels referred to in spatial prediction when the pixel to be processed is a green pixel located in the upper-right corner of the block. In the example illustrated in FIG. 11, it is assumed that a pixel 141-6 located in the upper-right corner of the block constituted by green pixels is the pixel to be processed. For example, if the reference direction is left, as indicated by an arrow 143-5, the spatial prediction unit 132 derives the prediction value for the pixel 141-6 by referring to a pixel 141-2. If the reference direction is upper-left, as indicated by an arrow 143-6, the spatial prediction unit 132 derives the prediction value for the pixel 141-6 by referring to a pixel 141-7. If the reference direction is up, as indicated by an arrow 143-7, the spatial prediction unit 132 derives the prediction value for the pixel 141-6 by referring to a pixel 141-8. If the reference direction is upper-right, as indicated by an arrow 143-8, the spatial prediction unit 132 derives the prediction value for the pixel 141-6 by referring to a pixel 141-9.

Figure 12:
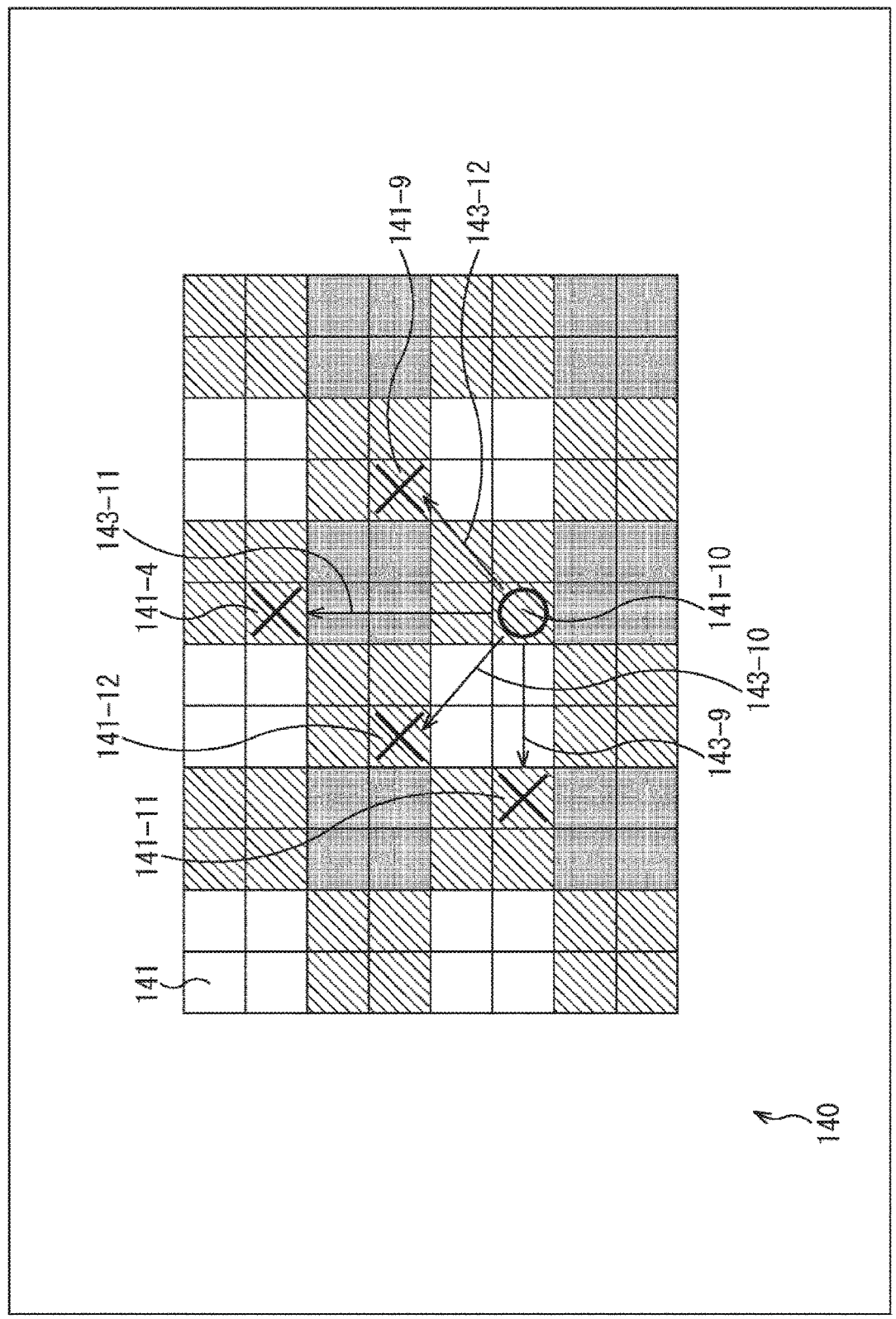
FIG. 12 is a diagram illustrating spatial prediction of green pixels.

FIG. 12 illustrates an example of the peripheral pixels referred to in spatial prediction when the pixel to be processed is a green pixel located in the lower-left corner of the block. In the example illustrated in FIG. 12, it is assumed that a pixel 141-10 located in the lower-left corner of the block constituted by green pixels is the pixel to be processed. For example, if the reference direction is left, as indicated by an arrow 143-9, the spatial prediction unit 132 derives the prediction value for the pixel 141-10 by referring to a pixel 141-11. If the reference direction is upper-left, as indicated by an arrow 143-10, the spatial prediction unit 132 derives the prediction value for the pixel 141-10 by referring to a pixel 141-12. If the reference direction is up, as indicated by an arrow 143-11, the spatial prediction unit 132 derives the prediction value for the pixel 141-10 by referring to the pixel 141-4. If the reference direction is upper-right, as indicated by an arrow 143-12, the spatial prediction unit 132 derives the prediction value for the pixel 141-10 by referring to the pixel 141-9.

Figure 13:
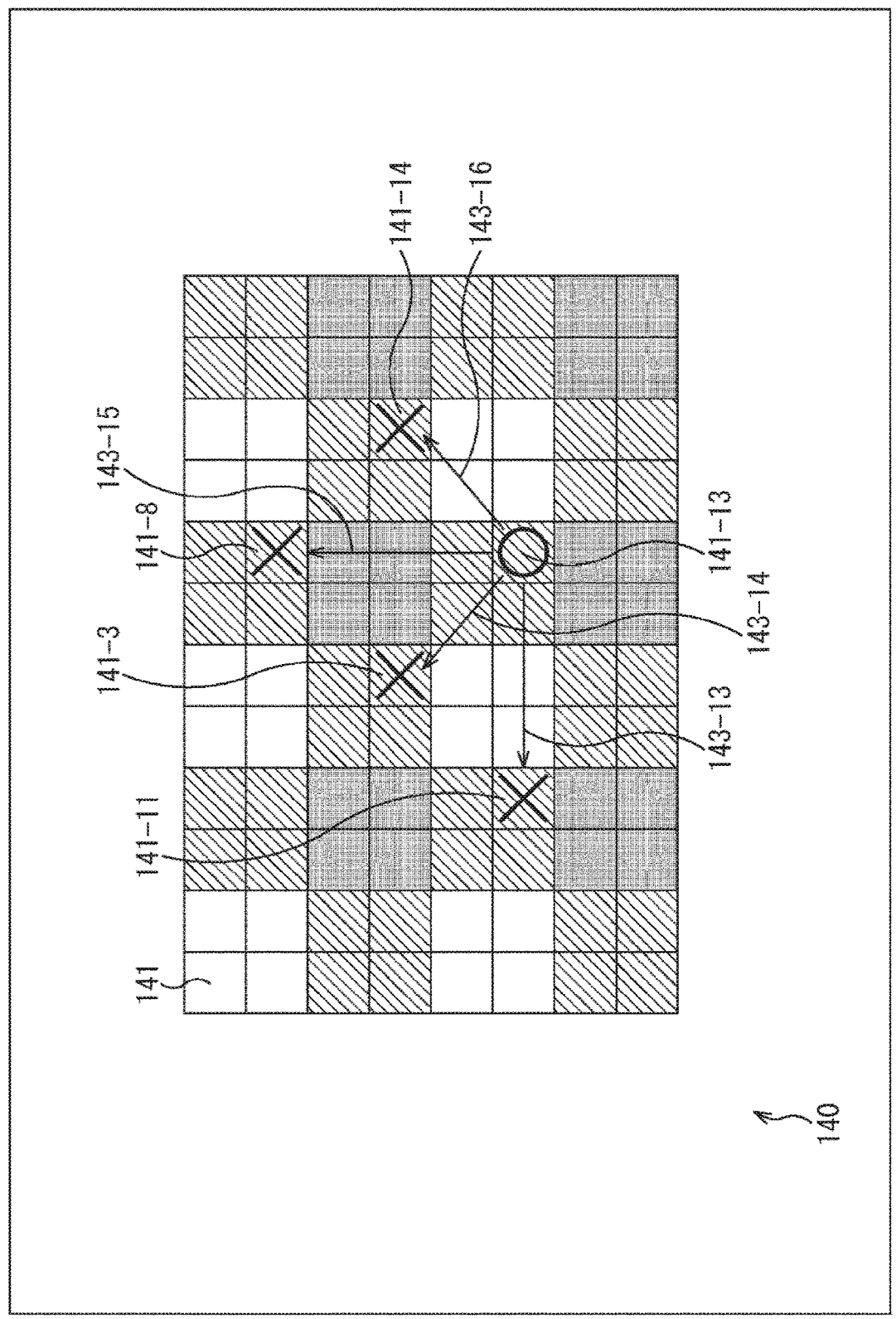
FIG. 13 is a diagram illustrating spatial prediction of green pixels.

FIG. 13 illustrates an example of the peripheral pixels referred to in spatial prediction when the pixel to be processed is a green pixel located in the lower-right corner of the block. In the example illustrated in FIG. 13, it is assumed that a pixel 141-13 located in the lower-right corner of the block constituted by green pixels is the pixel to be processed. For example, if the reference direction is left, as indicated by an arrow 143-13, the spatial prediction unit 132 derives the prediction value for the pixel 141-13 by referring to the pixel 141-11. If the reference direction is upper-left, as indicated by an arrow 143-14, the spatial prediction unit 132 derives the prediction value for the pixel 141-13 by referring to the pixel 141-3. If the reference direction is up, as indicated by an arrow 143-15, the spatial prediction unit 132 derives the prediction value for the pixel 141-13 by referring to the pixel 141-8. If the reference direction is upper-right, as indicated by an arrow 143-16, the spatial prediction unit 132 derives the prediction value for the pixel 141-13 by referring to a pixel 141-14.

Figure 14:
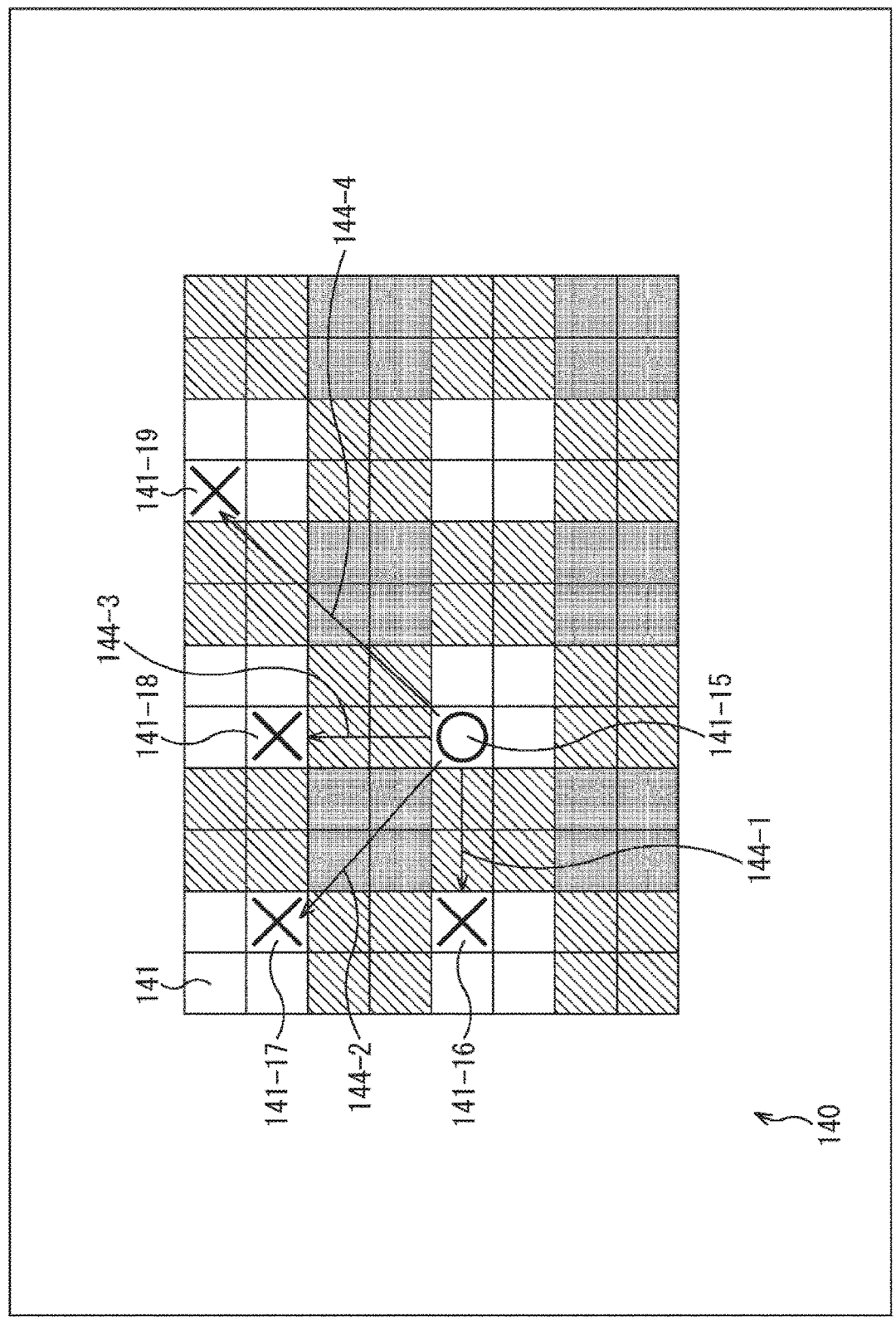
FIG. 14 is a diagram illustrating spatial prediction of red pixels.

FIG. 14 illustrates an example of the peripheral pixels referred to in spatial prediction when the pixel to be processed is a red pixel located in the upper-left corner of the block. In the example illustrated in FIG. 14, it is assumed that a pixel 141-15 located in the upper-left corner of the block constituted by red pixels is the pixel to be processed. For example, if the reference direction is left, as indicated by an arrow 144-1, the spatial prediction unit 132 derives the prediction value for the pixel 141-15 by referring to a pixel 141-16. If the reference direction is upper-left, as indicated by an arrow 144-2, the spatial prediction unit 132 derives the prediction value for the pixel 141-15 by referring to a pixel 141-17. If the reference direction is up, as indicated by an arrow 144-3, the spatial prediction unit 132 derives the prediction value for the pixel 141-15 by referring to a pixel 141-18. If the reference direction is upper-right, as indicated by an arrow 144-4, the spatial prediction unit 132 derives the prediction value for the pixel 141-15 by referring to a pixel 141-19.

Figure 15:
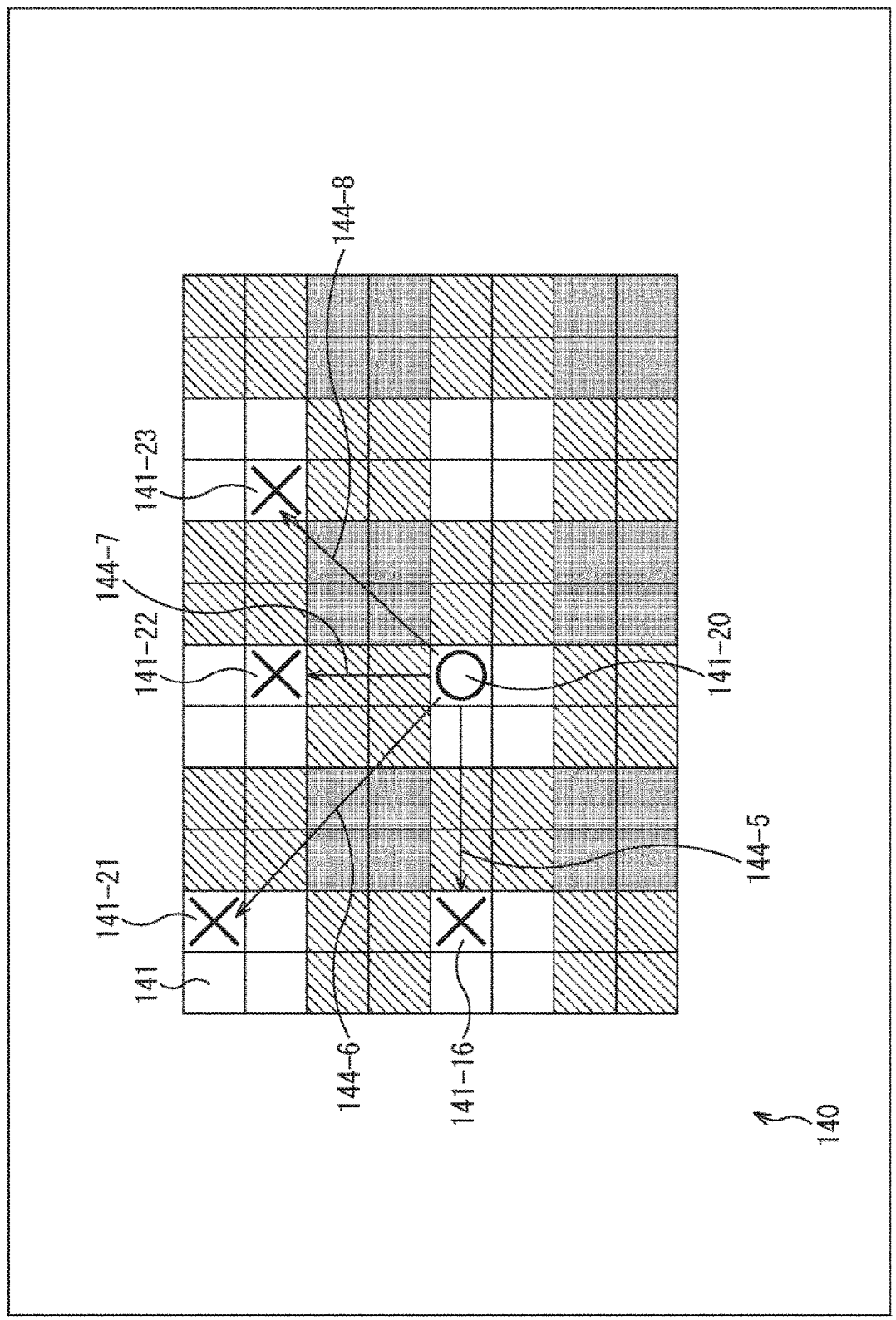
FIG. 15 is a diagram illustrating spatial prediction of red pixels.

FIG. 15 illustrates an example of the peripheral pixels referred to in spatial prediction when the pixel to be processed is a red pixel located in the upper-right corner of the block. In the example illustrated in FIG. 15, it is assumed that a pixel 141-20 located in the upper-right corner of the block constituted by red pixels is the pixel to be processed. For example, if the reference direction is left, as indicated by an arrow 144-5, the spatial prediction unit 132 derives the prediction value for the pixel 141-20 by referring to the pixel 141-16. If the reference direction is upper-left, as indicated by an arrow 144-6, the spatial prediction unit 132 derives the prediction value for the pixel 141-20 by referring to a pixel 141-21. If the reference direction is upper-left, as indicated by an arrow 144-7, the spatial prediction unit 132 derives the prediction value for the pixel 141-20 by referring to a pixel 141-22. If the reference direction is upper-right, as indicated by an arrow 144-8, the spatial prediction unit 132 derives the prediction value for the pixel 141-20 by referring to a pixel 141-23.

Figure 16:
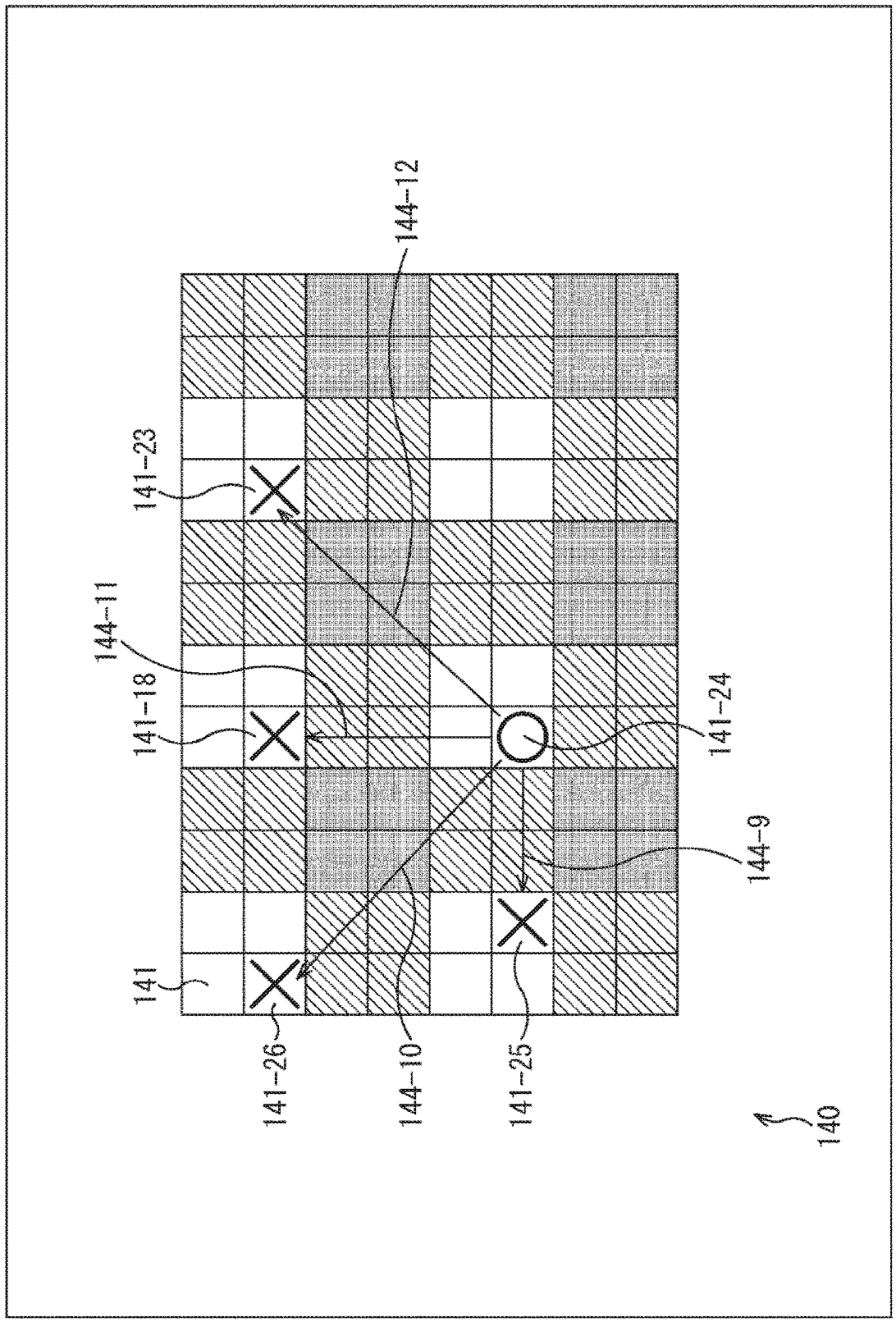
FIG. 16 is a diagram illustrating spatial prediction of red pixels.

FIG. 16 illustrates an example of the peripheral pixels referred to in spatial prediction when the pixel to be processed is a red pixel located in the lower-left corner of the block. In the example illustrated in FIG. 16, it is assumed that a pixel 141-24 located in the lower-left corner of the block constituted by red pixels is the pixel to be processed. For example, if the reference direction is left, as indicated by an arrow 144-9, the spatial prediction unit 132 derives the prediction value for the pixel 141-24 by referring to a pixel 141-25. If the reference direction is upper-left, as indicated by an arrow 144-10, the spatial prediction unit 132 derives the prediction value for the pixel 141-24 by referring to a pixel 141-26. If the reference direction is up, as indicated by an arrow 144-11, the spatial prediction unit 132 derives the prediction value for the pixel 141-24 by referring to the pixel 141-18. If the reference direction is upper-right, as indicated by an arrow 144-12, the spatial prediction unit 132 derives the prediction value for the pixel 141-24 by referring to the pixel 141-23.

Figure 17:
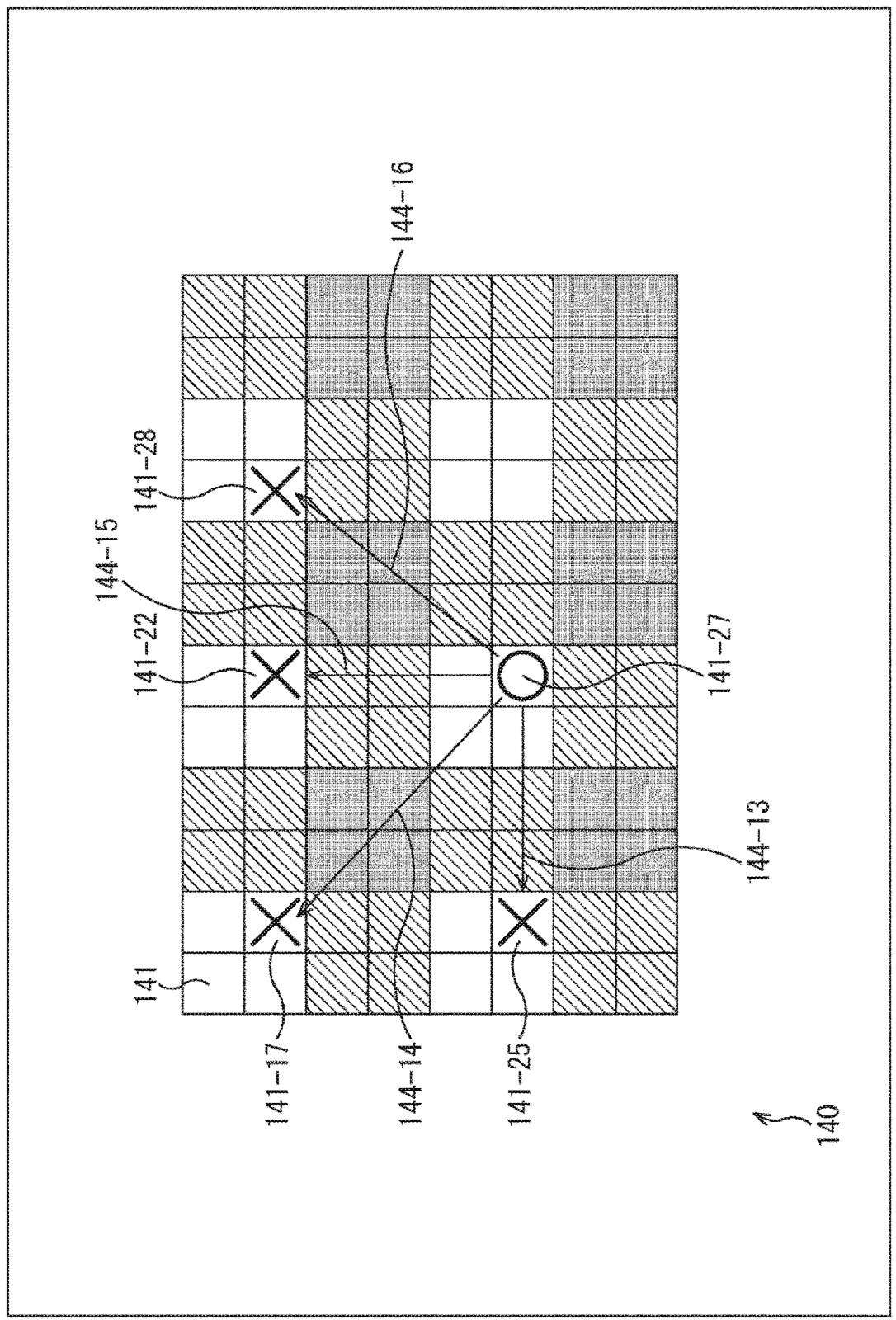
FIG. 17 is a diagram illustrating spatial prediction of red pixels.

FIG. 17 illustrates an example of the peripheral pixels referred to in spatial prediction when the pixel to be processed is a red pixel located in the lower-right corner of the block. In the example illustrated in FIG. 17, it is assumed that a pixel 141-27 located in the lower-right corner of the block constituted by red pixels is the pixel to be processed. For example, if the reference direction is left, as indicated by an arrow 144-13, the spatial prediction unit 132 derives the prediction value for the pixel 141-27 by referring to the pixel 141-25. If the reference direction is upper-left, as indicated by an arrow 144-14, the spatial prediction unit 132 derives the prediction value for the pixel 141-27 by referring to the pixel 141-17. If the reference direction is up, as indicated by an arrow 144-15, the spatial prediction unit 132 derives the prediction value for the pixel 141-27 by referring to the pixel 141-22. If the reference direction is upper-right, as indicated by an arrow 144-16, the spatial prediction unit 132 derives the prediction value for the pixel 141-27 by referring to a pixel 141-28.

Note that the reference targets (the relative position from the pixel to be processed) for blue pixels are the same as for the red pixels described above, and will therefore not be described here.

<Phase Prediction Unit>

The phase prediction unit 133 obtains the peripheral image supplied from the reference buffer 120. Under the control of the control unit 131, the phase prediction unit 133 performs phase prediction using the peripheral image and derives the prediction value (also called a "phase prediction value") for the pixel to be processed. The phase prediction unit 133 supplies the derived phase prediction value to the computation unit 114 and the computation unit 119.

Figure 18:
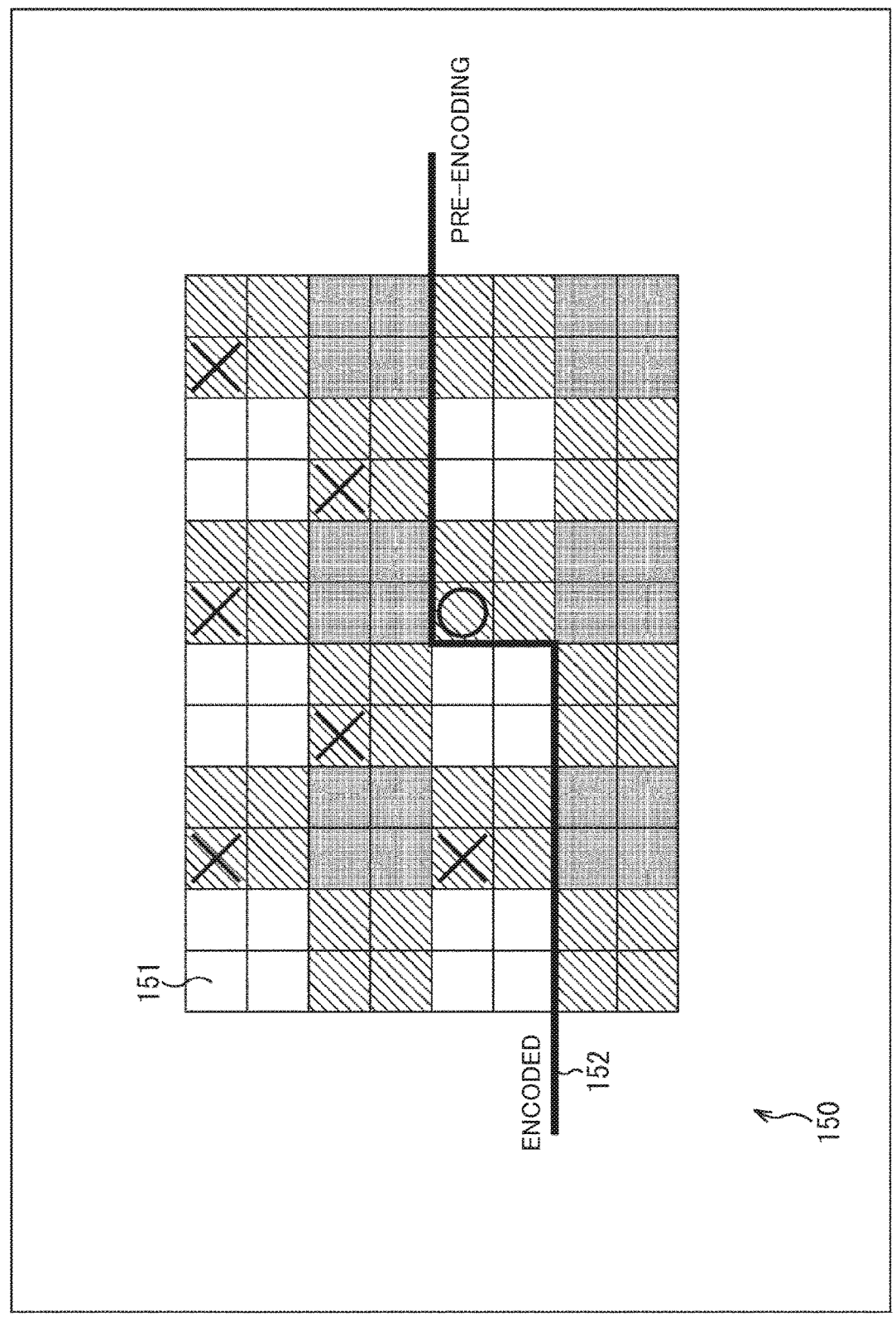
FIG. 18 is a diagram illustrating phase prediction.

The phase prediction is a prediction method that performs prediction by referring to a pixel value of a pixel which is in a block located in a periphery of the pixel to be processed and which has a same location in the block as the pixel to be processed. For example, in FIG. 18, it is assumed that each square of a RAW image 150 indicates a pixel 151. In FIG. 18, the sign (151) is indicated only in the pixel at the upper-left corner. Assume that such a RAW image 150 is the input image, and in the figure, the pixel 151 with the circle is the pixel to be processed. For example, if the image encoding device 100 processes each piece of pixel data in the RAW image 150 in raster scanning order on a block-by-block basis, the pixels above the bold line 152 are encoded pixels (processed pixels), and may be referred to as "peripheral pixels" of the pixel to be processed. In the case of phase prediction, the prediction value is derived by referring to a pixel, which is in a block located in the periphery of the pixel to be processed and constituted by pixels of the same color as the pixel to be processed, and which is in the same position in the block as the pixel to be processed. In other words, in the case of phase prediction, pixels with an x in FIG. 18, for example, are taken as candidates for reference.

The phase prediction unit 133 derives the prediction value for the pixel to be processed by referring to the pixel, among the candidates, that corresponds to (i) the position of the pixel to be processed in the block and (ii) the reference direction indicated by the reference direction flag. For example, the options for the reference direction are set to four directions, namely left, upper-left, up, and upper-right.

Figure 19:
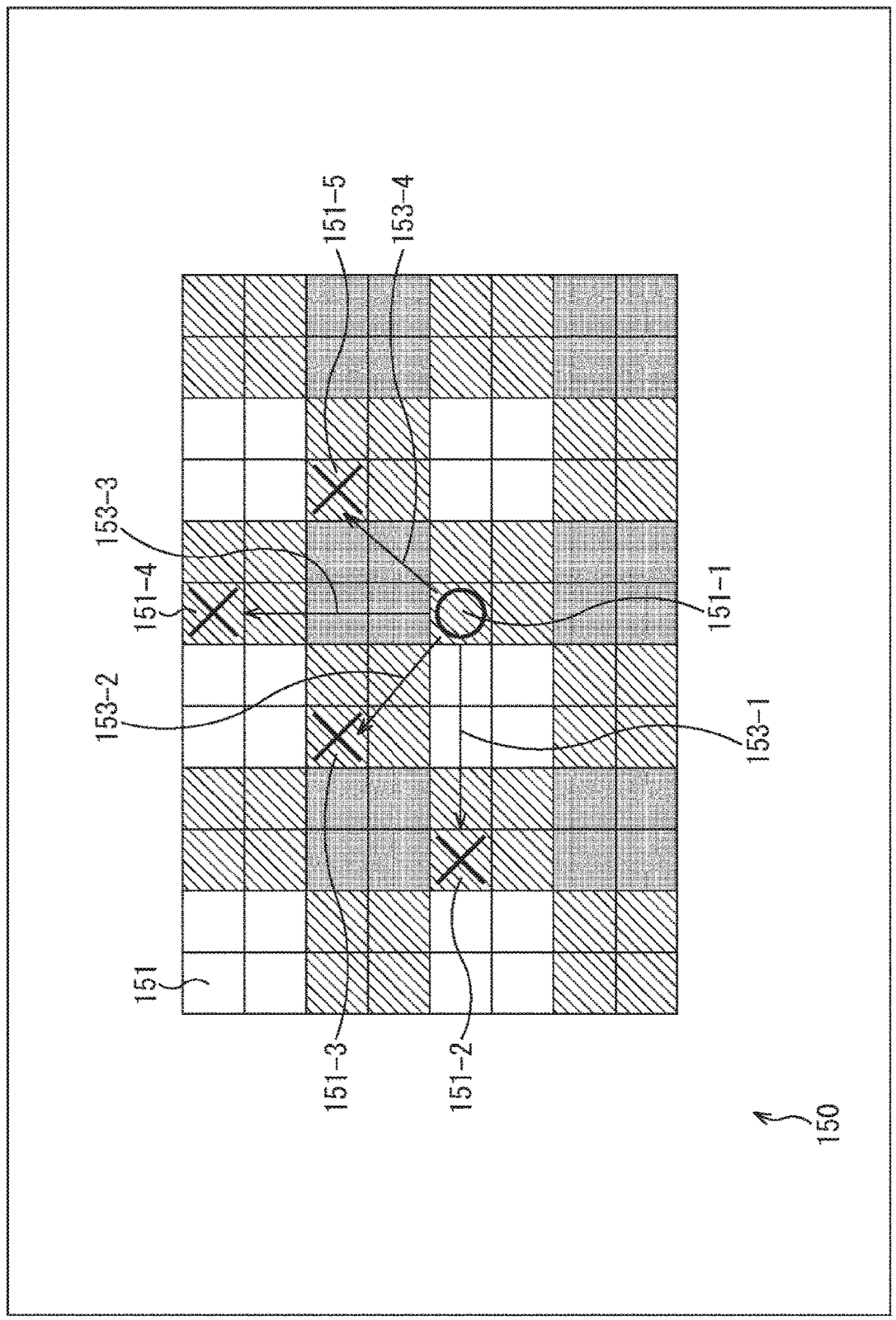
FIG. 19 is a diagram illustrating phase prediction of green pixels.

FIG. 19 illustrates an example of the peripheral pixels referred to in phase prediction when the pixel to be processed is a green pixel located in the upper-left corner of the block. In the example illustrated in FIG. 19, it is assumed that a pixel 151-1 located in the upper-left corner of the block constituted by green pixels is the pixel to be processed. For example, if the reference direction is left, as indicated by an arrow 153-1, the phase prediction unit 133 derives the prediction value for the pixel 151-1 by referring to a pixel 151-2. If the reference direction is upper-left, as indicated by an arrow 153-2, the phase prediction unit 133 derives the prediction value for the pixel 151-1 by referring to a pixel 151-3. If the reference direction is up, as indicated by an arrow 153-3, the phase prediction unit 133 derives the prediction value for the pixel 151-1 by referring to a pixel 151-4. If the reference direction is upper-right, as indicated by an arrow 153-4, the phase prediction unit 133 derives the prediction value for the pixel 151-1 by referring to a pixel 151-5.

Figure 20:
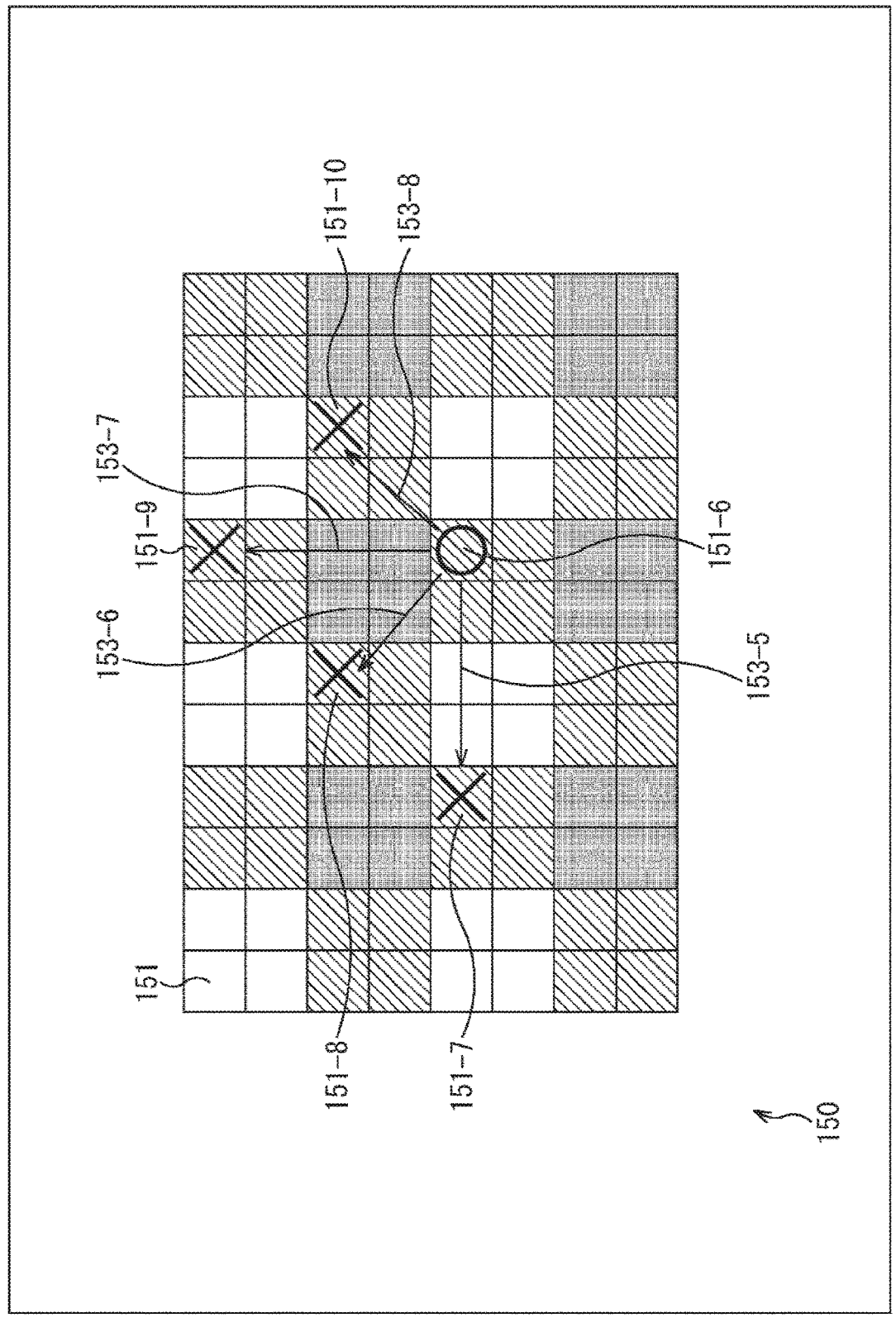
FIG. 20 is a diagram illustrating phase prediction of green pixels.

FIG. 20 illustrates an example of the peripheral pixels referred to in phase prediction when the pixel to be processed is a green pixel located in the upper-right corner of the block. In the example illustrated in FIG. 20, it is assumed that a pixel 151-6 located in the upper-right corner of the block constituted by green pixels is the pixel to be processed. For example, if the reference direction is left, as indicated by an arrow 153-5, the phase prediction unit 133 derives the prediction value for the pixel 151-6 by referring to a pixel 151-7. If the reference direction is upper-left, as indicated by an arrow 153-6, the phase prediction unit 133 derives the prediction value for the pixel 151-6 by referring to a pixel 151-8. If the reference direction is up, as indicated by an arrow 153-7, the phase prediction unit 133 derives the prediction value for the pixel 151-6 by referring to a pixel 151-9. If the reference direction is upper-right, as indicated by an arrow 153-8, the phase prediction unit 133 derives the prediction value for the pixel 151-6 by referring to a pixel 151-10.

Figure 21:
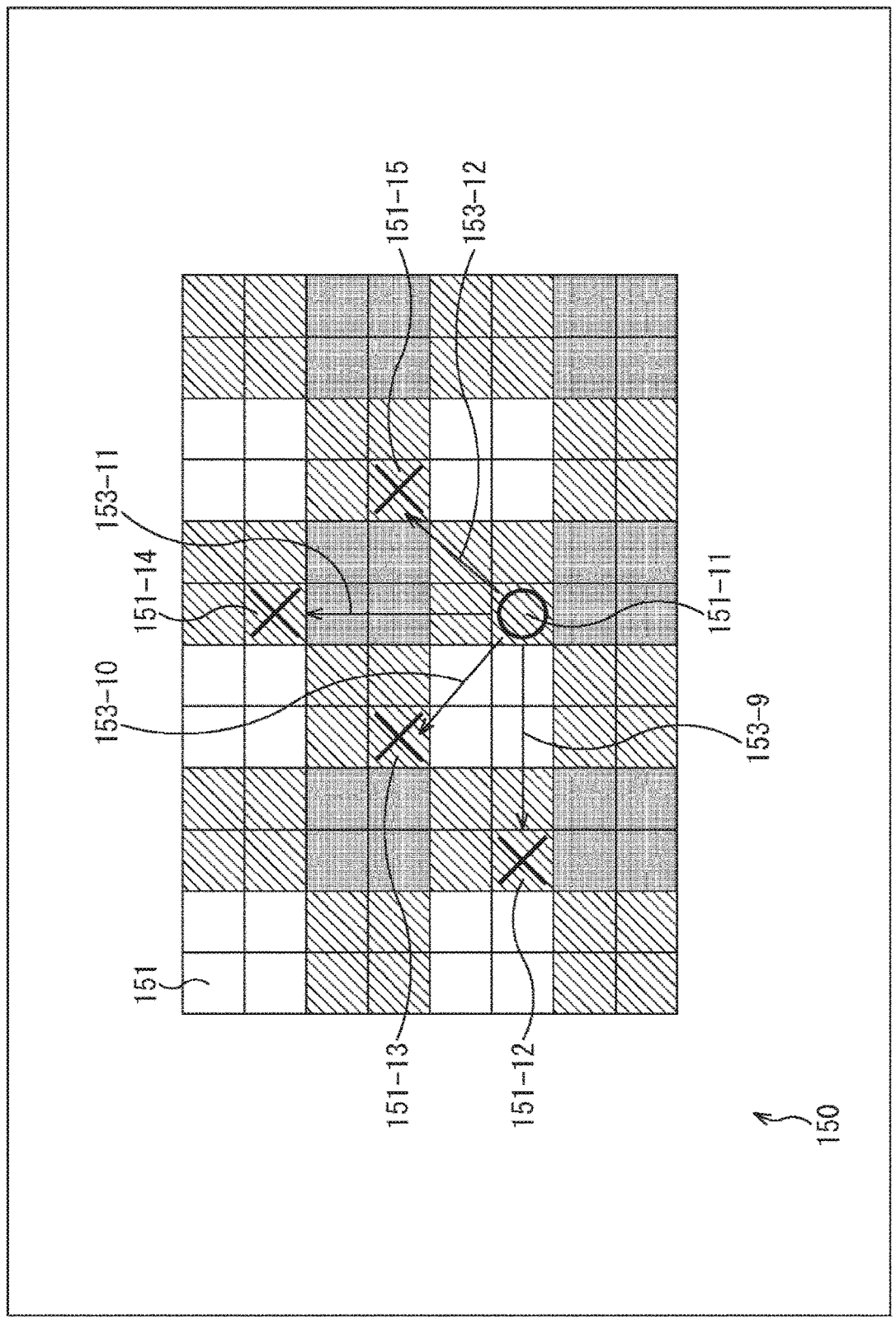
FIG. 21 is a diagram illustrating phase prediction of green pixels.

FIG. 21 illustrates an example of the peripheral pixels referred to in phase prediction when the pixel to be processed is a green pixel located in the lower-left corner of the block. In the example illustrated in FIG. 21, it is assumed that a pixel 151-11 located in the lower-left corner of the block constituted by green pixels is the pixel to be processed. For example, if the reference direction is left, as indicated by an arrow 153-9, the phase prediction unit 133 derives the prediction value for the pixel 151-11 by referring to a pixel 151-12. If the reference direction is upper-left, as indicated by an arrow 153-10, the phase prediction unit 133 derives the prediction value for the pixel 151-11 by referring to a pixel 151-13. If the reference direction is up, as indicated by an arrow 153-11, the phase prediction unit 133 derives the prediction value for the pixel 151-11 by referring to a pixel 151-14. If the reference direction is upper-right, as indicated by an arrow 153-12, the phase prediction unit 133 derives the prediction value for the pixel 151-11 by referring to a pixel 151-15.

Figure 22:
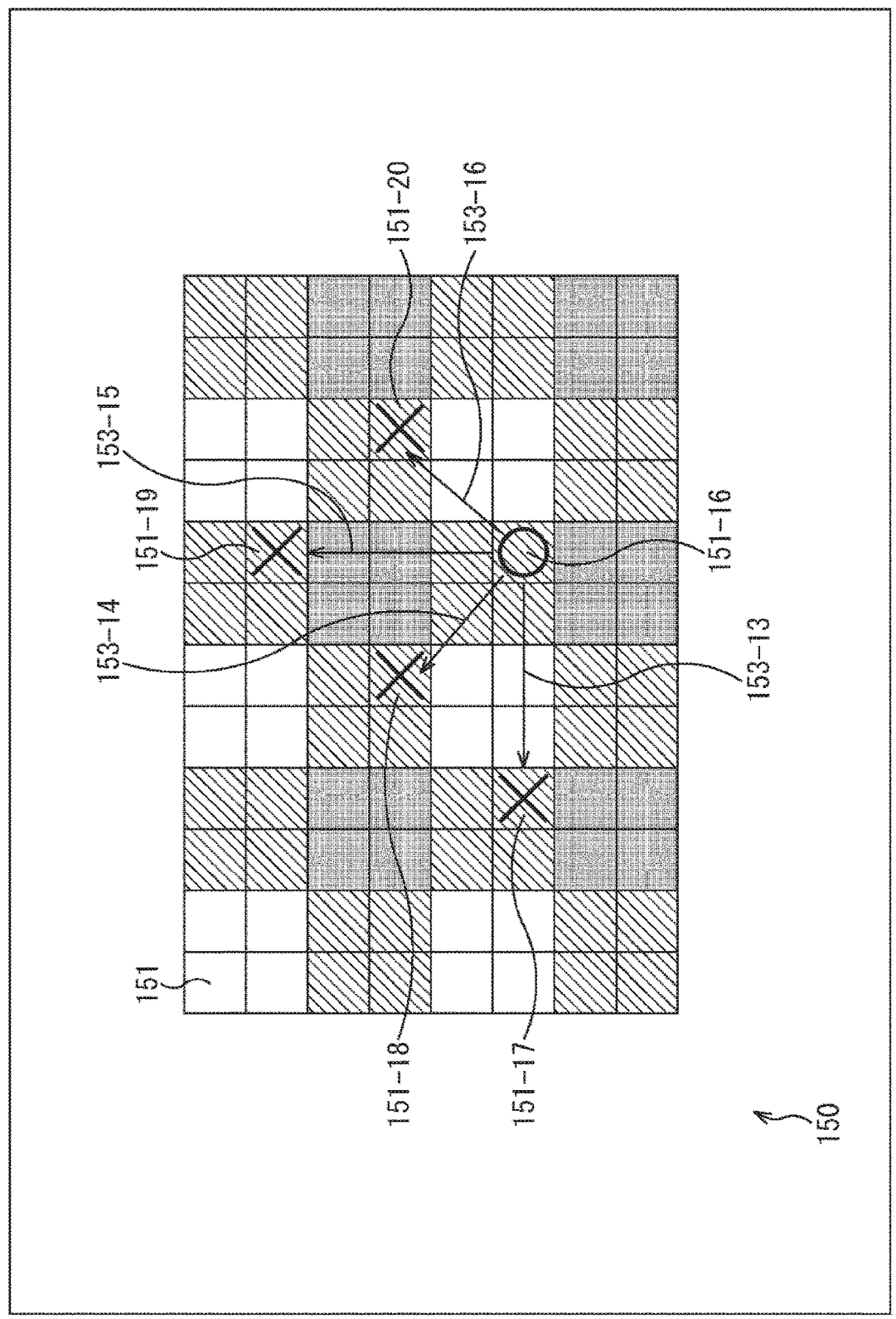
FIG. 22 is a diagram illustrating phase prediction of green pixels.

FIG. 22 illustrates an example of the peripheral pixels referred to in phase prediction when the pixel to be processed is a green pixel located in the lower-right corner of the block. In the example illustrated in FIG. 22, it is assumed that a pixel 151-16 located in the lower-right corner of the block constituted by green pixels is the pixel to be processed. For example, if the reference direction is left, as indicated by an arrow 153-13, the phase prediction unit 133 derives the prediction value for the pixel 151-16 by referring to a pixel 151-17. If the reference direction is upper-left, as indicated by an arrow 153-14, the phase prediction unit 133 derives the prediction value for the pixel 151-16 by referring to a pixel 151-18. If the reference direction is upper-left, as indicated by an arrow 153-15, the phase prediction unit 133 derives the prediction value for the pixel 151-16 by referring to a pixel 151-19. If the reference direction is upper-right, as indicated by an arrow 153-16, the phase prediction unit 133 derives the prediction value for the pixel 151-16 by referring to a pixel 151-20.

Figure 23:
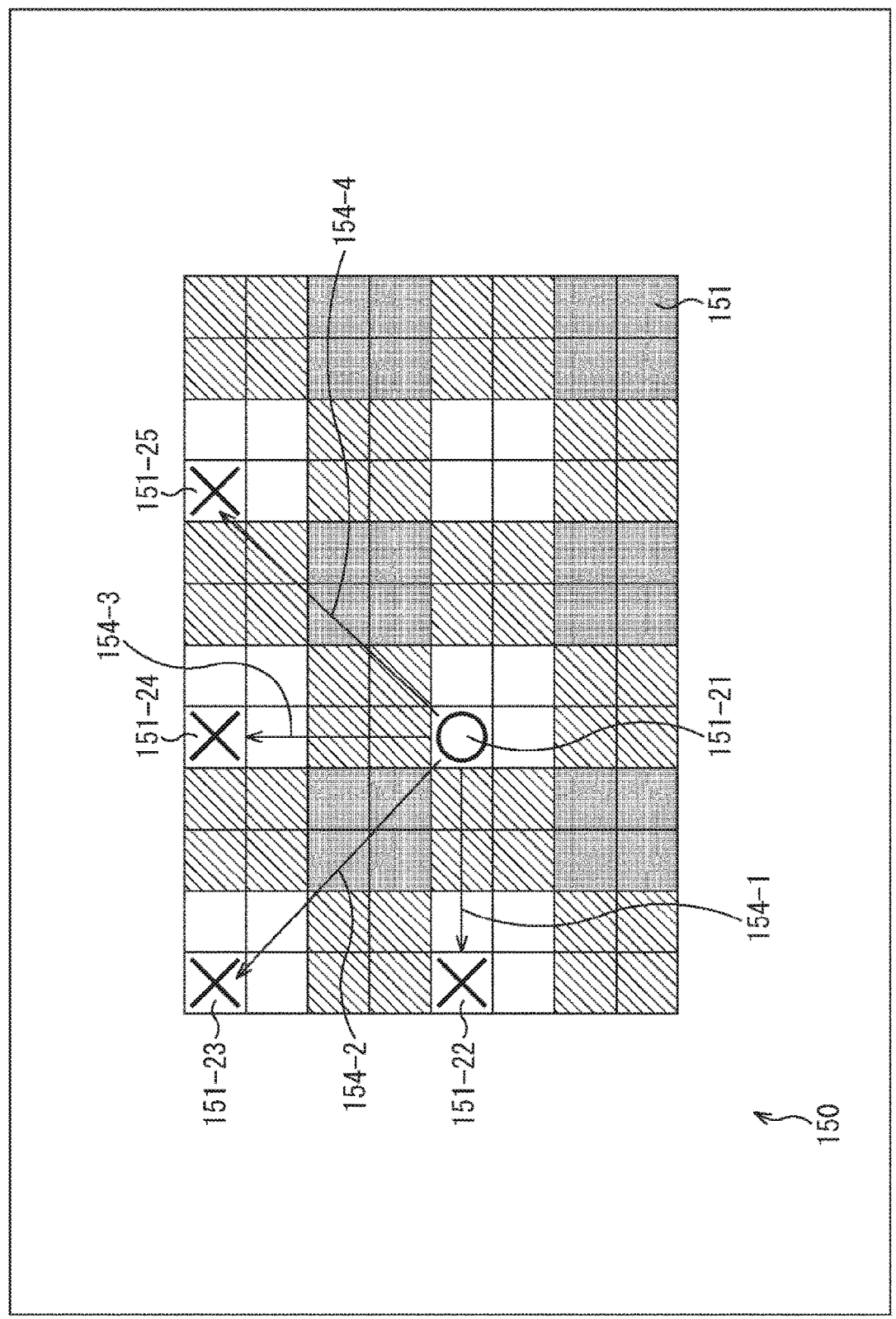
FIG. 23 is a diagram illustrating phase prediction of red pixels.

FIG. 23 illustrates an example of the peripheral pixels referred to in phase prediction when the pixel to be processed is a red pixel located in the upper-left corner of the block. In the example illustrated in FIG. 23, it is assumed that a pixel 151-21 located in the upper-left corner of the block constituted by red pixels is the pixel to be processed. For example, if the reference direction is left, as indicated by an arrow 154-1, the phase prediction unit 133 derives the prediction value for the pixel 151-21 by referring to a pixel 151-22. If the reference direction is upper-left, as indicated by an arrow 154-2, the phase prediction unit 133 derives the prediction value for the pixel 151-21 by referring to a pixel 151-23. If the reference direction is up, as indicated by an arrow 154-3, the phase prediction unit 133 derives the prediction value for the pixel 151-21 by referring to a pixel 151-24. If the reference direction is upper-right, as indicated by an arrow 154-4, the phase prediction unit 133 derives the prediction value for the pixel 151-21 by referring to a pixel 151-25.

Figure 24:
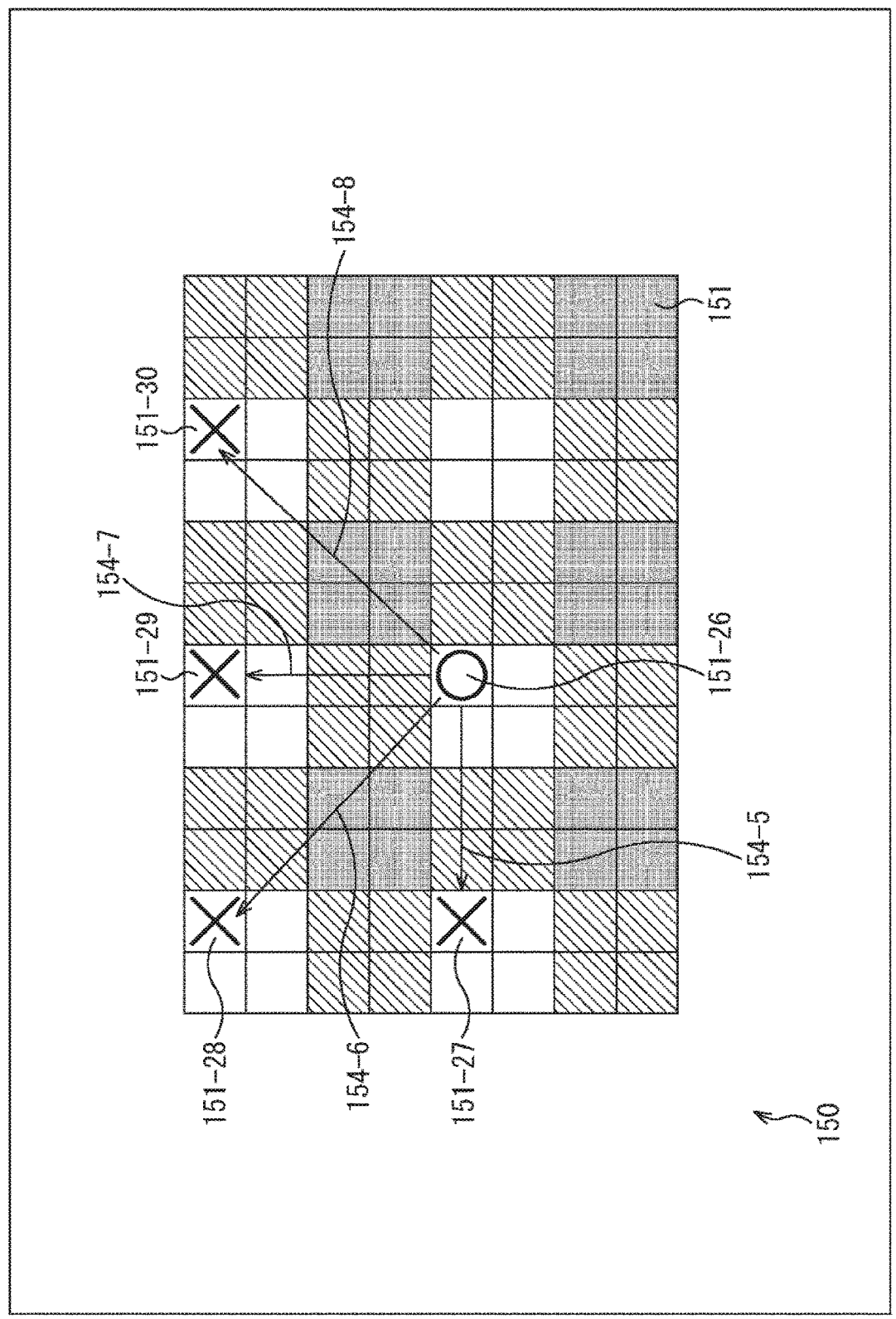
FIG. 24 is a diagram illustrating phase prediction of red pixels.

FIG. 24 illustrates an example of the peripheral pixels referred to in phase prediction when the pixel to be processed is a red pixel located in the upper-right corner of the block. In the example illustrated in FIG. 24, it is assumed that a pixel 151-26 located in the upper-right corner of the block constituted by red pixels is the pixel to be processed. For example, if the reference direction is left, as indicated by an arrow 154-5, the phase prediction unit 133 derives the prediction value for the pixel 151-26 by referring to a pixel 151-27. If the reference direction is upper-left, as indicated by an arrow 154-6, the phase prediction unit 133 derives the prediction value for the pixel 151-26 by referring to a pixel 151-28. If the reference direction is up, as indicated by an arrow 154-7, the phase prediction unit 133 derives the prediction value for the pixel 151-26 by referring to a pixel 151-29. If the reference direction is upper-right, as indicated by an arrow 154-8, the phase prediction unit 133 derives the prediction value for the pixel 151-26 by referring to a pixel 151-30.

Figure 25:
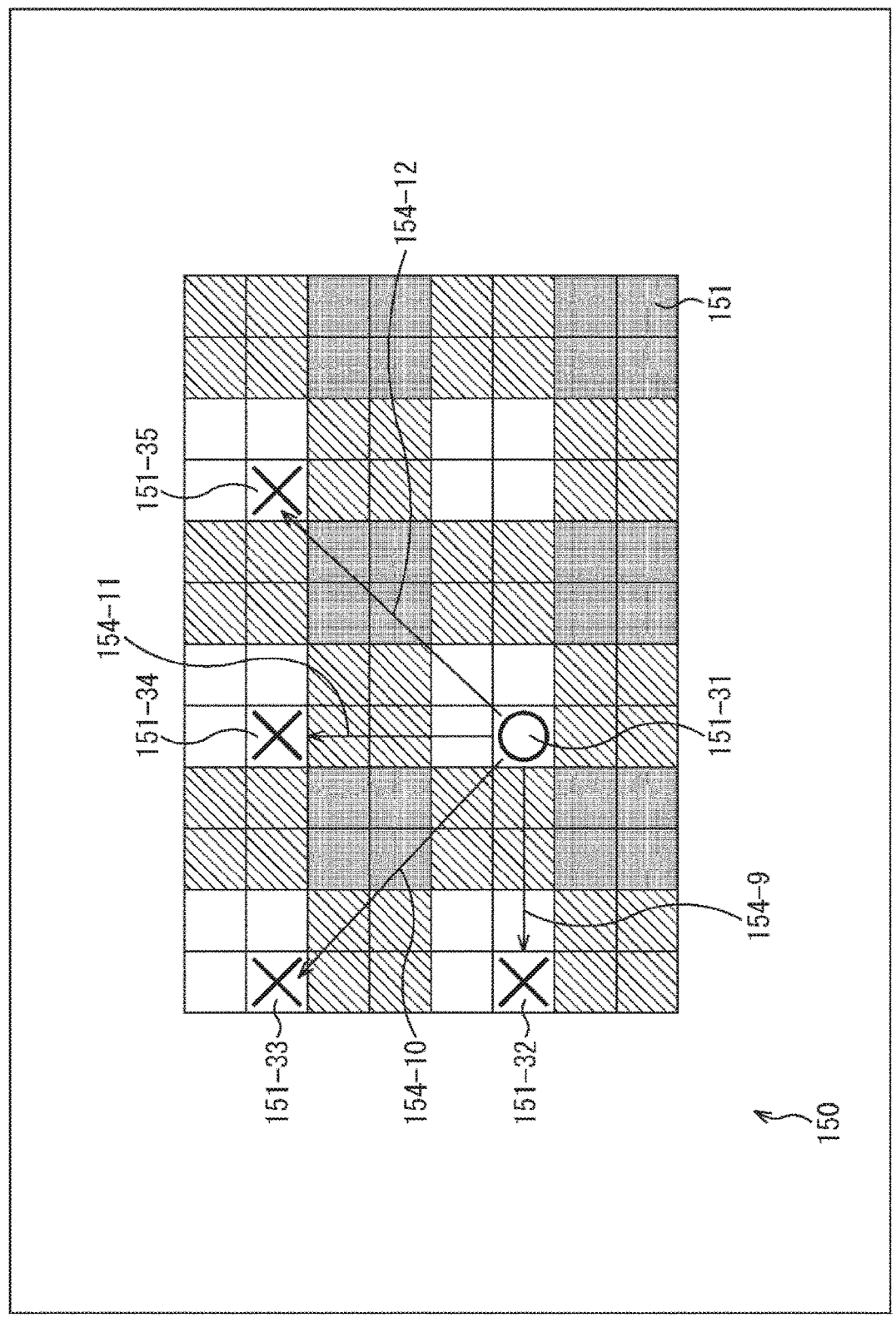
FIG. 25 is a diagram illustrating phase prediction of red pixels.

FIG. 25 illustrates an example of the peripheral pixels referred to in phase prediction when the pixel to be processed is a red pixel located in the lower-left corner of the block. In the example illustrated in FIG. 25, it is assumed that a pixel 151-31 located in the lower-left corner of the block constituted by red pixels is the pixel to be processed. For example, if the reference direction is left, as indicated by an arrow 154-9, the phase prediction unit 133 derives the prediction value for the pixel 151-31 by referring to a pixel 151-32. If the reference direction is upper-left, as indicated by an arrow 154-10, the phase prediction unit 133 derives the prediction value for the pixel 151-31 by referring to a pixel 151-33. If the reference direction is up, as indicated by an arrow 154-11, the phase prediction unit 133 derives the prediction value for the pixel 151-31 by referring to a pixel 151-34. If the reference direction is upper-right, as indicated by an arrow 154-12, the phase prediction unit 133 derives the prediction value for the pixel 151-31 by referring to a pixel 151-35.

Figure 26:
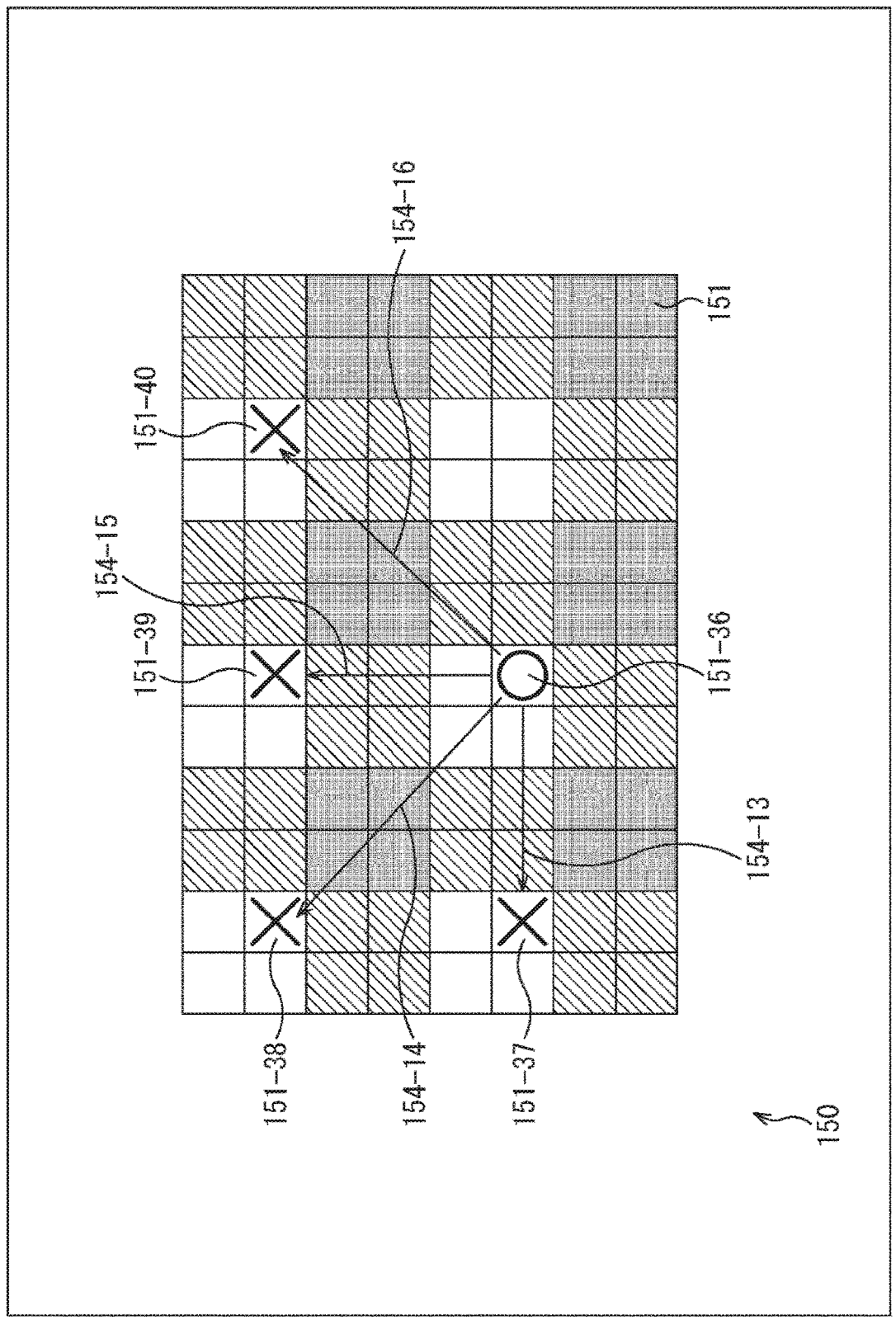
FIG. 26 is a diagram illustrating phase prediction of red pixels.

FIG. 26 illustrates an example of the peripheral pixels referred to in phase prediction when the pixel to be processed is a red pixel located in the lower-right corner of the block. In the example illustrated in FIG. 26, it is assumed that a pixel 151-36 located in the lower-right corner of the block constituted by red pixels is the pixel to be processed.

For example, if the reference direction is left, as indicated by an arrow 154-13, the phase prediction unit 133 derives the prediction value for the pixel 151-36 by referring to a pixel 151-37. If the reference direction is upper-left, as indicated by an arrow 154-14, the phase prediction unit 133 derives the prediction value for the pixel 151-36 by referring to a pixel 151-38. If the reference direction is up, as indicated by an arrow 154-15, the phase prediction unit 133 derives the prediction value for the pixel 151-36 by referring to a pixel 151-39. If the reference direction is upper-right, as indicated by an arrow 154-16, the phase prediction unit 133 derives the prediction value for the pixel 151-36 by referring to a pixel 151-40.

Note that the reference targets (the relative position from the pixel to be processed) for blue pixels are the same as for the red pixels described above, and will therefore not be described here.

The spatial prediction unit 132 and the phase prediction unit 133 derive the prediction value for the pixel to be processed using the pixel value of the peripheral pixel referred to as described above. Any derivation method may be used. For example, the spatial prediction unit 132 and the phase prediction unit 133 may use the pixel value of the peripheral pixel referred to as the prediction value for the pixel to be processed. Alternatively, the spatial prediction unit 132 and the phase prediction unit 133 may perform a predetermined operation on the pixel value of the peripheral pixel referred to, and use the result of the operation as the prediction value for the pixel to be processed. Alternatively, the spatial prediction unit 132 and the phase prediction unit 133 may use the same method to derive the prediction value for the pixel to be processed from the pixel value of the referenced peripheral pixel. Alternatively, the spatial prediction unit 132 and the phase prediction unit 133 may use different methods to derive the prediction value for the pixel to be processed from the pixel value of the referenced peripheral pixel.

The spatial prediction unit 132 and the phase prediction unit 133 may refer to a plurality of peripheral pixels. In addition, in the spatial prediction and the phase prediction, any pixels (pixels corresponding to each reference direction) can be used as candidates for reference, and are not limited to the examples described above. The referenced pixel positions described above are merely examples. In other words, pixels in different positions from the above-described examples may be referenced. In addition, the region of the peripheral image that can be referenced may be of any size, shape, and the like. In other words, the spatial prediction unit 132 and the phase prediction unit 133 may refer to any pixel as long as that pixel is a processed pixel.

Note also that the reference directions provided as candidates may be of any number and orientation, and are not limited to the four directions described above. For example, the prediction method may use eight directions, and images at intermediate angles may be generated through a filtering operation. Although not described in this example, a reference method such as "DC prediction", which does not have explicit directionality for the prediction directions and which uses the average value of nearby pixels, may be added.

<Reference Direction Setting Unit>

Figure 27:
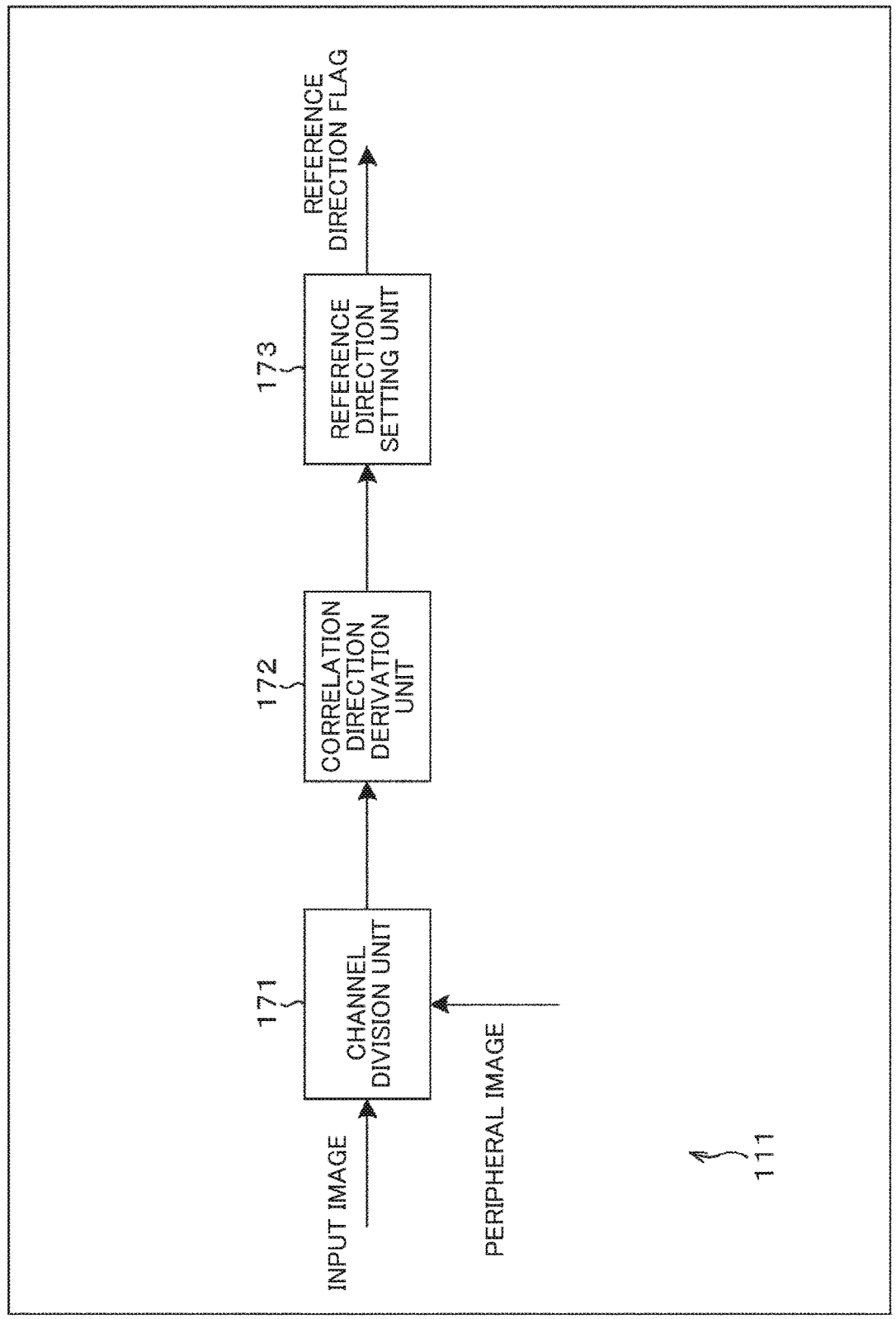
FIG. 27 is a block diagram illustrating an example of the main configuration of a reference direction setting unit.

The reference direction setting unit 111 will be described next. The reference direction setting unit 111 sets a reference direction, based on the pixel to be processed, for the peripheral pixel to be referenced when deriving a prediction value for the pixel to be processed. FIG. 27 is a block diagram illustrating an example of the main configuration of the reference direction setting unit 111. As illustrated in FIG. 27, the reference direction setting unit 111 includes a channel division unit 171, a correlation direction derivation unit 172, and a reference direction setting unit 173.

The channel division unit 171 obtains the input image and the peripheral image. The channel division unit 171 divides the input image and the peripheral image into channels and generates channel images. A "channel" is a type of pixel based on the position in the block and the filter (transmission wavelength characteristics). A "channel image" is an image constituted by pixels having identical channels. In other words, the channel image is constituted by pixel data having identical positions in the block and identical filters (transmission wavelength characteristics) as in the RAW image.

Figure 28:
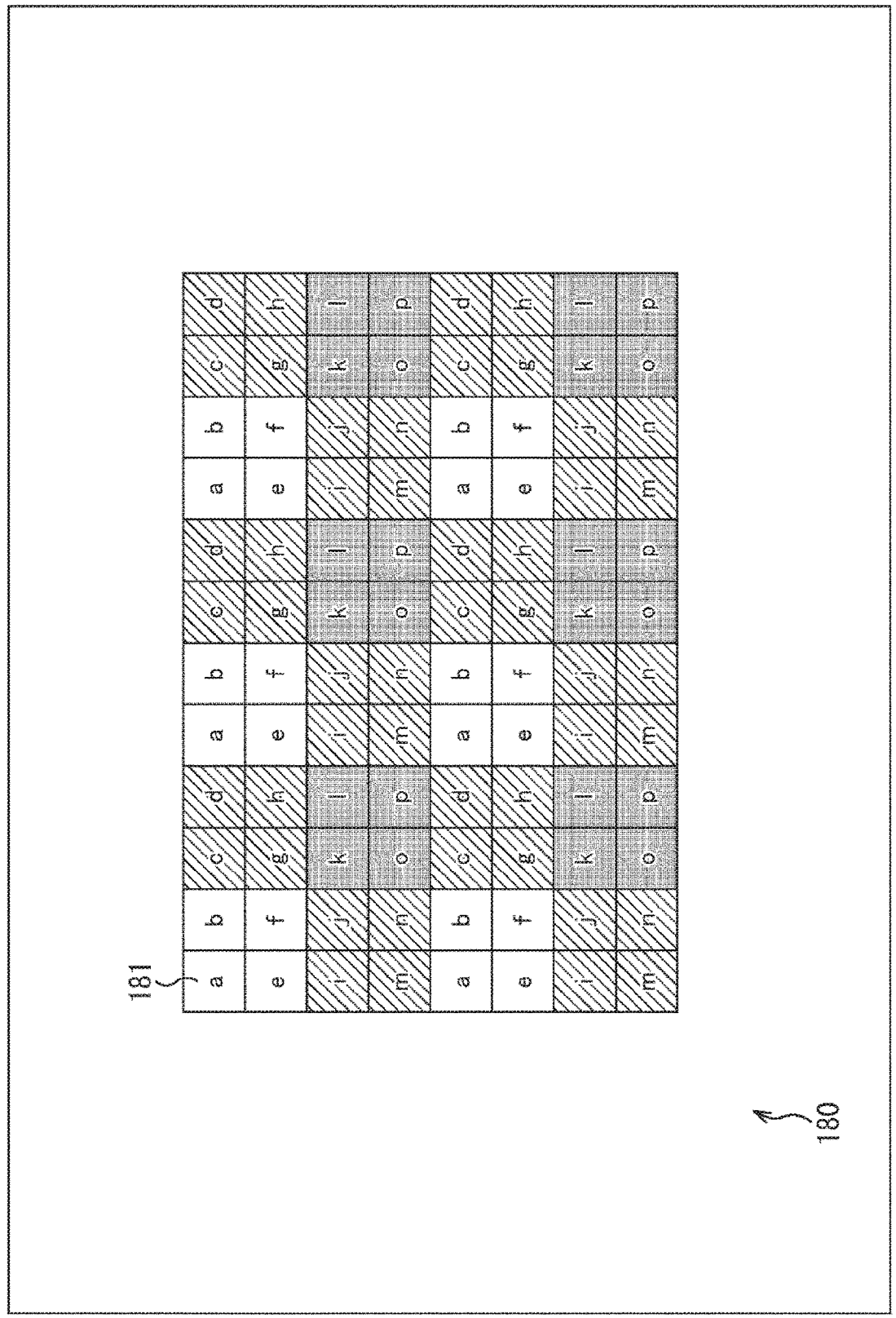
FIG. 28 is a diagram illustrating channel separation.
Figure 29:
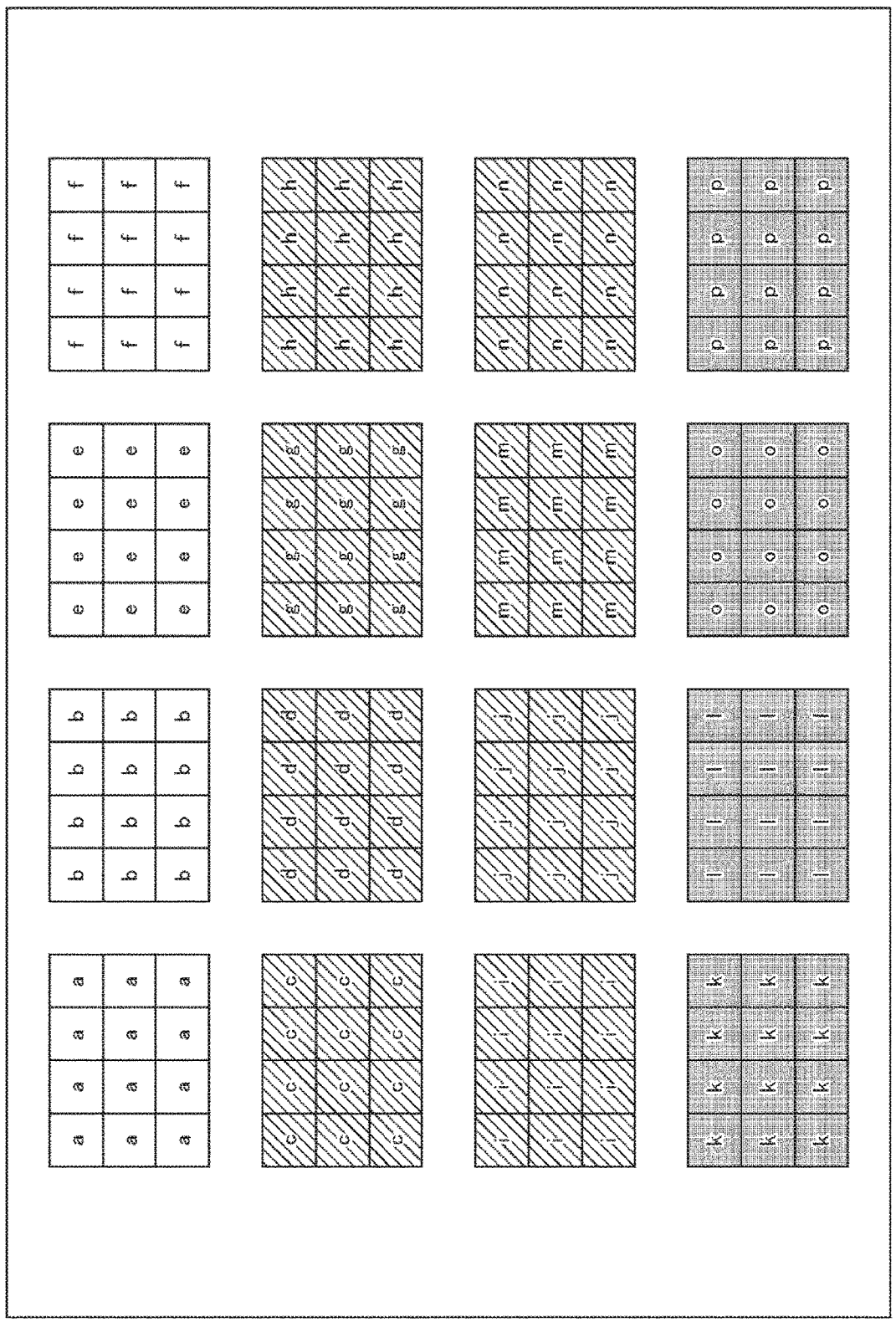
FIG. 29 is a diagram illustrating channel separation.

For example, in the case of a quad-configuration RAW image, such as a RAW image 180 illustrated in FIG. 28, a pixel 181 can be classified as one of 16 types of channels, from a to p, for each units of 4×4 pixels. The channel division unit 171 divides the quad-configuration RAW image, which is constituted by the input image and the peripheral image, into channels in this manner, and generates 16 channel images, as illustrated in FIG. 29, for example.

In other words, the channel division unit 171 can be said to be a generation unit that generates a channel image. The channel division unit 171 supplies the generated channel images to the correlation direction derivation unit 172.

The correlation direction derivation unit 172 uses the channel images supplied from the channel division unit 171 to derive a correlation direction, which is a direction of strong correlation between pixels. For example, the correlation direction derivation unit 172 applies a Sobel operator to the input channel images to measure changes in the image in the vertical and horizontal directions. The correlation direction derivation unit 172 then calculates a prediction method strongly correlated with the current pixel based on the result of the measurement.

Note that the Sobel operator may be applied to all the channel images, or only for some channels. The correlation direction derivation unit 172 may also determine which channel images to which the Sobel operator is to be applied in accordance with the amount of processing allowed by the image encoding device 100. The application of a Sobel operator is merely an example, and any method may be used to derive the correlation direction. The correlation direction derivation unit 172 may derive the correlation direction based on any index.

The correlation direction derivation unit 172 supplies correlation information indicating the derived correlation direction to the reference direction setting unit 173.

The reference direction setting unit 173 sets the reference direction using the correlation information. Any method may be used to set the reference direction.

For example, the reference direction setting unit 173 may set the reference direction taking into account the encoding efficiency, using the correlation information as a reference. The reference direction setting unit 173 generates the reference direction flag indicating the set reference direction. For example, if the options for the reference direction are four types, namely left, upper-left, up, and upper-right, the reference direction setting unit 173 generates a 2-bit reference direction flag. Of course, the reference direction flag may have any information amount (bit length). The reference direction setting unit 173 supplies the generated reference direction flag to the prediction method setting unit 112, the prediction unit 113, and the multiplexing unit 117.

<Prediction Method Setting Unit>

The prediction method setting unit 112 will be described next. The prediction method setting unit 112 the prediction method for the pixel to be processed in the image data generated by a pixel array in which blocks, each including a plurality of pixels adjacent to each other, are arranged in a predetermined pattern. For example, the prediction method setting unit 112 sets one of spatial prediction and phase prediction as the prediction method.

At this time, the prediction method setting unit 112 may set one of spatial prediction and phase prediction as the prediction method for the pixel to be processed based on a cost of each prediction method, as indicated in the second row from the top in FIG. 5 (Method 1-1).

For example, the prediction method setting unit 112 may derive a prediction value for each of spatial prediction and phase prediction, calculate a cost based on the derived prediction value, and set one of spatial prediction and phase prediction as the prediction method for the pixel to be processed based on the cost calculated for each prediction method, as indicated in the eighth row from the top in FIG. 5 (Method 1-1-2).

Figure 30:
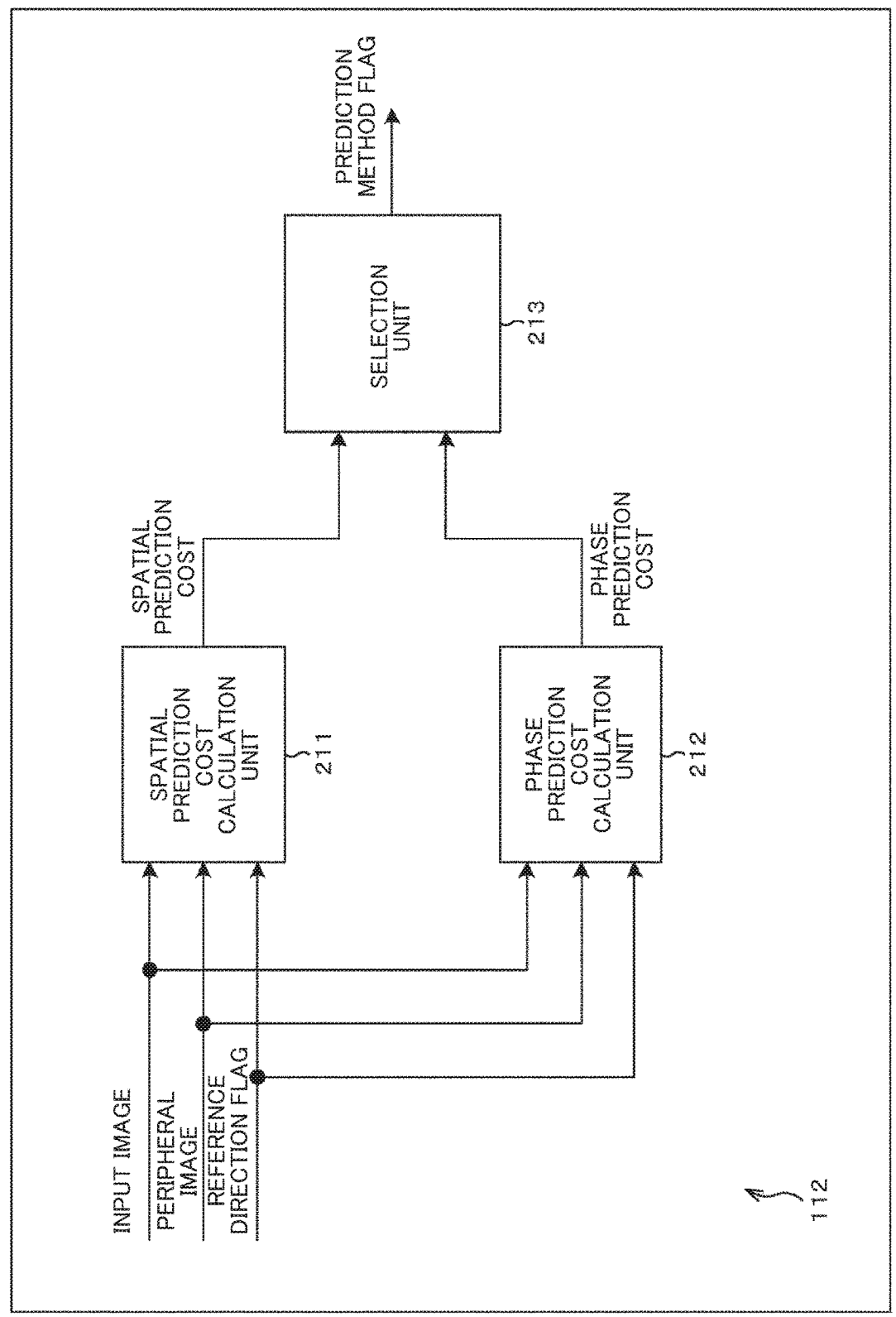
FIG. 30 is a block diagram illustrating an example of the main configuration of a prediction method setting unit.

FIG. 30 is a block diagram illustrating an example of the main configuration of the prediction method setting unit 112. As illustrated in FIG. 30, the prediction method setting unit 112 includes a spatial prediction cost calculation unit 211, a phase prediction cost calculation unit 212, and a selection unit 213.

The spatial prediction cost calculation unit 211 obtains the input image, the peripheral image, and the reference direction flag, and calculates a spatial prediction cost, which is the cost of spatial prediction, based thereon. The spatial prediction cost calculation unit 211 supplies the calculated spatial prediction cost to the selection unit 213.

The phase prediction cost calculation unit 212 obtains the input image, the peripheral image, and the reference direction flag, and calculates a phase prediction cost, which is the cost of phase prediction, based thereon. The phase prediction cost calculation unit 212 supplies the calculated phase prediction cost to the selection unit 213.

Based on the spatial prediction cost and phase prediction cost supplied, the selection unit 213 selects one of spatial prediction and phase prediction as the prediction method to be applied to the derivation of the prediction value for the pixel to be processed. The selection unit 213 generates the prediction method flag indicating the selected prediction method (spatial prediction or phase prediction). The selection unit 213 supplies the generated prediction method flag to the prediction unit 113 and the multiplexing unit 117.

<Spatial Prediction Cost Calculation Unit>

Figure 31:
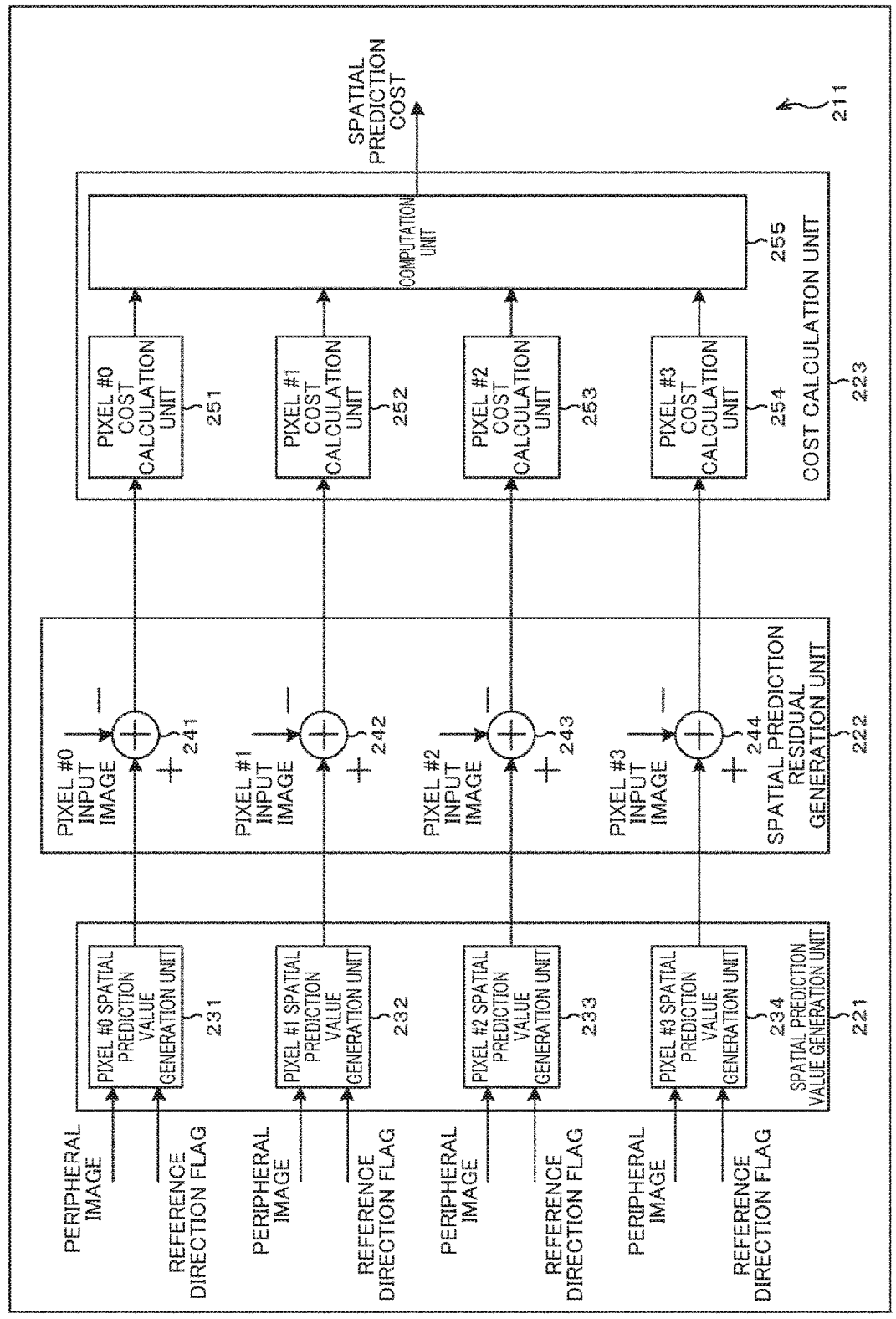
FIG. 31 is a block diagram illustrating an example of the main configuration of a spatial prediction cost calculation unit.

FIG. 31 illustrates an example of the main configuration of the spatial prediction cost calculation unit 211. In FIG. 31, the spatial prediction cost calculation unit 211 includes a spatial prediction value generation unit 221, a spatial prediction residual generation unit 222, and a cost calculation unit 223.

For each pixel in the block, the spatial prediction value generation unit 221 performs spatial prediction using the peripheral image and the reference direction flag, and generates a prediction value (spatial prediction value) for the pixel to be processed. The spatial prediction value generation unit 221 generates the spatial prediction value using the same method as the spatial prediction unit 132. Note that the spatial prediction value generation unit 221 may perform the spatial prediction using additional information indicating the direction of an edge or the like. The spatial prediction value generation unit 221 supplies the generated spatial prediction value to the spatial prediction residual generation unit 222.

For each pixel in the block, the spatial prediction residual generation unit 222 subtracts the spatial prediction value from the input image, and generates a prediction residual (also called a "spatial prediction residual"). The spatial prediction residual generation unit 222 supplies the generated spatial prediction residual to the cost calculation unit 223.

For each pixel in the block, the cost calculation unit 223 calculates the spatial prediction cost using the supplied spatial prediction residual, and calculates the spatial prediction cost based on the cost of each pixel. Any method may be used to calculate the cost. For example, the cost calculation unit 223 may calculate the sum of the absolute values of the prediction residuals (L1 norm) as the cost, or the sum of the squares of the prediction residuals (L2 norm) as the cost, as indicated in the ninth row from the top of the table in FIG. 5 (Method 1-1-2-1). Furthermore, the cost calculation unit 223 may calculate a non-zero residual number (L0 norm) as the cost. The cost calculation unit 223 supplies the calculated spatial prediction cost to the selection unit 213.

For example, if the block is constituted by four pixels (pixel #0, pixel #1, pixel #2, and pixel #3) in a 2×2 arrangement, the spatial prediction value generation unit 221 has a pixel #0 spatial prediction value generation unit 231, a pixel #1 spatial prediction value generation unit 232, a pixel #2 spatial prediction value generation unit 233, and a pixel #3 spatial prediction value generation unit 234. The spatial prediction residual generation unit 222 also has a computation unit 241, a computation unit 242, a computation unit 243, and a computation unit 244. Furthermore, the cost calculation unit 223 has a pixel #0 cost calculation unit 251, a pixel #1 cost calculation unit 252, a pixel #2 cost calculation unit 253, a pixel #3 cost calculation unit 254, and a computation unit 255.

In this case, the pixel #0 spatial prediction value generation unit 231 generates the spatial prediction value for pixel #0, the computation unit 241 derives the spatial prediction residual for pixel #0, and the pixel #0 cost calculation unit 251 calculates the cost for pixel #0. Likewise, the pixel #1 spatial prediction value generation unit 232 generates the spatial prediction value for pixel #1, the computation unit 242 derives the spatial prediction residual for pixel #1, and the pixel #1 cost calculation unit 252 calculates the cost for pixel #1. Likewise, the pixel #2 spatial prediction value generation unit 233 generates the spatial prediction value for pixel #2, the computation unit 243 derives the spatial prediction residual for pixel #2, and the pixel #2 cost calculation unit 253 calculates the cost for pixel #2. Likewise, the pixel #3 spatial prediction value generation unit 234 generates the spatial prediction value for pixel #3, the computation unit 244 derives the spatial prediction residual for pixel #3, and the pixel #3 cost calculation unit 254 calculates the cost for pixel #3. The computation unit 255 then calculates the spatial prediction cost based on the costs for pixel #0 to pixel #3.

<Phase Prediction Cost Calculation Unit>

Figure 32:
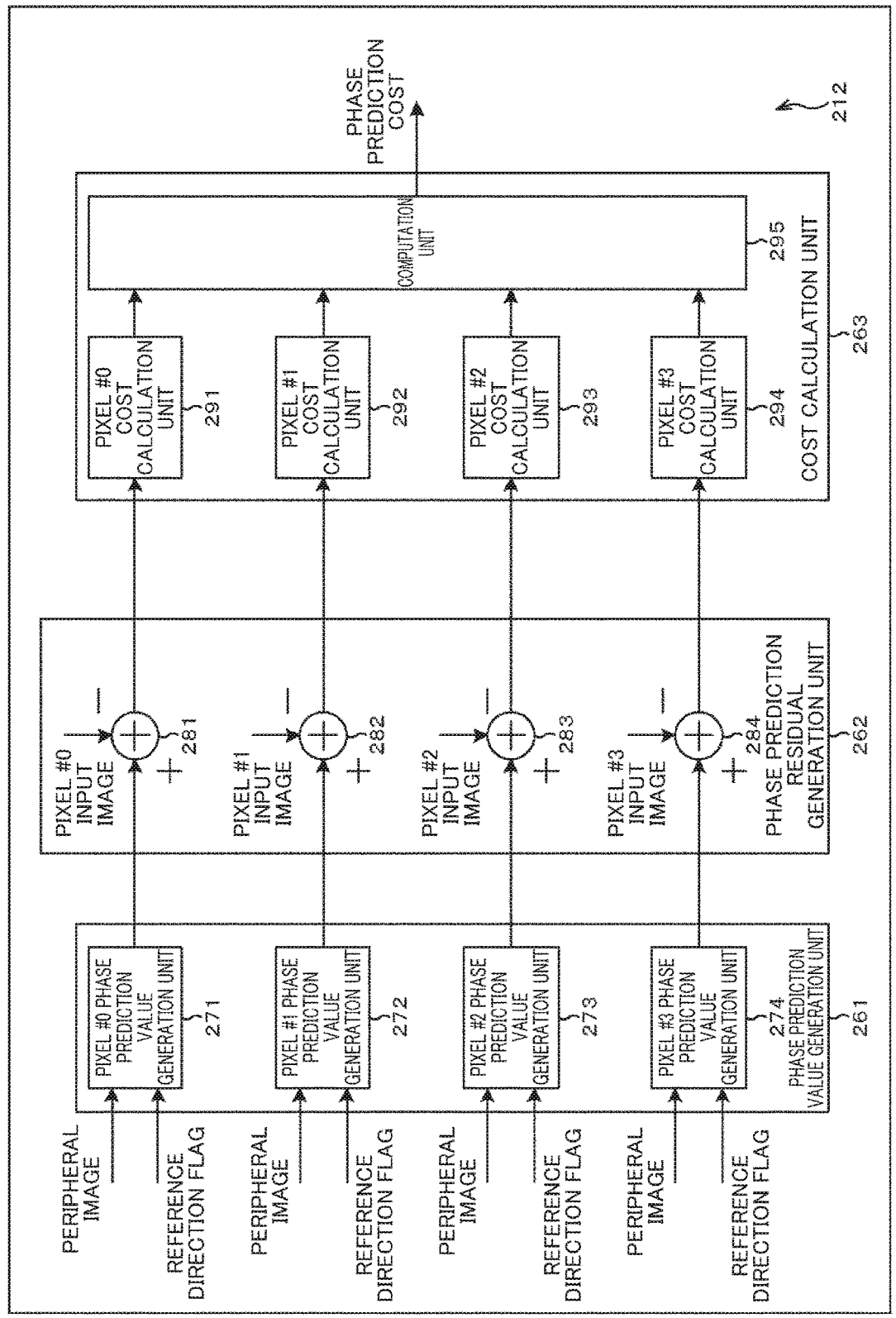
FIG. 32 is a block diagram illustrating an example of the main configuration of a phase prediction cost calculation unit.

FIG. 32 illustrates an example of the main configuration of the phase prediction cost calculation unit 212. In FIG. 32, the phase prediction cost calculation unit 212 includes a phase prediction value generation unit 261, a phase prediction residual generation unit 262, and a cost calculation unit 263.

For each pixel in the block, the phase prediction value generation unit 261 performs phase prediction using the peripheral image and the reference direction flag, and generates a prediction value (phase prediction value) for the pixel to be processed. The phase prediction value generation unit 261 generates the phase prediction value using the same method as the phase prediction unit 133. Note that the phase prediction value generation unit 261 may perform the phase prediction using additional information indicating the direction of an edge or the like. The phase prediction value generation unit 261 supplies the generated phase prediction value to the phase prediction residual generation unit 262.

For each pixel in the block, the phase prediction residual generation unit 262 subtracts the phase prediction value from the input image, and generates a prediction residual (also called a "phase prediction residual"). The phase prediction residual generation unit 262 supplies the generated phase prediction residual to the cost calculation unit 263.

For each pixel in the block, the cost calculation unit 263 calculates the phase prediction cost using the supplied phase prediction residual, and calculates the phase prediction cost based on the cost of each pixel. Any method may be used to calculate the cost. For example, the cost calculation unit 263 may calculate the sum of the absolute values of the prediction residuals (L1 norm) as the cost, or the sum of the squares of the prediction residuals (L2 norm) as the cost, as indicated in the ninth row from the top of the table in FIG. 5 (Method 1-1-2-1). Furthermore, the cost calculation unit 263 may calculate a non-zero residual number (L0 norm) as the cost. The cost calculation unit 263 supplies the calculated phase prediction cost to the selection unit 213.

For example, if the block is constituted by four pixels (pixel #0, pixel #1, pixel #2, and pixel #3) in a 2×2 arrangement, the phase prediction value generation unit 261 has a pixel #0 phase prediction value generation unit 271, a pixel #1 phase prediction value generation unit 272, a pixel #2 phase prediction value generation unit 273, and a pixel #3 phase prediction value generation unit 274. The phase prediction residual generation unit 262 also has a computation unit 281, a computation unit 282, a computation unit 283, and a computation unit 284. Furthermore, the cost calculation unit 263 has a pixel #0 cost calculation unit 291, a pixel #1 cost calculation unit 292, a pixel #2 cost calculation unit 293, a pixel #3 cost calculation unit 294, and a computation unit 295.

In this case, the pixel #0 phase prediction value generation unit 271 generates the phase prediction value for pixel #0, the computation unit 281 derives the phase prediction residual for pixel #0, and the pixel #0 cost calculation unit 291 calculates the cost for pixel #0. Likewise, the pixel #1 phase prediction value generation unit 272 generates the phase prediction value for pixel #1, the computation unit 282 derives the phase prediction residual for pixel #1, and the pixel #1 cost calculation unit 292 calculates the cost for pixel #1. Likewise, the pixel #2 phase prediction value generation unit 273 generates the phase prediction value for pixel #2, the computation unit 283 derives the phase prediction residual for pixel #2, and the pixel #2 cost calculation unit 293 calculates the cost for pixel #2. Likewise, the pixel #3 phase prediction value generation unit 274 generates the phase prediction value for pixel #3, the computation unit 284 derives the phase prediction residual for pixel #3, and the pixel #3 cost calculation unit 294 calculates the cost for pixel #3. The computation unit 295 then calculates the phase prediction cost based on the costs for pixel #0 to pixel #3.

<Other Example of Spatial Prediction Cost Calculation Unit>

Figure 33:
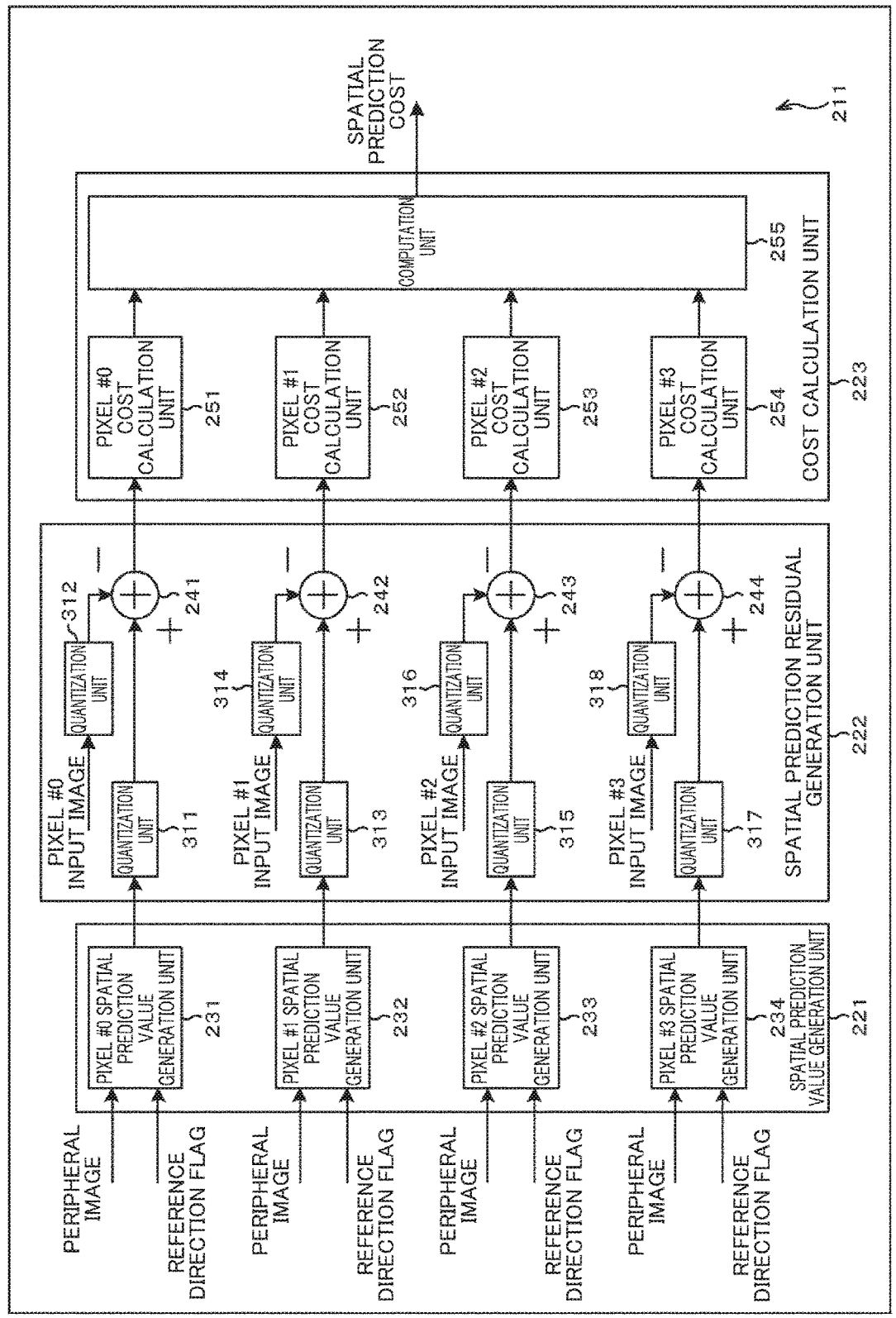
FIG. 33 is a block diagram illustrating an example of the main configuration of a spatial prediction cost calculation unit.

Note that the prediction method setting unit 112 may quantize the derived prediction value, and calculate the cost based on the quantized prediction value. FIG. 33 illustrates an example of the main configuration of the spatial prediction cost calculation unit 211 in this case. In this case, the spatial prediction residual generation unit 222 of the spatial prediction cost calculation unit 211 quantizes the prediction value and the input image, respectively, and generates the spatial prediction residual using the quantized prediction value and input image.

For example, as illustrated in FIG. 33, the spatial prediction residual generation unit 222 includes quantization units 311 to 318 in addition to the configuration illustrated in FIG. 31. The quantization unit 311, the quantization unit 313, the quantization unit 315, and the quantization unit 317 quantize the spatial prediction value for respective pixels (pixel #0 to pixel #3). The quantization unit 312, the quantization unit 314, the quantization unit 316, and the quantization unit 318 quantize the input image for respective pixels (pixel #0 to pixel #3). For each pixel, the computation units 241 to 244 subtract the quantized prediction value from the quantized input image, and generate a spatial prediction residual.

The cost calculation unit 223 calculates the spatial prediction cost based on the spatial prediction residual. Doing so makes it possible for the spatial prediction cost calculation unit 211 to calculate the spatial prediction cost taking quantization into account.

In this case, too, any method may be used to calculate the cost. For example, the cost calculation unit 223 may calculate the sum of the absolute values of the quantized prediction residuals (L1 norm) as the cost, or the sum of the squares of the quantized prediction residuals (L2 norm) as the cost, as indicated in the tenth row from the top of the table in FIG. 5 (Method 1-1-2-2). Furthermore, the cost calculation unit 223 may calculate a non-zero residual number (L0 norm) as the cost.

Additionally, for example, the cost calculation unit 223 may calculate a generated bit amount (generated code amount) corresponding to the quantized prediction residual as the cost, as indicated in the eleventh row from the top of the table in FIG. 5 (Method 1-1-2-3). Additionally, the cost calculation unit 223 may inverse-quantize the quantized prediction residual, and calculate the difference from the input image as the cost. Furthermore, for example, the cost calculation unit 223 may calculate an RD cost corresponding to the quantized prediction residual, as indicated in the twelfth row from the top of the table in FIG. 5 (Method 1-1-2-4). In this case, the cost calculation unit 223 may calculate the generated bit amount (generated code amount) corresponding to the quantized prediction residual, inverse-quantize the quantized prediction residual, calculate the difference from the input image, and then use the result to calculate the RD cost (Rate+λD).

<Other Example of Phase Prediction Cost Calculation Unit>

Figure 34:
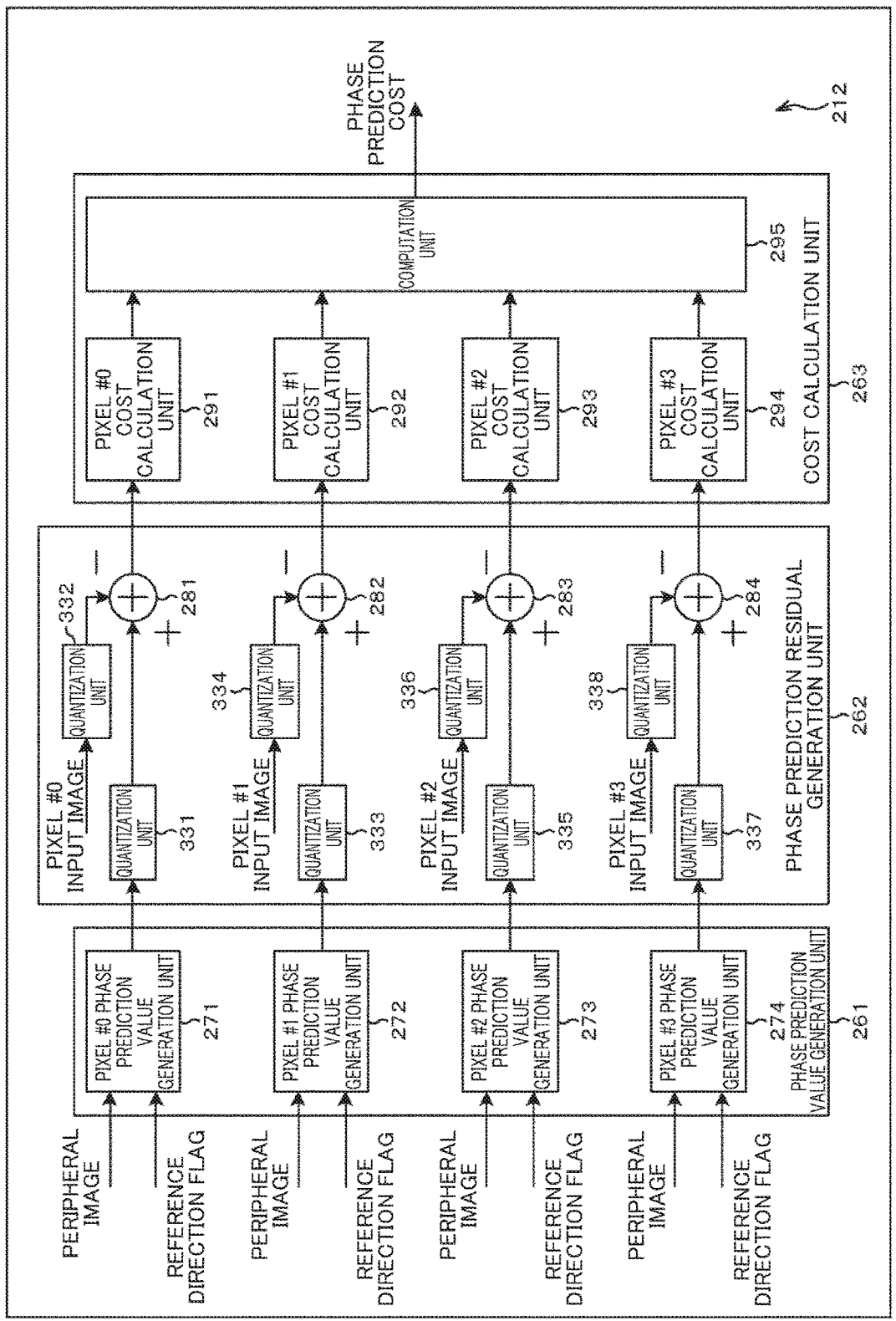
FIG. 34 is a block diagram illustrating an example of the main configuration of a phase prediction cost calculation unit.

FIG. 34 illustrates an example of the main configuration of the phase prediction cost calculation unit 212 in this case. In this case, the phase prediction residual generation unit 262 of the phase prediction cost calculation unit 212 quantizes the prediction value and the input image, respectively, and generates the phase prediction residual using the quantized prediction value and input image.

For example, as illustrated in FIG. 34, the phase prediction residual generation unit 262 includes quantization units 331 to 338 in addition to the configuration illustrated in FIG. 32. The quantization unit 331, the quantization unit 333, the quantization unit 335, and the quantization unit 337 quantize the phase prediction value for respective pixels (pixel #0 to pixel #3). The quantization unit 332, the quantization unit 334, the quantization unit 336, and the quantization unit 338 quantize the input image for respective pixels (pixel #0 to pixel #3). For each pixel, the computation units 281 to 284 subtract the quantized prediction value from the quantized input image, and generate a phase prediction residual.

The cost calculation unit 263 calculates the phase prediction cost based on the phase prediction residual. Doing so makes it possible for the phase prediction cost calculation unit 212 to calculate the phase prediction cost taking quantization into account.

In this case, too, any method may be used to calculate the cost. For example, the cost calculation unit 263 may calculate the sum of the absolute values of the quantized prediction residuals (L1 norm) as the cost, or the sum of the squares of the quantized prediction residuals (L2 norm) as the cost, as indicated in the tenth row from the top of the table in FIG. 5 (Method 1-1-2-2). Furthermore, the cost calculation unit 263 may calculate a non-zero residual number (L0 norm) as the cost.

Additionally, for example, the cost calculation unit 263 may calculate a generated bit amount (generated code amount) corresponding to the quantized prediction residual as the cost, as indicated in the eleventh row from the top of the table in FIG. 5 (Method 1-1-2-3). Additionally, the cost calculation unit 263 may inverse-quantize the quantized prediction residual, and calculate the difference from the input image as the cost. Furthermore, for example, the cost calculation unit 263 may calculate an RD cost corresponding to the quantized prediction residual, as indicated in the twelfth row from the top of the table in FIG. 5 (Method 1-1-2-4). In this case, the cost calculation unit 263 may calculate the generated bit amount (generated code amount) corresponding to the quantized prediction residual, inverse-quantize the quantized prediction residual, calculate the difference from the input image, and then use the result to calculate the RD cost (Rate+λD).

<Other Example of Calculation of Spatial Prediction Cost and Phase Prediction Cost>

Note that any method may be used by the prediction method setting unit 112 to calculate the cost, and the method is not limited to the example described above. For example, the cost may be calculated in a simple manner using the pixel values of the peripheral pixels, as indicated in the thirteenth row from the top of the table in FIG. 5 (Method 1-1-3). In other words, the cost may be calculated through a method different from the actual prediction value derivation method. For example, the prediction method setting unit 112 may calculate a cost based on a correlation between peripheral pixels located in the periphery of the pixel to be processed for both spatial prediction and phase prediction, and set one of spatial prediction and phase prediction as the prediction method for the pixel to be processed based on the cost calculated for each prediction method (the spatial prediction cost and the phase prediction cost).

In this case, for example, the prediction method setting unit 112 may calculate the spatial prediction cost based on a correlation between pixels in the block, and calculate the phase prediction cost based on a correlation between pixels at the same location in the block as each other, as indicated in the fourteenth row from the top of the table in FIG. 5 (Method 1-1-3-1).

Figure 35:
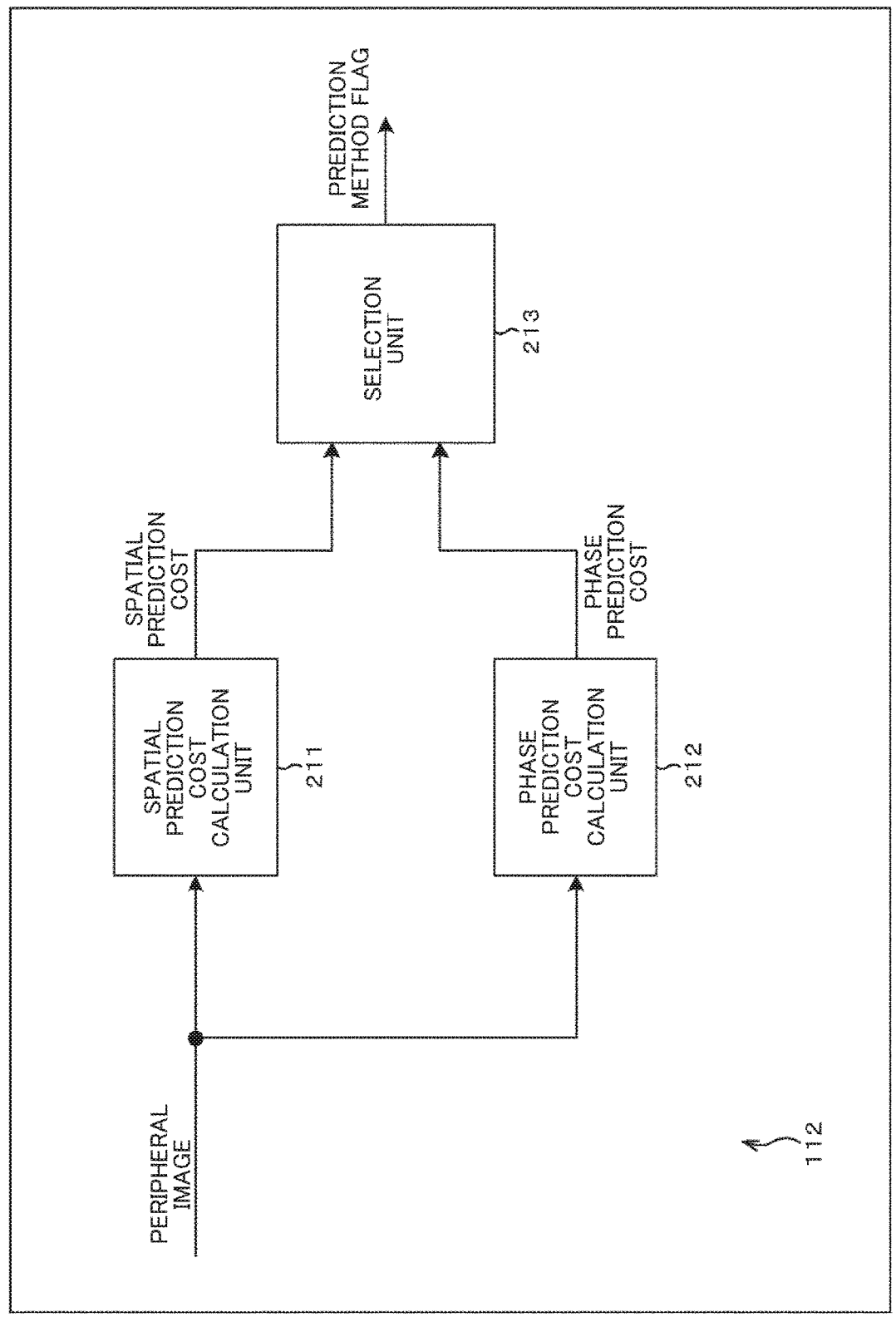
FIG. 35 is a block diagram illustrating an example of the main configuration of a prediction method setting unit.

In this case, the prediction method setting unit 112 obtains only the peripheral image (that is, the input image and the reference direction flag need not be obtained), as illustrated in FIG. 35. In other words, the spatial prediction cost calculation unit 211 obtains the peripheral image and calculates the spatial prediction cost based on a correlation between pixels in the block in the peripheral image. Additionally, the phase prediction cost calculation unit 212 obtains the peripheral image and calculates the phase prediction cost based on a correlation between pixels in the block in the peripheral image.

Figure 36:
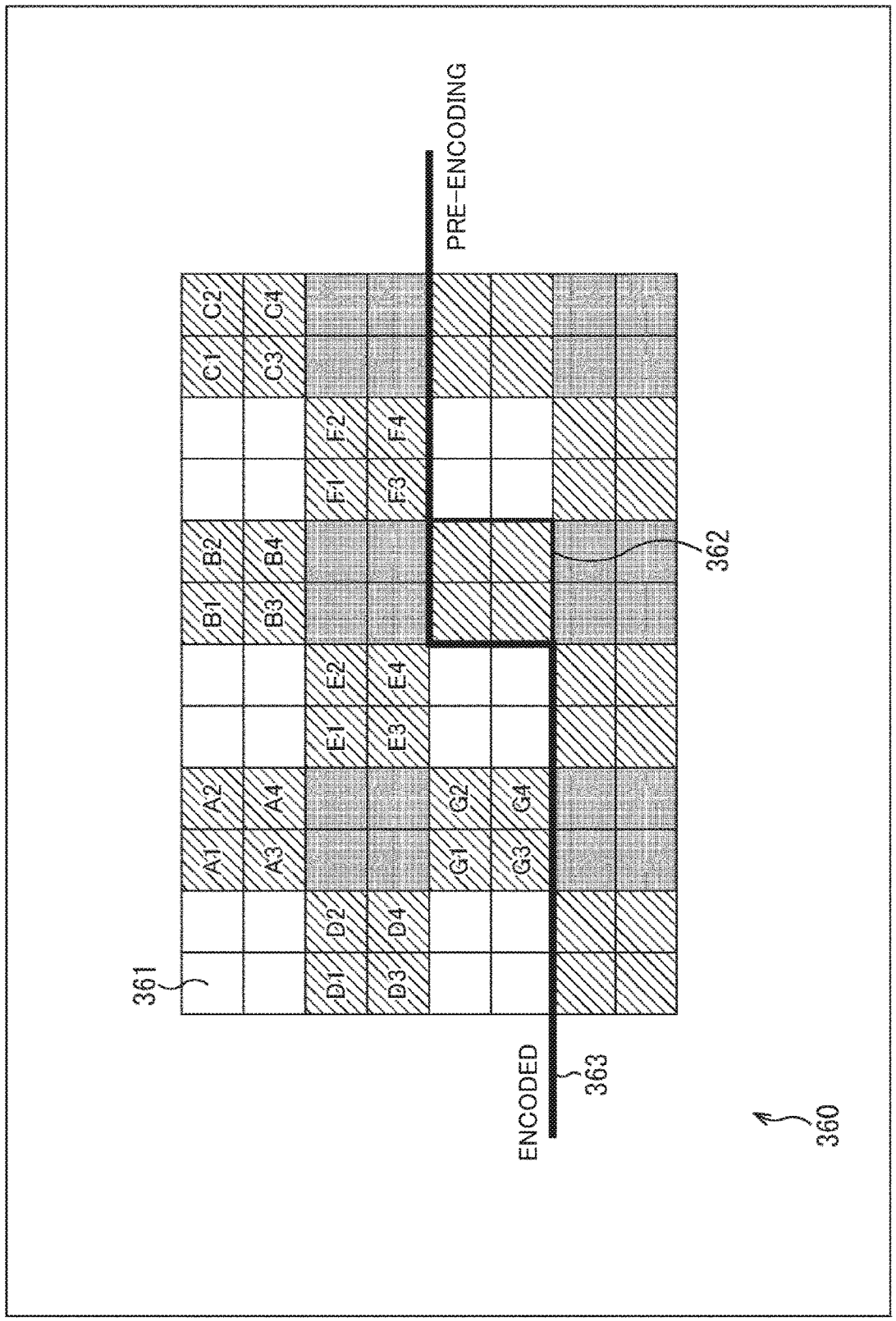
FIG. 36 is a diagram illustrating cost calculation based on correlation between peripheral pixels.

For example, assume that in a RAW image 360 illustrated in FIG. 36, pixels 361 (a green pixel) in a block 362 are to be processed. In this case, the prediction method setting unit 112 obtains the region above the bold line 363 as the peripheral image. Note that the pixels 361 above the bold line 363 are processed pixels (pixels which have been processed before the pixels in the block 362). In other words, in the figure, the pixels 361 indicated by A1 to A4, B1 to B4, C1 to C4, D1 to D4, E1 to E4, and F1 to F4 are all processed green pixels.

The calculation of the spatial prediction cost will be described next. Because the block 362 to be processed is a block constituted by green pixels, the spatial prediction cost calculation unit 211 calculates the spatial prediction cost based on the correlation between the pixels 361 in the blocks constituted by green pixels indicated by hatching. In other words, the spatial prediction cost calculation unit 211 first measures the magnitude of the correlation between pixel values in the block. Any method may be used to calculate the correlation value. For example, variance within the 2×2 pixels may be used. For example, the spatial prediction cost calculation unit 211 calculates a spatial correlation value $C_A$ of the 2×2 pixels constituted by A1, A2, A3, and A4, as indicated by the following Formula (1).

[Math. 1]

$$C_A = \sqrt{\frac{1}{4} \cdot (A_1^2 + A_2^2 + A_3^2 + A_4^2) - \left(\frac{1}{4} \cdot (A_1 + A_2 + A_3 + A_4)\right)^2} \quad (1)$$

Likewise, the spatial prediction cost calculation unit 211 calculates correlation values $C_B$, $C_C$, $C_D$, $C_E$, $C_F$, and $C_G$ of the 2×2 blocks Bn, Cn, Dn, En, Fn, and Gn in the periphery. The spatial prediction cost calculation unit 211 obtains a minimum value thereof and takes that value as a spatial correlation value $C_{spatial}$ of the peripheral image, as indicated by the following Formula (2).

[Math. 2]

$$C_{spatial} = \min(C_A, C_B, C_C, C_D, C_E, C_F, C_G) \quad (2)$$

Although the standard deviation within the 2×2 unit is used here to find the spatial correlation value $C_A$, the value can be freely set, such as the variance, the absolute sum of the differences between adjacent pixels, the maximum value among the difference values between the average of the 2×2 pixels and each pixel value, or the like.

The spatial correlation value $C_{spatial}$ of the peripheral image may be any value, and may be a value aside from the minimum value of the peripheral blocks. For example, the average value, the maximum value, or the like of the peripheral blocks may be used as the spatial correlation value $C_{spatial}$ of the peripheral image.

Additionally, the blocks to be referenced need not adhere to the present example, and the reference range may be set freely. In an extreme example, a result $C_E$ for the spatial correlation value calculated using a specific 2×2 block set in advance (e.g., E1, E2, E3, and E4) may be used as the spatial correlation value $C_{spatial}$ of the peripheral image.

The spatial prediction cost calculation unit 211 calculates a spatial prediction cost $\text{Cost}_{spatial}$ by applying a predetermined correction value to the spatial correlation value $C_{spatial}$ calculated as described above. For example, the spatial prediction cost calculation unit 211 calculates the spatial prediction cost $\text{Cost}_{spatial}$ as indicated by the following Formula (3).

[Math. 3]
$$\text{Cost}_{spatial} = \alpha \cdot C_{spatial}^{\beta} + \gamma \tag{3}$$

In Formula (3), α, β, and γ are parameters set as appropriate for phase correlation and comparison, and the values thereof can be set as desired. The values may be α=1, β=1, and γ=0, for example.

The calculation of the phase prediction cost will be described next. Because the block 362 to be processed is a block constituted by green pixels, the phase prediction cost calculation unit 212 calculates the phase prediction cost based on the correlation between the same phases among blocks constituted by green pixels, indicated by hatching. In other words, the phase prediction cost calculation unit 212 first measures the similarity of pixels having the same phase between adjacent 2×2 blocks. Any method may be used to calculate the correlation value. For example, a phase correlation value $C_{A,B}$ between the 2×2 pixels constituted by A1, A2, A3, and A4, and the 2×2 pixels constituted by B1, B2, B3, and B4, can be calculated through the following Formula (4).

[Math. 4]
$$C_{A,B} = \frac{1}{4} \cdot \sum_{i=0}^{3} |A_i - B_i| \tag{4}$$

The phase prediction cost calculation unit 212 performs a similar computation among the peripheral 2×2 blocks. The phase prediction cost calculation unit 212 obtains a minimum value thereof and takes that value as a phase correlation value $C_{channel}$ of the peripheral image, as indicated by the following Formula (5).

[Math. 5]
$$C_{channel} = \min(C_{A,B}, C_{B,C}, C_{D,E}, C_{E,F}, C_{E,G}) \tag{5}$$

Although the foregoing describes using the sum of the absolute value of the differences between the 2×2 blocks, other indicators indicating a correlation, such as the sum of differences squared, a normalized correlation value, or the like can be substituted. The phase correlation value $C_{channel}$ of the peripheral image may be any value, and may be a value aside from the minimum value of the peripheral blocks. For example, the average value, the maximum value, or the like of the peripheral blocks may be used as the phase correlation value $C_{channel}$ of the peripheral image. Additionally, the blocks to be referenced need not adhere to the present example, and the reference range may be set freely. In an extreme example, a result $C_{E,G}$ for the spatial correlation value calculated using specific 2×2 blocks set in advance (e.g., G1, G2, G3, and G4, and E1, E2, E3, and E4) may be used as the phase correlation value $C_{channel}$ of the peripheral image.

The phase prediction cost calculation unit 212 calculates a phase prediction cost $\text{Cost}_{channel}$ by applying a predetermined correction value to the phase correlation value $C_{channel}$ calculated as described above. For example, the phase prediction cost calculation unit 212 calculates the phase prediction cost $\text{Cost}_{channel}$ as indicated by the following Formula (6).

[Math. 6]
$$\text{Cost}_{channel} = \alpha \cdot C_{channel}^{\beta} + \gamma \tag{6}$$

Although the foregoing has described a case where the pixel to be processed is a green pixel, when the pixel to be processed is a red pixel, a blue pixel, or the like, the cost may be calculated in the same manner using peripheral pixels of the same color. For example, when the pixel to be processed is a red pixel, the spatial prediction cost calculation unit 211 may calculate the spatial prediction cost based on the correlation between pixels in the blocks constituted by red pixels, and the phase prediction cost calculation unit 212 may calculate the phase prediction cost based on a correlation between pixels at the same locations in the blocks, among the blocks constituted by red pixels. Likewise, when the pixel to be processed is a blue pixel, the spatial prediction cost calculation unit 211 may calculate the spatial prediction cost based on the correlation between pixels in the blocks constituted by blue pixels, and the phase prediction cost calculation unit 212 may calculate the phase prediction cost based on a correlation between pixels at the same locations in the blocks, among the blocks constituted by blue pixels.

<Selection Unit>

Figure 37B:
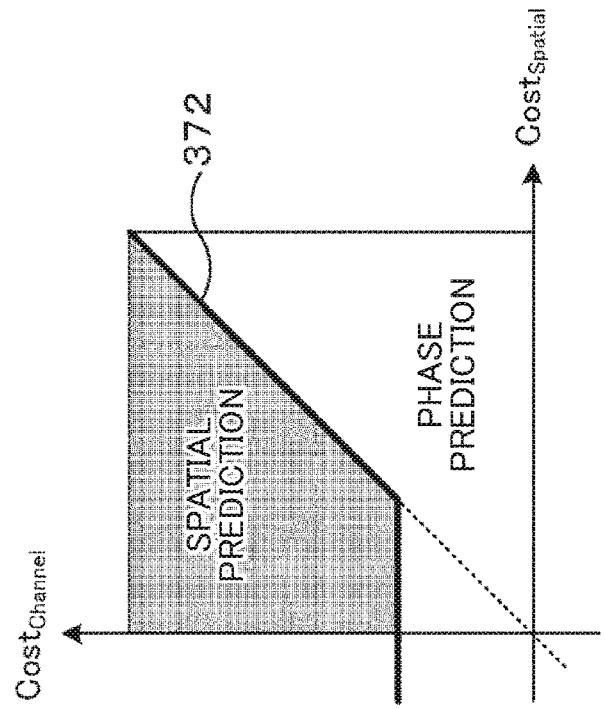
FIGS. 37A and 37B are diagrams illustrating prediction method selection.
Figure 37A:
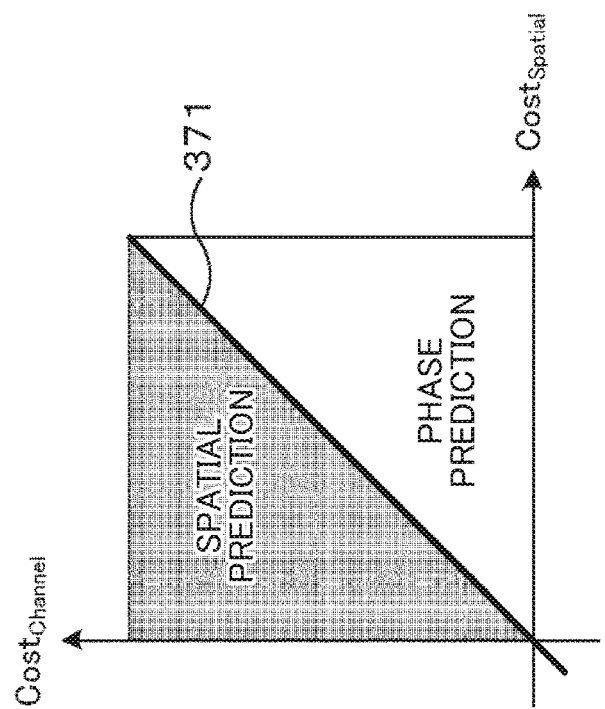

Based on the spatial prediction cost and phase prediction cost supplied, the selection unit 213 selects one of spatial prediction and phase prediction as the prediction method to be applied to the derivation of the prediction value for the pixel to be processed. At this time, the selection unit 213 may select the prediction method having the lower cost, for example, as indicated in the fourth row from the top of the table in FIG. 5 (Method 1-1-1). In other words, the prediction method setting unit 112 may set the prediction method, among spatial prediction and phase prediction, that has the lower cost as the prediction method for the pixel to be processed. For example, in the graph illustrated in FIG. 37A, if the point of intersection between the spatial prediction cost and the phase prediction cost is located in the region above the line 371, the selection unit 213 selects spatial prediction. If the point of intersection between the spatial prediction cost and the phase prediction cost is located in the region below the line 371, the selection unit 213 selects phase prediction.

Additionally, the selection unit 213 may select a predetermined prediction method when the cost of each prediction method is sufficiently low, for example, as indicated in the fifth row from the top of the table in FIG. 5 (Method 1-1-1-1). In other words, when the spatial prediction cost and the phase prediction cost are both sufficiently low, the prediction method setting unit 112 may set a predetermined one of spatial prediction and phase prediction as the prediction method for the pixel to be processed. For example, if both the spatial prediction cost and the phase prediction cost are less than a predetermined threshold, a predetermined prediction method (phase prediction, in this case) may be selected, as in the graph illustrated in FIG. 37B. Of course, spatial prediction may be selected. In other words, in this case, if the point of intersection between the spatial prediction cost and the phase prediction cost is located in the region above the curve 372, the selection unit 213 selects spatial prediction. If the point of intersection between the spatial prediction cost and the phase prediction cost is located in the region below the curve 372, the selection unit 213 selects phase prediction.

Using such a selection method can be anticipated to provide an effect such as suppressing subjective points of discontinuity arising due to the prediction by matching the neighboring blocks with prediction methods, in cases where both types of prediction can be expected to provide high efficiency compression.

<Unit of Selection>

The selection of the prediction method described above may be performed at any desired timing. For example, the prediction method setting unit 112 may select the prediction method every desired unit of data, as indicated in the sixteenth row from the top of the table in FIG. 5 (Method 1-2).

For example, the prediction method setting unit 112 may select the prediction method every predetermined region in a frame, as indicated in the seventeenth row from the top of the table in FIG. 5 (Method 1-2-1).

Alternatively, for example, the prediction method setting unit 112 may select the prediction method every frame, as indicated in the eighteenth row from the top of the table in FIG. 5 (Method 1-2-2).

Furthermore, for example, the unit of data for selecting the prediction method may be switched, as indicated in the nineteenth row from the top of the table in FIG. 5 (Method 1-2-3). For example, the method may be switched between Method 1-2-1 and Method 1-2-2 described above.

Figure 38:
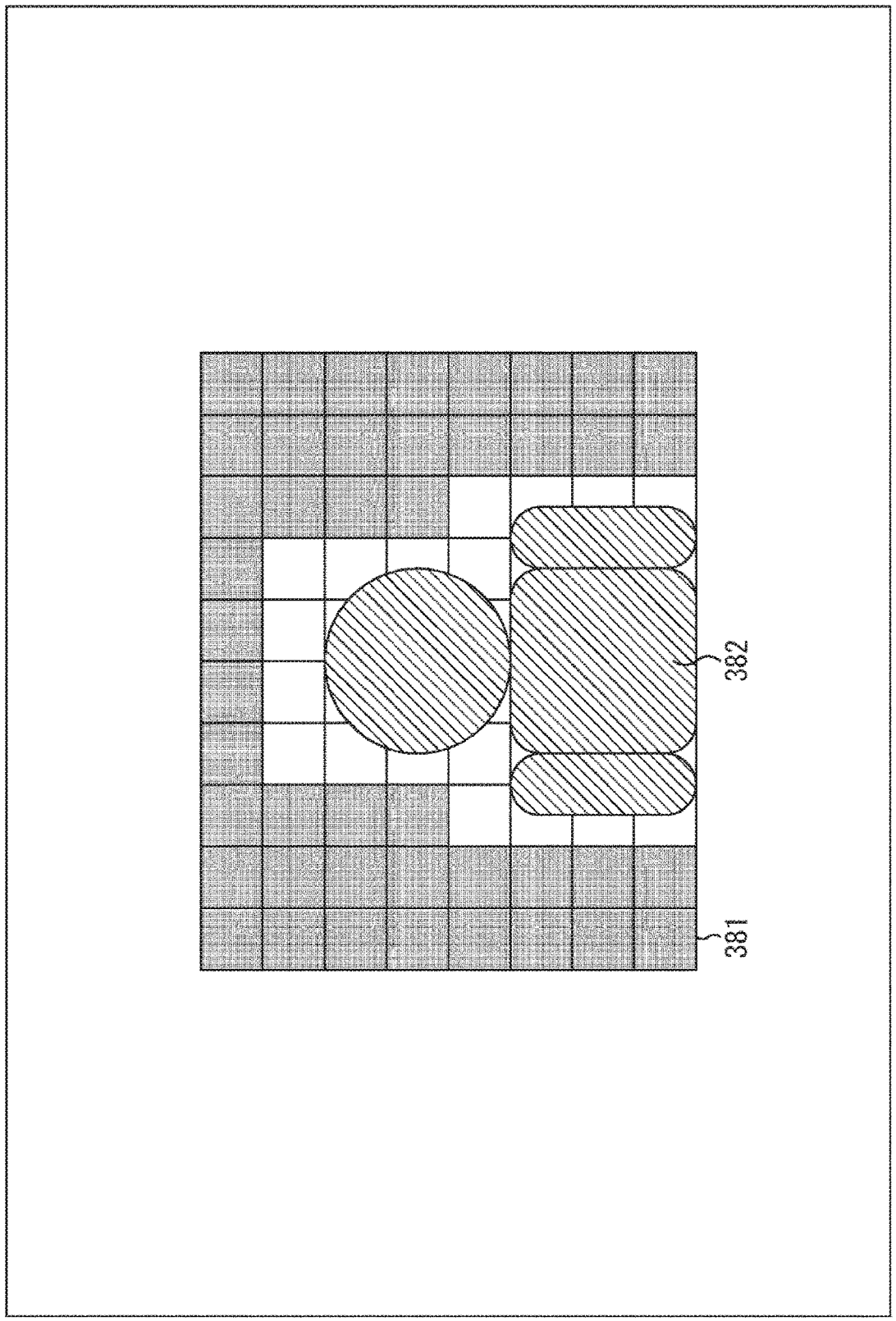
FIG. 38 is a diagram illustrating units for setting a prediction method.

For example, when taking a photograph such as a portrait, as indicated by an image 381 illustrated in FIG. 38, the image is often taken such that only the main subject, such as a person 382, is in focus, and the background and the like are made blurry on purpose. With such an image 381, there are cases where using a prediction method that prioritizes spatial correlation on the region which is in focus improves the efficiency, and using a phase correlation image is better for background parts and the like. Switching the prediction method in units of blocks is recommended for such a case.

On the other hand, some images are entirely in focus, while some images are entirely out of focus, such as when shooting an image where the aperture is reduced to bring the entire image into focus, as with pan-focus, or when shooting an image such as a moving image in which the entire image is intentionally blurry and is then gradually brought into focus. With such an image, it is assumed that even if a method which determines the prediction method individually is applied, the same predictive encoding method will be selected for the entire image as a result. Additional problems may arise such as an increase in the consumption of power needed for the determination, the header cost for transmitting the flags, and the like.

Accordingly, a configuration can be employed in which the prediction method is switched adaptively in units of blocks to be processed, in units of frames, or the like.

<Quantization Unit/Inverse Quantization Unit>

The quantization unit 115 and the inverse quantization unit 118 perform quantization and inverse quantization on prediction residual signals. It is necessary for the quantization unit 115 and the inverse quantization unit 118 to use a common quantization value. On the other hand, the quantization value may be set freely as long as the same quantization value is used by the quantization unit 115 and the inverse quantization unit 118 of the image encoding device 100, and an inverse quantization unit 414 of an image decoding device 400 (described later). For example, a value set in advance may be used in a fixed manner, or a rule for calculating the same quantization value in both the image encoding device 100 and the image decoding device 400 according to a given regulation may be set. The image encoding device 100 may also communicate the quantization value to the image decoding device 400 through a method such as determining the quantization value and transmitting information indicating the quantization value thereof in a bitstream.

<Encoding Unit>

The encoding unit 116 encodes the quantized prediction residual and generates encoded data. Any encoding method may be used. For example, an encoding method such as exp-Golomb may be used, and if the processing is to be simplified, transmission may be performed at a fixed length.

<Multiplexing Unit>

The multiplexing unit 117 generates a bitstream including the encoded data of the prediction residual. At this time, the multiplexing unit 117 may store applied prediction information in the bitstream and transmit the bitstream to the decoding side, for example, as indicated in the twenty-first row from the top of the table in FIG. 5 (Method 1-3). In other words, the multiplexing unit 117 can also be said to be the bitstream generation unit that generates a bitstream. For example, the applied prediction information may include a prediction method flag, as indicated in the bottom row of the table in FIG. 5 (Method 1-3-2).

Alternatively, for example, the applied prediction information may include the reference direction flag, as indicated in the twenty-second row from the top of the table in FIG. 5 (Method 1-3-1). In other words, the multiplexing unit 117 may generate the bitstream further including information indicating the reference direction.

For example, the multiplexing unit 117 stores the applied prediction information in the header of the bitstream. FIG. 39 illustrates an example of the syntax in this case. In the example in FIG. 39, the prediction direction flag and the reference direction flag are stored in the header of the bitstream as the applied prediction information. Note that the quantization value may be included in the bitstream, as in the example in FIG. 39. Of course, the quantization value may be set to a predetermined fixed value and omitted from the bitstream.

By having the above configuration, the image encoding device 100 can perform prediction taking into account the pixel value distribution characteristics unique to 2×2 OCL (the occurrence of deviation). In other words, the image encoding device 100 can apply phase prediction, which has a higher prediction accuracy for parts where deviation occurs as described with reference to FIGS. 3 and 4, to those parts, and apply spatial prediction, which has a higher prediction accuracy for parts where deviation does not occur, to those parts. To rephrase, the image encoding device 100 can apply the prediction method having the higher prediction accuracy to both parts where deviation occurs and parts where no deviation occurs. The image encoding device 100 can therefore suppress a drop in the prediction accuracy, and suppress a drop in the encoding efficiency.

<Flow of Image Encoding Processing>

An example of the flow of image encoding processing executed by the image encoding device 100 described above will be described with reference to the flowchart in FIG. 40. When the image encoding processing is started, in step S101, the reference direction setting unit 111 sets the reference direction by applying the present technique as described above.

In step S102, the prediction method setting unit 112 sets the prediction method as described above.

In step S103, the prediction unit 113 derives the prediction value for the pixel to be processed from the peripheral pixel using the prediction method set in step S102 and the reference direction set in step S101, as described above.

In step S104, the computation unit 114 derives the prediction residual using the prediction value derived in step S103, as described above.

In step S105, the quantization unit 115 quantizes the prediction residual derived in step S104, as described above.

In step S106, the encoding unit 116 encodes the quantization coefficient (the quantized prediction residual) derived in step S105, and generates the encoded data of the prediction residual, as described above.

In step S107, the multiplexing unit 117 generates a bitstream including the encoded data generated in step S106 and the applied prediction information generated in steps S101 and step S102, as described above.

In step S108, the multiplexing unit 117 outputs the bitstream generated in step S107.

In step S109, the inverse quantization unit 118 inverse-quantizes the quantization coefficient (the quantized prediction residual) derived in step S105, and generates the prediction residual, as described above.

In step S110, the computation unit 119 adds the prediction value derived in step S103 to the prediction residual generated in step S109, and generates a reconfigured image, as described above.

In step S111, the reference buffer 120 stores the reconfigured image generated in step S110, as described above.

When the processing of step S111 ends, the image encoding processing ends.

<Flow of Reference Direction Setting Processing>

An example of the flow of the reference direction setting processing executed in step S101 of FIG. 40 will be described with reference to the flowchart in FIG. 41.

When the reference direction setting processing is started, in step S121, the channel division unit 171 divides the input image and the peripheral image into channel images, as described above.

In step S122, the correlation direction derivation unit 172 uses the channel images to derive the correlation direction through a method such as applying a Sobel operator, for example, as described above.

In step S123, the reference direction setting unit 173 sets the reference direction based on the correlation direction, as described above.

Figure 40:
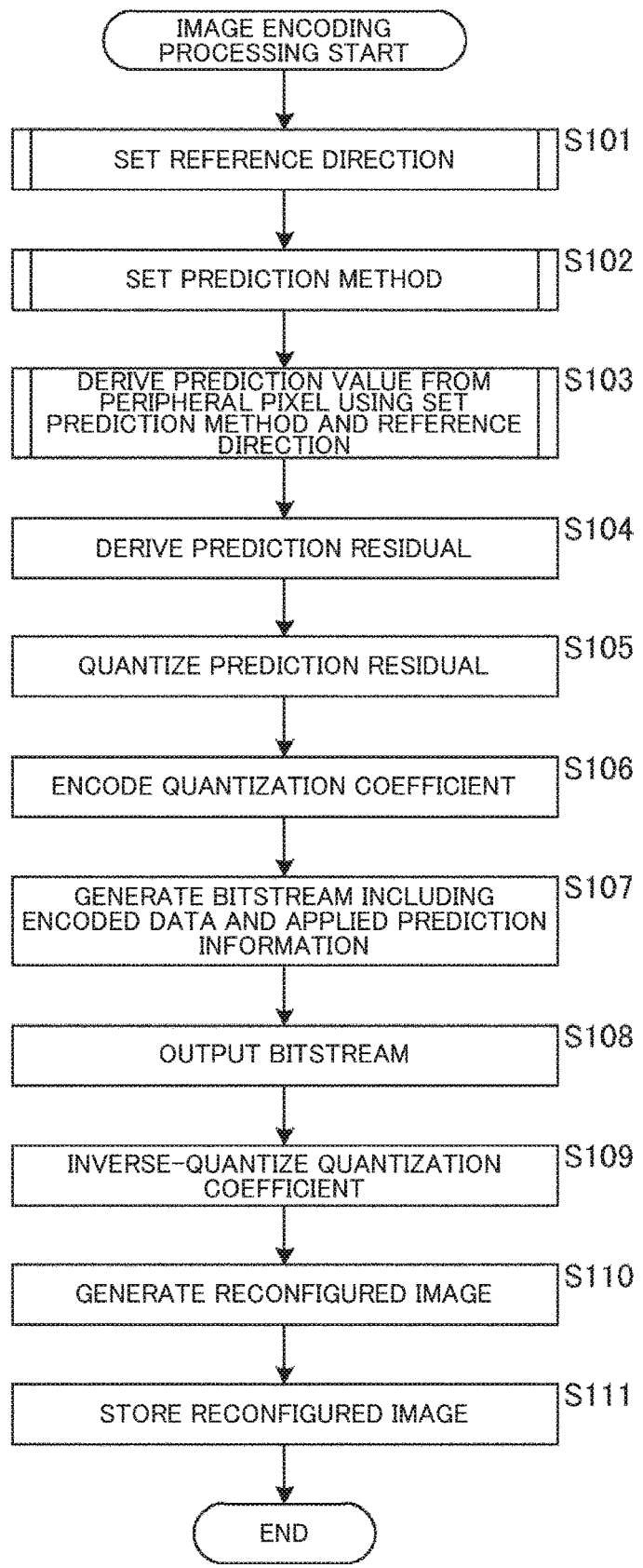
FIG. 40 is a flowchart illustrating an example of the flow of image encoding processing.
Figure 41:
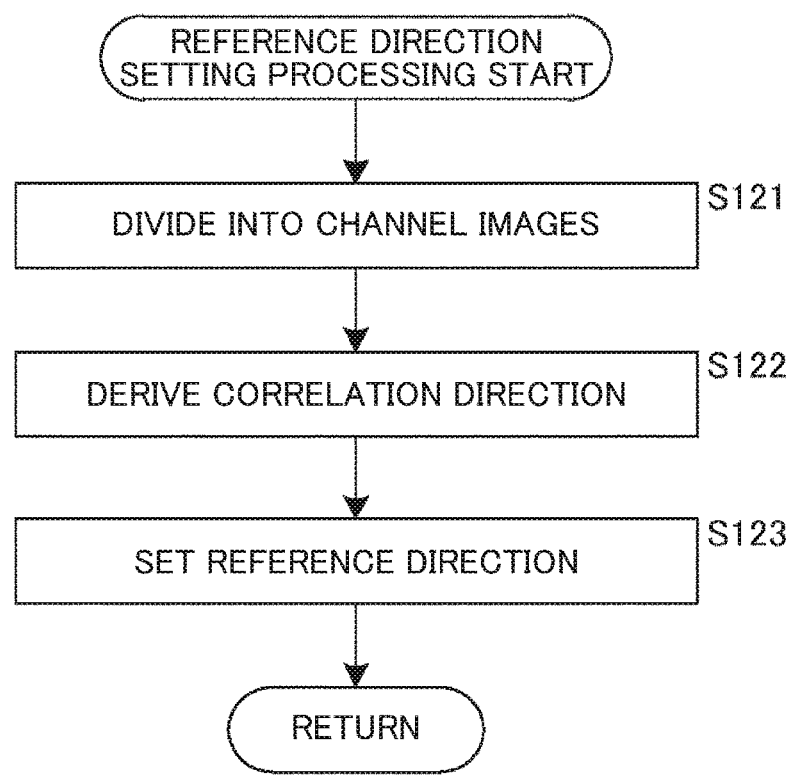
FIG. 41 is a flowchart illustrating an example of the flow of reference direction setting processing.

When the processing of step S123 ends, the processing returns to FIG. 40.

<Flow of Prediction Method Setting Processing>

An example of the flow of the prediction method setting processing executed in step S102 of FIG. 40 will be described with reference to the flowchart in FIG. 42.

When the prediction method setting processing is started, in step S131, the spatial prediction cost calculation unit 211 calculates the spatial prediction cost, as described above.

In step S132, the phase prediction cost calculation unit 212 calculates the phase prediction cost, as described above.

In step S133, the selection unit 213 selects one of spatial prediction and phase prediction based on the spatial prediction cost calculated in step S131 and the phase prediction cost calculated in step S132, as described above.

When the processing of step S133 ends, the processing returns to FIG. 40.

<Flow of Spatial Prediction Cost Calculation Processing>

An example of the flow of the spatial prediction cost calculation processing executed in step S131 of FIG. 42 will be described with reference to the flowchart in FIG. 43. This example corresponds to the example in FIG. 31.

When the spatial prediction cost calculation processing is started, in step S141, the spatial prediction value generation unit 221 generates the spatial prediction value based on the peripheral pixel and the reference direction, as described above.

In step S142, the spatial prediction residual generation unit 222 generates the prediction residual using the spatial prediction value and the input image, as described above.

In step S143, the cost calculation unit 223 calculates the spatial prediction cost using the prediction residual, as described above.

Figure 42:
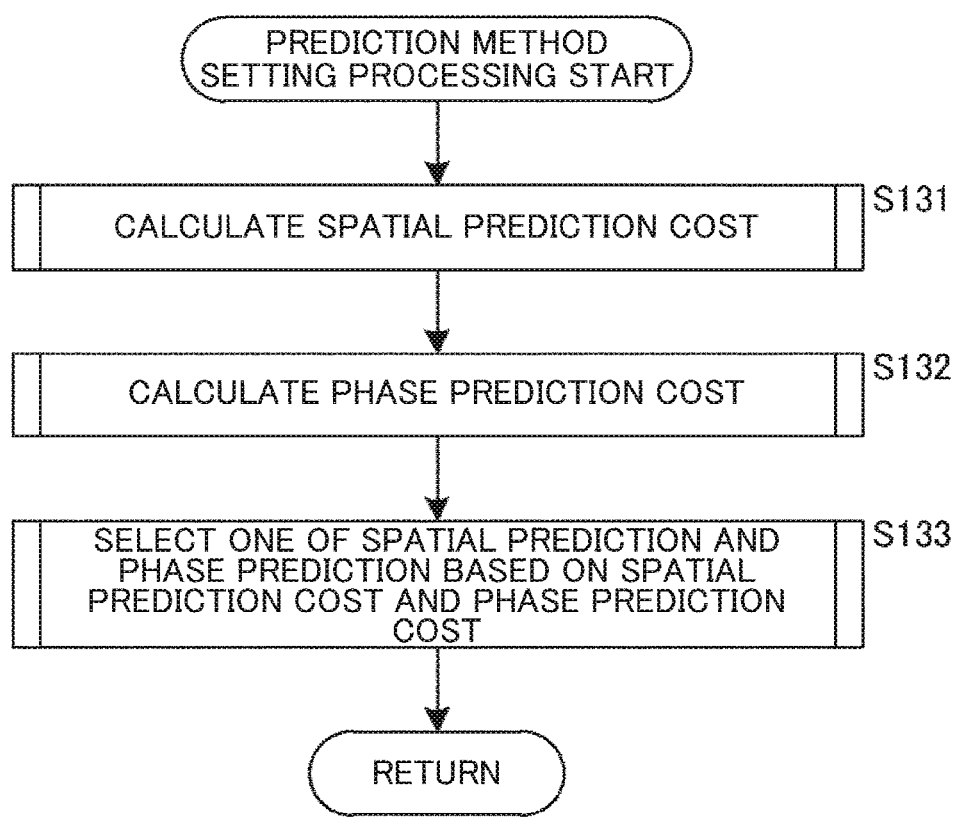
FIG. 42 is a flowchart illustrating an example of the flow of prediction method setting processing.
Figure 43:
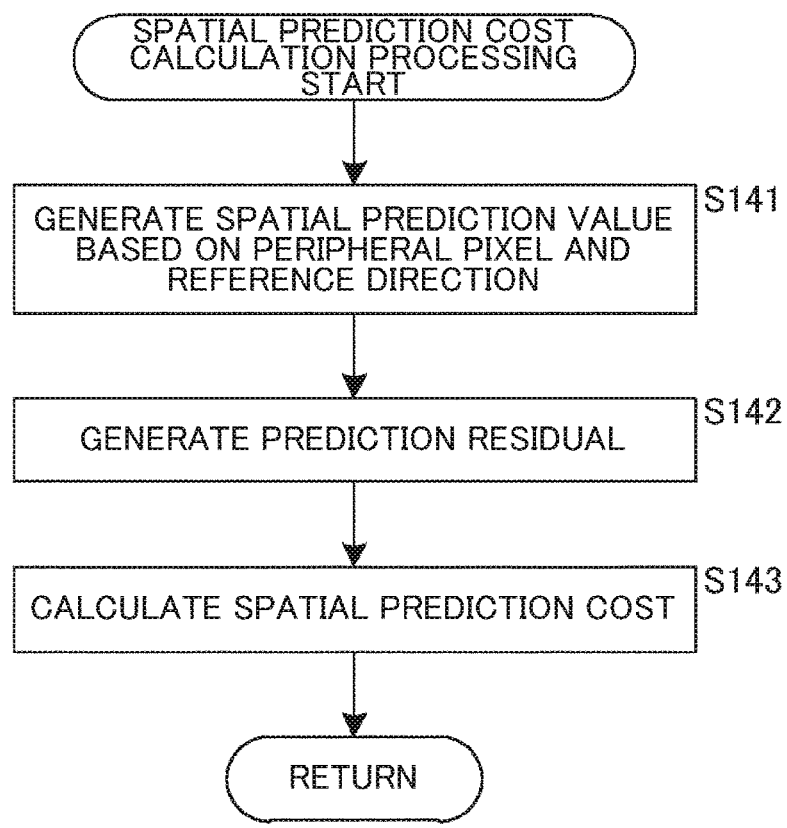
FIG. 43 is a flowchart illustrating an example of the flow of spatial prediction cost calculation processing.

When the processing of step S143 ends, the processing returns to FIG. 42.

<Flow of Phase Prediction Cost Calculation Processing>

Figure 44:
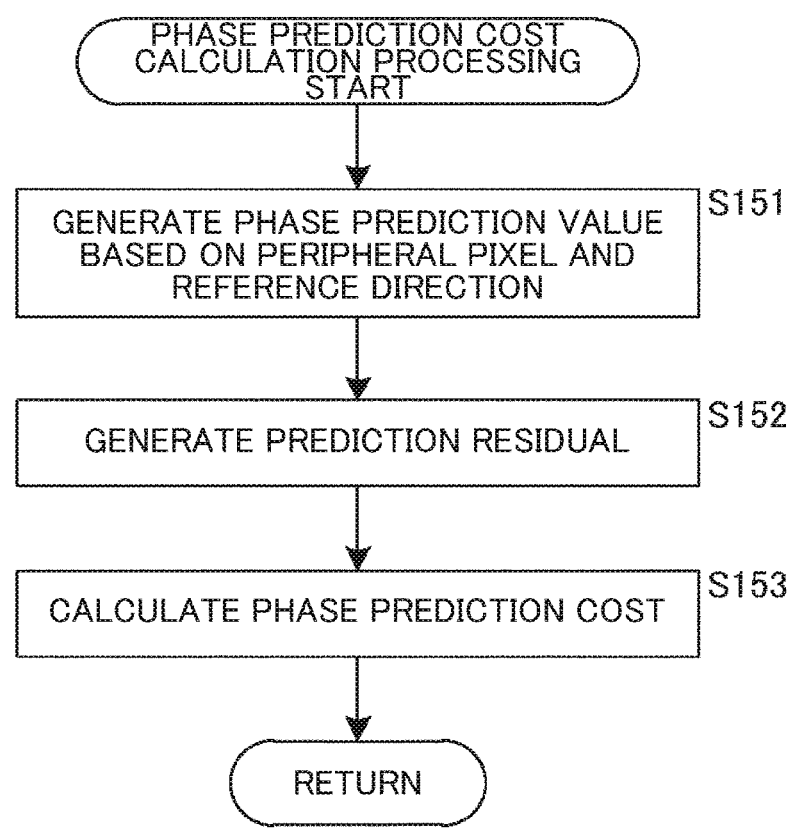
FIG. 44 is a flowchart illustrating an example of the flow of phase prediction cost calculation processing.

An example of the flow of the phase prediction cost calculation processing executed in step S132 of FIG. 42 will be described with reference to the flowchart in FIG. 44. This example corresponds to the example in FIG. 32.

When the phase prediction cost calculation processing is started, in step S151, the phase prediction value generation unit 261 generates the phase prediction value based on the peripheral pixel and the reference direction, as described above.

In step S152, the phase prediction residual generation unit 262 generates the prediction residual using the phase prediction value and the input image, as described above.

In step S153, the cost calculation unit 263 calculates the phase prediction cost using the prediction residual, as described above.

When the processing of step S153 ends, the processing returns to FIG. 42.

<Flow of Spatial Prediction Cost Calculation Processing>

Figure 45:
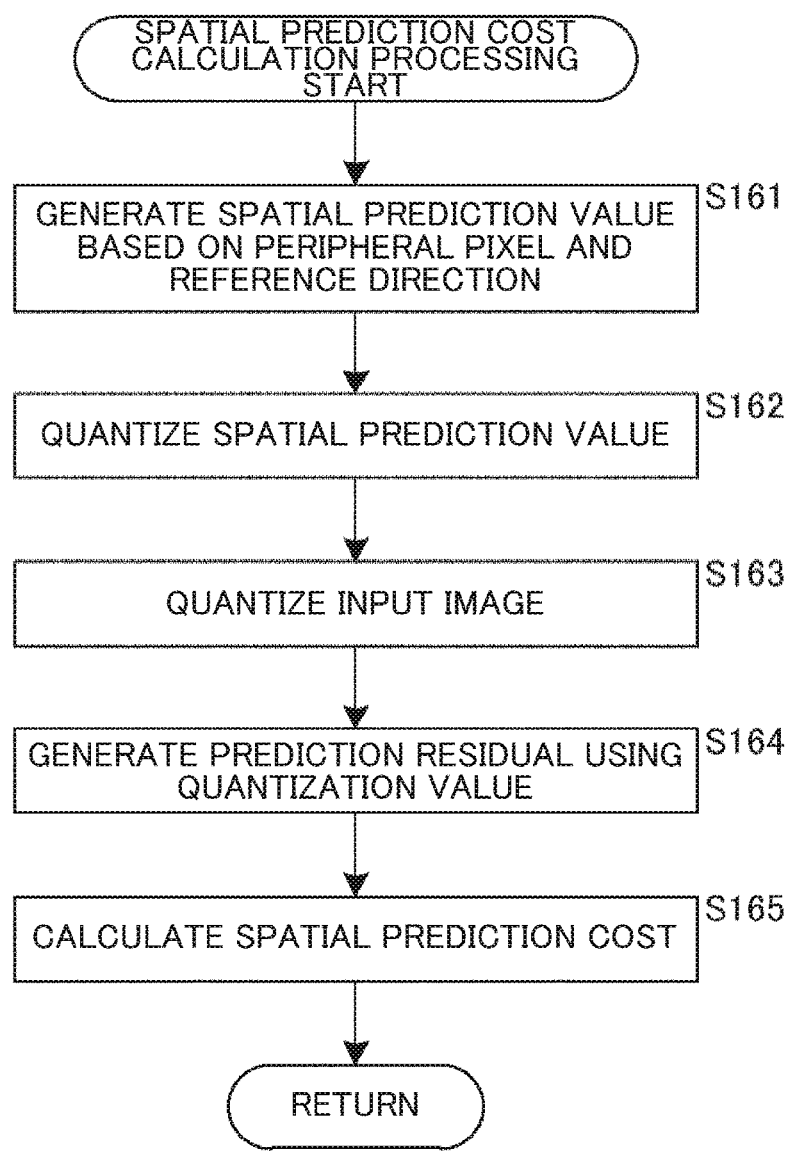
FIG. 45 is a flowchart illustrating an example of the flow of spatial prediction cost calculation processing.

Another example of the flow of the spatial prediction cost calculation processing executed in step S131 of FIG. 42 will be described with reference to the flowchart in FIG. 45. This example corresponds to the example in FIG. 33. In other words, in this example, the spatial prediction cost is calculated taking quantization into account.

When the spatial prediction cost calculation processing is started, in step S161, the spatial prediction value generation unit 221 generates the spatial prediction value based on the peripheral pixel and the reference direction, as described above.

In step S162, the spatial prediction residual generation unit 222 quantizes the spatial prediction value, as described above. In step S163, the spatial prediction residual generation unit 222 quantizes the input image, as described above. Then, in step S164, the spatial prediction residual generation unit 222 generates the prediction residual using the quantized spatial prediction value and the quantized input image, as described above.

In step S165, the cost calculation unit 223 calculates the spatial prediction cost using the prediction residual, as described above.

When the processing of step S165 ends, the processing returns to FIG. 42.

<Flow of Phase Prediction Cost Calculation Processing>

Figure 46:
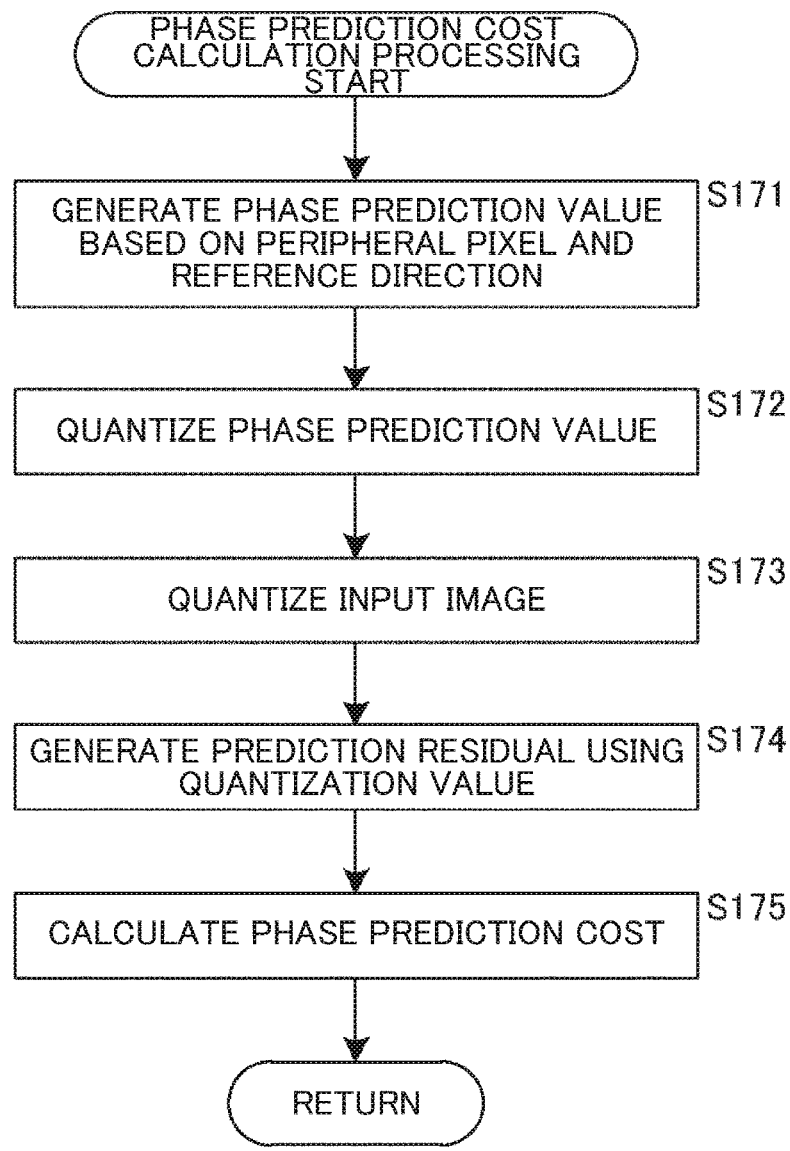
FIG. 46 is a flowchart illustrating an example of the flow of phase prediction cost calculation processing.

Another example of the flow of the phase prediction cost calculation processing executed in step S132 of FIG. 42 will be described with reference to the flowchart in FIG. 46. This example corresponds to the example in FIG. 34. In other words, in this example, the phase prediction cost is calculated taking quantization into account.

When the phase prediction cost calculation processing is started, in step S171, the phase prediction value generation unit 261 generates the phase prediction value based on the peripheral pixel and the reference direction, as described above.

In step S172, the phase prediction residual generation unit 262 quantizes the phase prediction value, as described above. In step S173, the phase prediction residual generation unit 262 quantizes the input image, as described above. Then, in step S174, the phase prediction residual generation unit 262 generates the prediction residual using the quantized phase prediction value and the quantized input image, as described above.

In step S175, the cost calculation unit 263 calculates the phase prediction cost using the prediction residual, as described above.

When the processing of step S175 ends, the processing returns to FIG. 42.

<Flow of Spatial Prediction Cost Calculation Processing>

Figure 47:
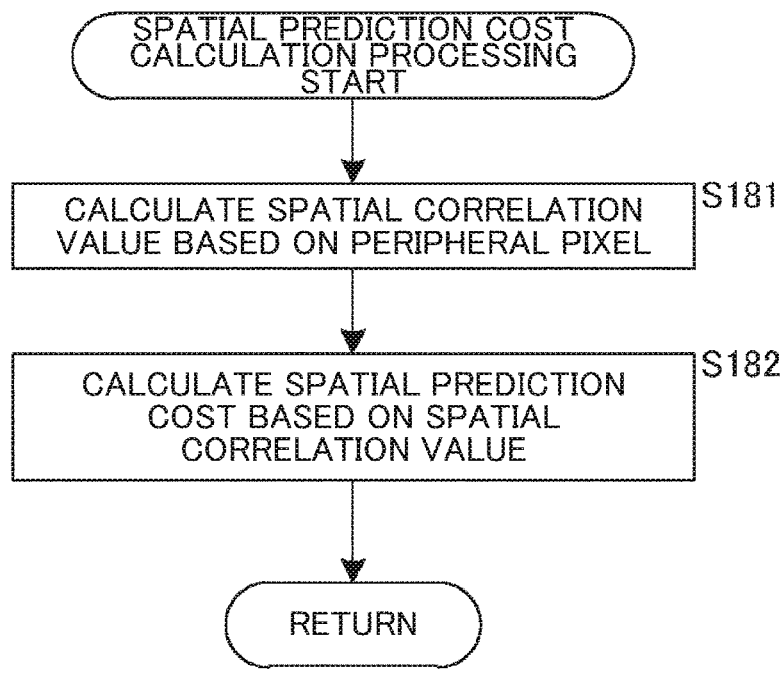
FIG. 47 is a flowchart illustrating an example of the flow of spatial prediction cost calculation processing.

Yet another example of the flow of the spatial prediction cost calculation processing executed in step S131 of FIG. 42 will be described with reference to the flowchart in FIG. 47. This example corresponds to the example in FIG. 35. In other words, in this example, the spatial prediction cost is calculated using the correlation with the peripheral image.

When the spatial prediction cost calculation processing is started, in step S181, the spatial prediction cost calculation unit 211 calculates the spatial correlation value based on the peripheral pixel, as described above.

In step S182, the spatial prediction cost calculation unit 211 calculates the spatial prediction cost based on the spatial correlation value, as described above.

When the processing of step S182 ends, the processing returns to FIG. 42.

<Flow of Phase Prediction Cost Calculation Processing>

Figure 48:
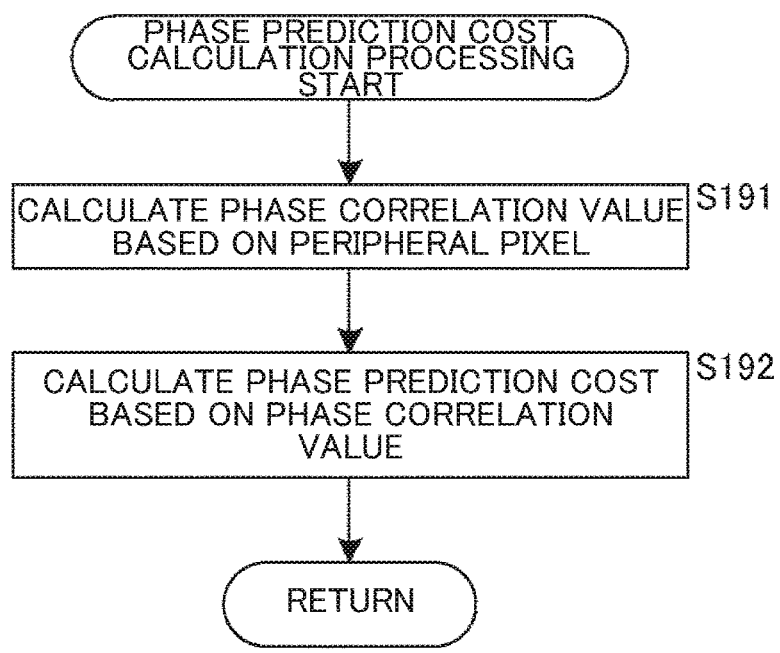
FIG. 48 is a flowchart illustrating an example of the flow of phase prediction cost calculation processing.

Yet another example of the flow of the phase prediction cost calculation processing executed in step S132 of FIG. 42 will be described with reference to the flowchart in FIG. 48. This example corresponds to the example in FIG. 35. In other words, in this example, the phase prediction cost is calculated using the correlation with the peripheral image.

When the phase prediction cost calculation processing is started, in step S191, the phase prediction cost calculation unit 212 calculates the phase correlation value based on the peripheral pixel, as described above.

In step S192, the phase prediction cost calculation unit 212 calculates the phase prediction cost based on the phase correlation value, as described above.

When the processing of step S192 ends, the processing returns to FIG. 42.

<Flow of Prediction Method Selection Processing>

An example of the flow of the prediction method selection processing executed in step S133 of FIG. 42 will be described with reference to the flowchart in FIG. 49. This example corresponds to the example in FIG. 37A. In other words, in this example, the prediction method having the lower cost among spatial prediction and phase prediction is selected.

When the prediction method selection processing is started, in step S201, the selection unit 213 determines whether the spatial prediction cost is lower. If the spatial prediction cost is lower, in step S202, the selection unit 213 selects spatial prediction. If the phase prediction cost is lower, in step S203, the selection unit 213 selects phase prediction.

Once the processing of step S202 or step S203 ends, the prediction method selection processing ends, and the processing returns to FIG. 42.

<Flow of Prediction Method Selection Processing>

Another example of the flow of the prediction method selection processing executed in step S133 of FIG. 42 will be described with reference to the flowchart in FIG. 50. This example corresponds to the example in FIG. 37B. In other words, in this example, if the costs of both spatial prediction and phase prediction are sufficiently low, a predetermined prediction method is selected.

When the prediction method selection processing is started, in step S201, the selection unit 213 determines whether both the spatial prediction cost and the phase prediction cost are sufficiently low. For example, if the spatial prediction cost and the phase prediction cost are determined to be sufficiently low through comparison with a threshold or the like, in step S212, the selection unit 213 selects a predetermined prediction method (e.g., phase prediction). Once the processing of step S212 ends, the prediction method selection processing ends, and the processing returns to FIG. 42.

On the other hand, if, in step S211, the spatial prediction cost and the phase prediction cost are determined not to be sufficiently low, the processing moves to step S213. The processing of step S213 to step S215 is executed in the same manner as in FIG. 49. Once the processing of step S214 or step S215 ends, the prediction method selection processing ends, and the processing returns to FIG. 42.

<Flow of Prediction Processing>

An example of the flow of the prediction processing executed in step S103 of FIG. 40 will be described with reference to the flowchart in FIG. 51.

When the prediction processing is started, in step S231, the control unit 131 determines whether spatial prediction has been selected based on the prediction method flag, as described above. If spatial prediction has been selected, the processing moves to step S232.

In step S232, the spatial prediction unit 132 selects a reference pixel from among the candidates corresponding to spatial prediction based on the reference direction flag, as described above. In step S233, the spatial prediction unit 132 derives the prediction value using the pixel value of the reference pixel, as described above. Once the processing of step S233 ends, the prediction processing ends, and the processing returns to FIG. 40.

On the other hand, if, in step S231, phase prediction is selected, the processing moves to step S234. In step S234, the phase prediction unit 133 selects a reference pixel from among the candidates corresponding to phase prediction based on the reference direction flag, as described above. In step S235, the phase prediction unit 133 derives the prediction value using the pixel value of the reference pixel, as described above. Once the processing of step S235 ends, the prediction processing ends, and the processing returns to FIG. 40.

By executing the processing as described above, the image encoding device 100 can perform prediction taking into account the pixel value distribution characteristics unique to 2×2 OCL (the occurrence of deviation). In other words, the image encoding device 100 can apply phase prediction, which has a higher prediction accuracy for parts where deviation occurs as described with reference to FIGS. 3 and 4, to those parts, and apply spatial prediction, which has a higher prediction accuracy for parts where deviation does not occur, to those parts. To rephrase, the image encoding device 100 can apply the prediction method having the higher prediction accuracy to both parts where deviation occurs and parts where no deviation occurs. The image encoding device 100 can therefore suppress a drop in the prediction accuracy, and suppress a drop in the encoding efficiency.

3. Second Embodiment

<Image Decoding Device>

Figure 52:
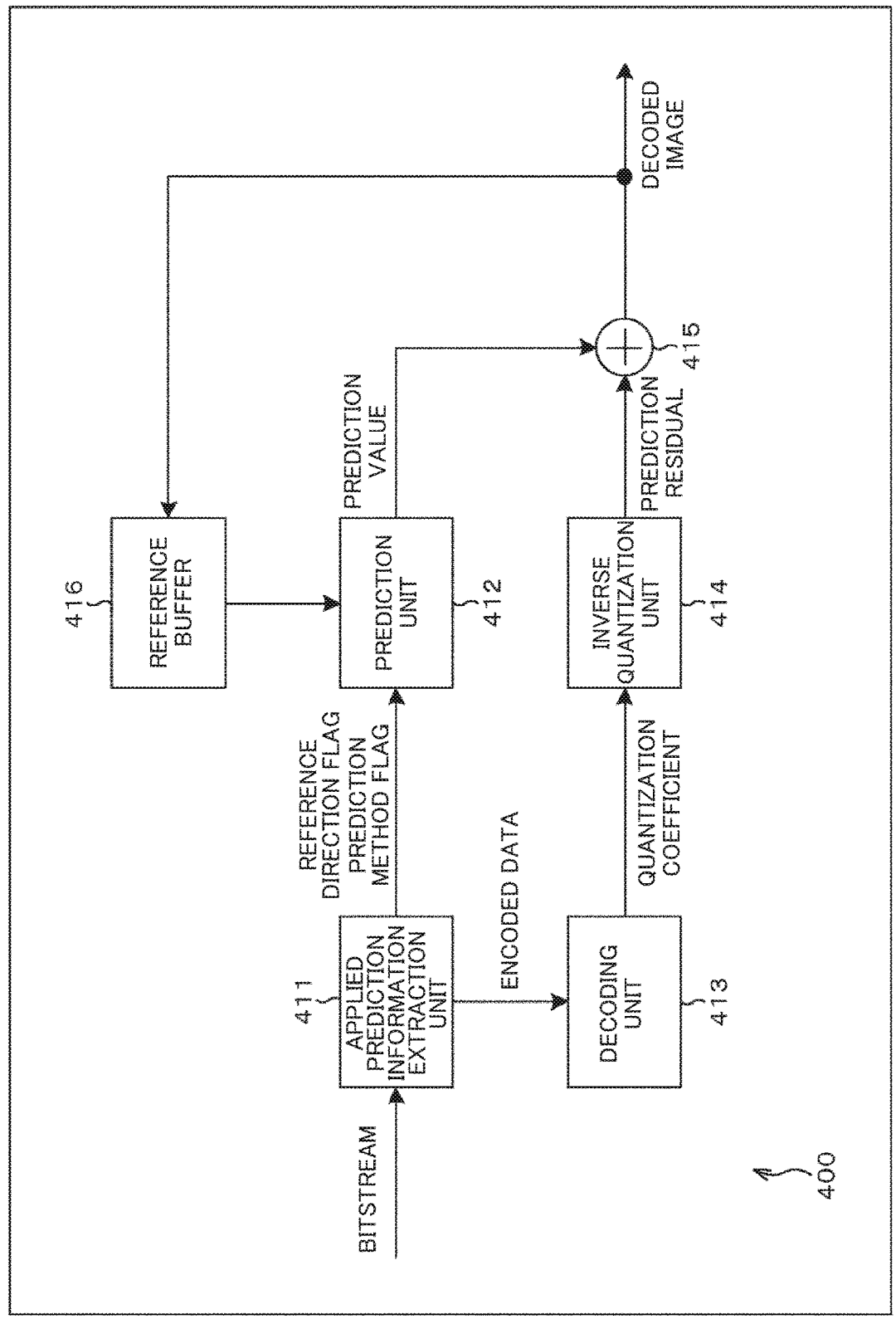
FIG. 52 is a block diagram illustrating an example of the main configuration of an image decoding device.

FIG. 52 is a block diagram illustrating an example of the configuration of an image decoding device serving as one aspect of an image processing device to which the present technique is applied. The image decoding device 400 illustrated in FIG. 52 is a device that decodes a bitstream generated by the image encoding device 100 and generates a RAW image which has been generated by a 2×2 OCL image sensor in a quad configuration.

Although FIG. 52 illustrates major components such as processing units (blocks) and data flows, the processing units and data flows are not limited to those illustrated in FIG. 52. That is, processing units not illustrated in FIG. 52 as blocks and processing and data flows not illustrated in FIG. 52 as arrows or the like may be present in the image decoding device 400.

As illustrated in FIG. 52, the image decoding device 400 includes an applied prediction information extraction unit 411, a prediction unit 412, a decoding unit 413, the inverse quantization unit 414, a computation unit 415, and a reference buffer 416.

The applied prediction information extraction unit 411 obtains a bitstream generated by the image encoding device 100, for example. In other words, this bitstream includes encoded data in which is encoded a prediction residual obtained by subtracting a prediction value from each of pixel values in image data generated by a pixel array in which blocks, each including a plurality of pixels adjacent to each other, are arranged in a predetermined pattern. Each of the plurality of pixels in the block has a filter having identical transmission wavelength characteristics, and is configured to photoelectrically convert incident light incident through a single on-chip lens corresponding to the plurality of pixels and the filter. The spatial prediction is a prediction method that performs prediction by referring to a pixel value of a pixel which is in a block located in a periphery of the pixel to be processed and which is near the pixel to be processed. The phase prediction is a prediction method that performs prediction by referring to a pixel value of a pixel which is in a block located in a periphery of the pixel to be processed and which has a same location in the block as the pixel to be processed. The applied prediction information extraction unit 411 extracts the encoded data from such a bitstream and supplies the encoded data to the decoding unit 413. The applied prediction information extraction unit 411 also extracts applied prediction information, such as a reference direction flag and a prediction method flag, from such a bitstream and supplies the applied prediction information to the prediction unit 412.

The prediction unit 412 obtains the reference direction flag and the prediction method flag. The prediction unit 412 also obtains, from the reference buffer 416, a peripheral image (a processed image) of the block to be processed (the pixel to be processed). The prediction unit 412 applies a prediction method corresponding to the prediction method flag, and generates a prediction value for the pixel to be processed using the reference direction flag, the peripheral image, and the like. In other words, the prediction unit 412 derives the prediction value by applying the prediction method applied in the image encoding device 100 (spatial prediction or phase prediction). The prediction unit 412 supplies the generated prediction value to the computation unit 415.

The decoding unit 413 obtains the encoded data supplied from the applied prediction information extraction unit 411. This encoded data is encoded data of the quantized prediction residual included in the bitstream. The decoding unit 413 decodes the encoded data and generates a quantization coefficient (a quantized prediction residual). The decoding unit 413 supplies the generated quantization coefficient to the inverse quantization unit 414.

The inverse quantization unit 414 inverse-quantizes the quantization coefficient, and generates a prediction residual. The inverse quantization unit 414 supplies the generated prediction residual to the computation unit 415.

The computation unit 415 obtains the prediction value supplied from the prediction unit 412. The computation unit 415 also obtains the prediction residual supplied from the inverse quantization unit 414. The computation unit 415 adds the prediction residual and the prediction value, and generates a decoded image (a reconfigured image). The computation unit 415 outputs the decoded image to the exterior of the image decoding device 400. The computation unit 415 also supplies the decoded image to the reference buffer 416.

The reference buffer 416 stores the decoded image. The decoded image is used as the peripheral image for the pixel to be processed thereafter.

<Prediction Unit>

The prediction unit 412 will be described next. The prediction unit 412 may derive a prediction value based on the applied prediction information transmitted from the encoding side, for example, as indicated in the third row from the top of the table in FIG. 6 (Method 2-1).

For example, the applied prediction information may include the reference direction flag, as indicated in the fourth row from the top of the table in FIG. 6 (Method 2-1-1). In other words, the prediction unit 412 may select and apply one of spatial prediction and phase prediction based on information indicating the reference direction included in the bitstream.

Additionally, the applied prediction information may include the prediction method flag, as indicated in the fifth row from the top of the table in FIG. 6 (Method 2-1-2). In other words, the prediction unit 412 may select and apply one of spatial prediction and phase prediction based on information indicating the prediction method for the pixel to be processed, included in the bitstream.

Alternatively, the prediction unit 412 may select the prediction method using any unit of data, as indicated in the ninth row from the top in the table in FIG. 6 (Method 2-3).

For example, the prediction unit 412 may select the prediction method every predetermined region in a frame, as indicated in the tenth row from the top of the table in FIG. 6 (Method 2-3-1). Alternatively, for example, the prediction unit 412 may select the prediction method every frame, as indicated in the eleventh row from the top of the table in FIG. 6 (Method 2-3-2). Furthermore, for example, the unit of data for selecting the prediction method may be switched, as indicated in the bottom row of the table in FIG. 6 (Method 2-3-3).

Figure 53:
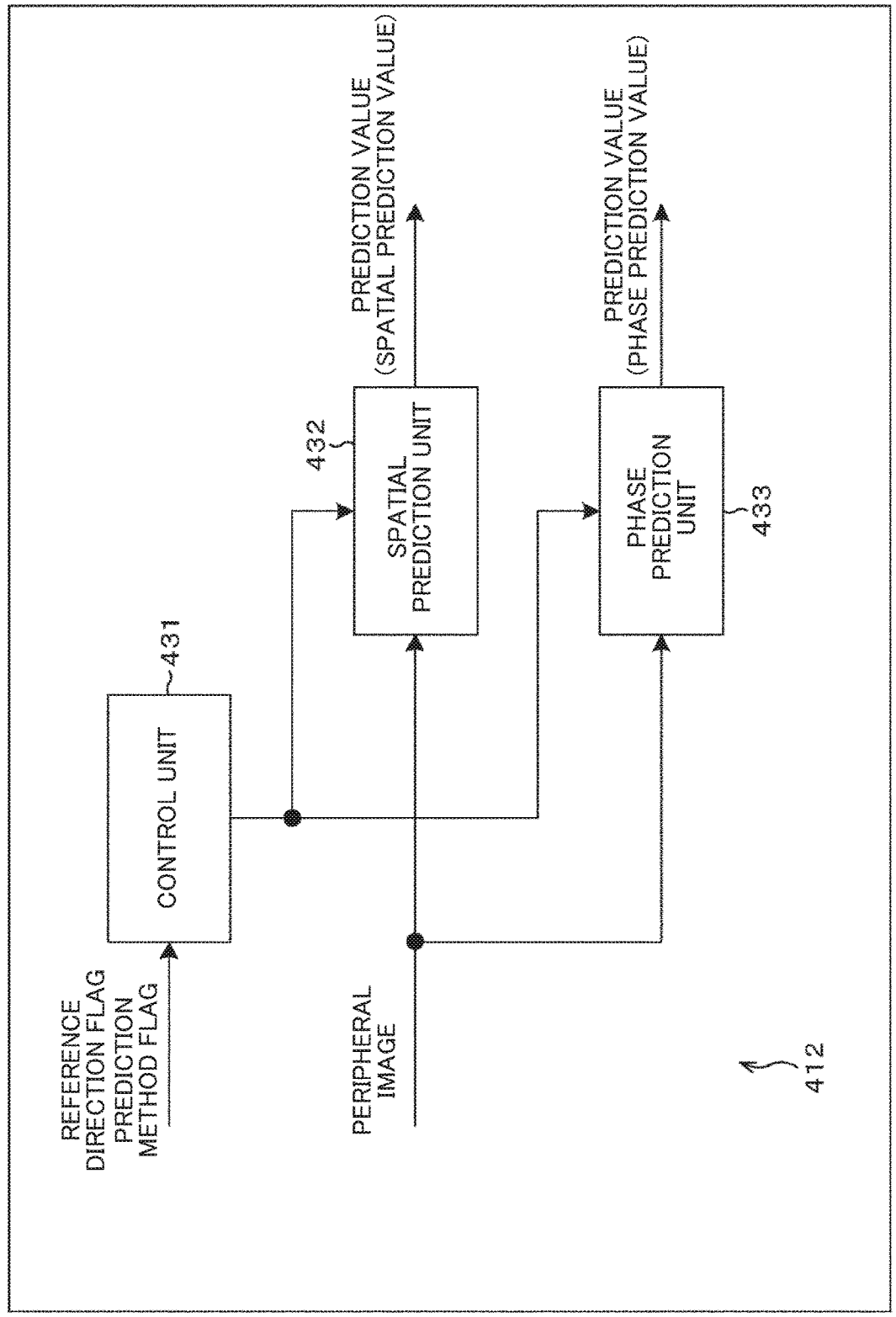
FIG. 53 is a block diagram illustrating an example of the main configuration of a prediction unit.

FIG. 53 is a block diagram illustrating an example of the main configuration of the prediction unit 412. As illustrated in FIG. 53, the prediction unit 412 includes a control unit 431, a spatial prediction unit 432, and a phase prediction unit 433.

The control unit 431 performs processing similar to that performed by the control unit 131. In other words, the control unit 431 controls the spatial prediction unit 432 and the phase prediction unit 433 based on the prediction method flag, the reference direction flag, and the like.

The spatial prediction unit 432 performs processing similar to that performed by the spatial prediction unit 132. In other words, under the control of the control unit 431, the spatial prediction unit 432 performs spatial prediction and generates a spatial prediction value.

The phase prediction unit 433 performs processing similar to that performed by the phase prediction unit 133. In other words, under the control of the control unit 431, the phase prediction unit 433 performs phase prediction and generates a phase prediction value.

By having this configuration, the image decoding device 400 can perform prediction taking into account the pixel value distribution characteristics unique to 2×2 OCL (the occurrence of deviation). In other words, the image decoding device 400 can apply phase prediction, which has a higher prediction accuracy for parts where deviation occurs as described with reference to FIGS. 3 and 4, to those parts, and apply spatial prediction, which has a higher prediction accuracy for parts where deviation does not occur, to those parts. To rephrase, the image decoding device 400 can apply the prediction method having the higher prediction accuracy to both parts where deviation occurs and parts where no deviation occurs. The image decoding device 400 can therefore suppress a drop in the prediction accuracy, and suppress a drop in the encoding efficiency.

<Flow of Image Decoding Processing>

Figure 54:
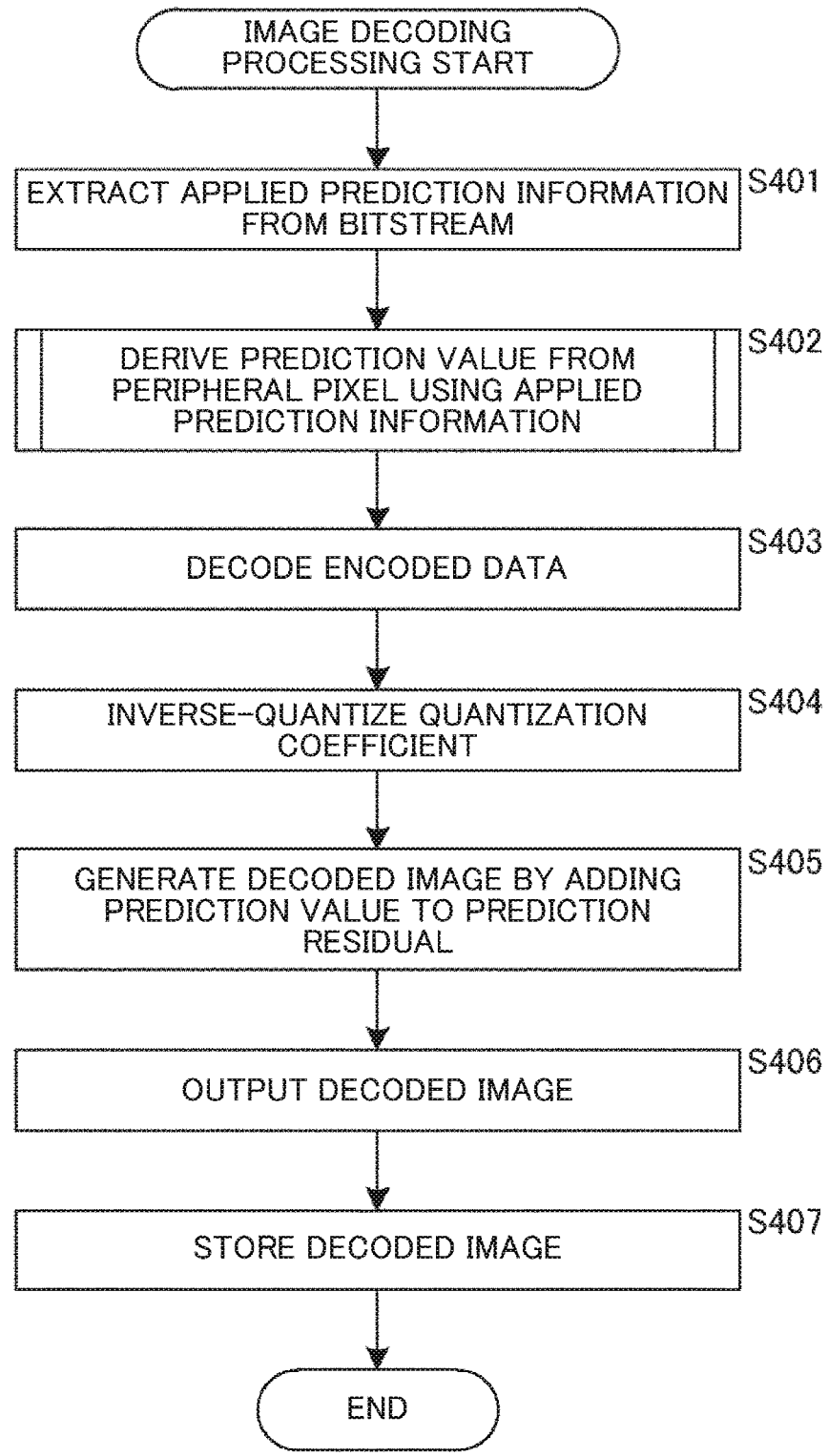
FIG. 54 is a flowchart illustrating an example of the flow of image decoding processing.

An example of a flow of image decoding processing executed by the image decoding device 400 will be described with reference to the flowchart in FIG. 54.

When the image decoding processing is started, in step S401, the applied prediction information extraction unit 411 extracts the applied prediction information from the bitstream, as described above.

In step S402, the prediction unit 412 derives the prediction value from the peripheral pixel using the applied prediction information, as described above.

In step S403, the decoding unit 413 decodes the encoded data included in the bitstream, as described above.

In step S404, the inverse quantization unit 414 inverse-quantizes the quantization coefficient obtained through the decoding, and generates a prediction residual, as described above.

In step S405, the computation unit 415 adds the prediction value to the prediction residual and generates the decoded image, as described above.

In step S406, the computation unit 415 outputs the decoded image, as described above.

In step S407, the reference buffer 416 stores the decoded image, as described above.

Once the processing of step S407 ends, the image decoding processing ends.

<Flow of Prediction Processing>

Figure 55:
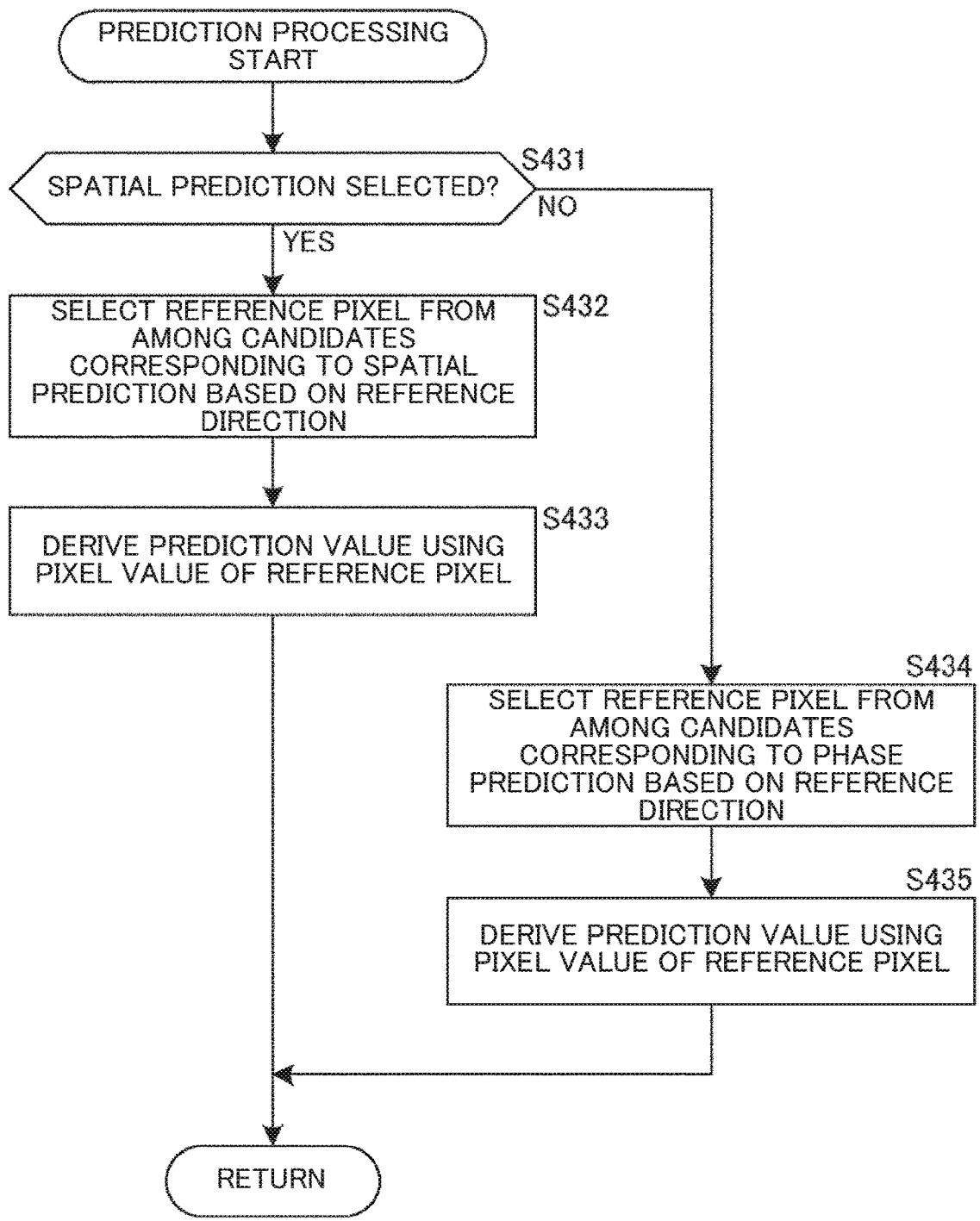
FIG. 55 is a flowchart illustrating an example of the flow of prediction processing.

An example of the flow of the prediction processing executed in step S402 of FIG. 54 will be described with reference to the flowchart in FIG. 55.

Figure 51:
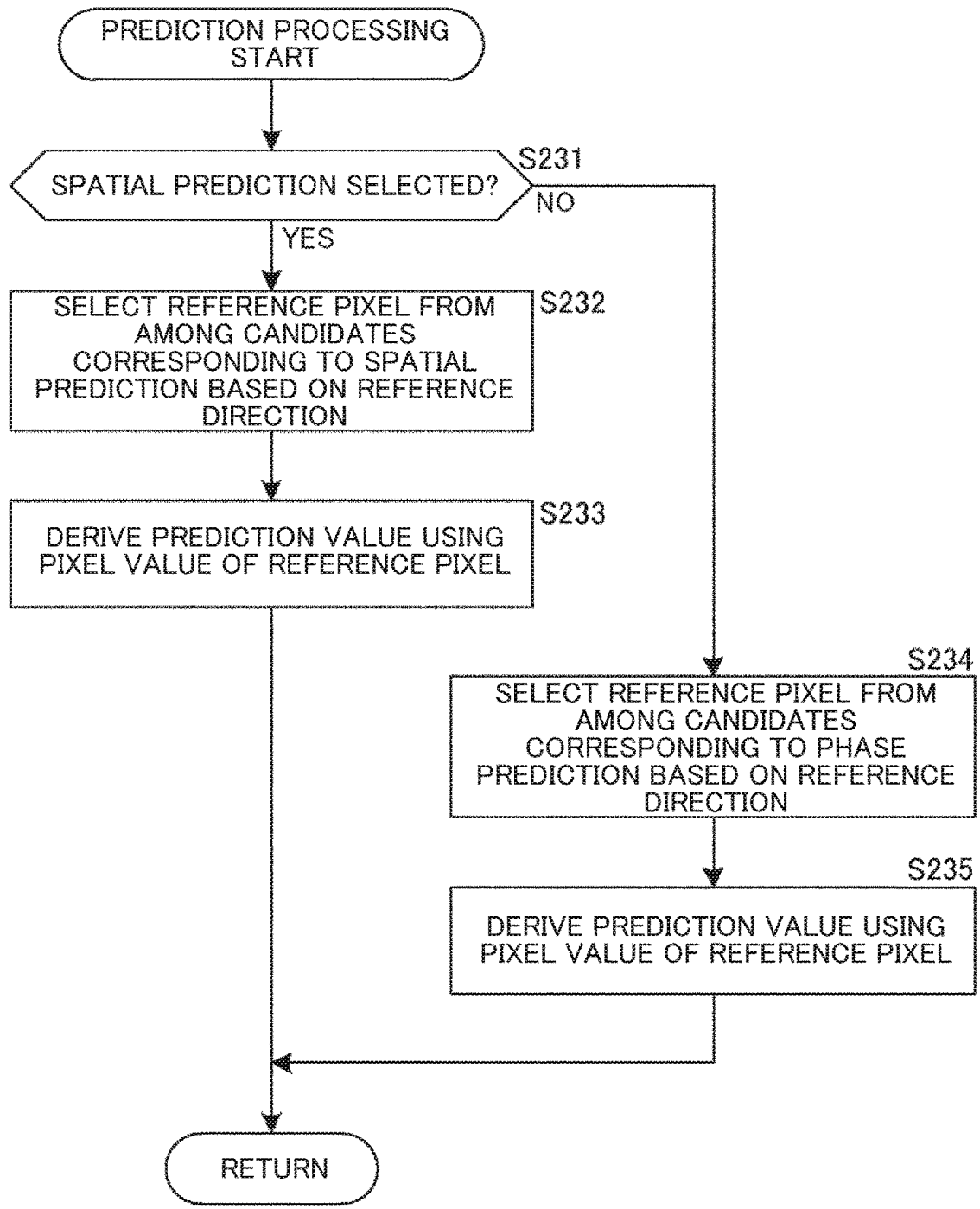
FIG. 51 is a flowchart illustrating an example of the flow of prediction processing.

The processing of step S431 to step S435 is executed in the same manner as the processing of step S231 to step S235 in FIG. 51.

By executing the processing as described above, the image decoding device 400 can perform prediction taking into account the pixel value distribution characteristics unique to 2×2 OCL (the occurrence of deviation). In other words, the image decoding device 400 can apply phase prediction, which has a higher prediction accuracy for parts where deviation occurs as described with reference to FIGS. 3 and 4, to those parts, and apply spatial prediction, which has a higher prediction accuracy for parts where deviation does not occur, to those parts. To rephrase, the image decoding device 400 can apply the prediction method having the higher prediction accuracy to both parts where deviation occurs and parts where no deviation occurs. The image decoding device 400 can therefore suppress a drop in the prediction accuracy, and suppress a drop in the encoding efficiency.

4. Third Embodiment

<Application of PCM Mode>

For example, in the image encoding device 100, when the cost of each prediction method is sufficiently high, a Pulse Code Modulation (PCM) mode may be applied, as indicated in the sixth row from the top of the table in FIG. 5 (Method 1-1-1-2). For example, when the cost of spatial prediction and the cost of phase prediction are sufficiently high, the prediction method setting unit 112 may set the Pulse Code Modulation (PCM) mode.

Figure 56:
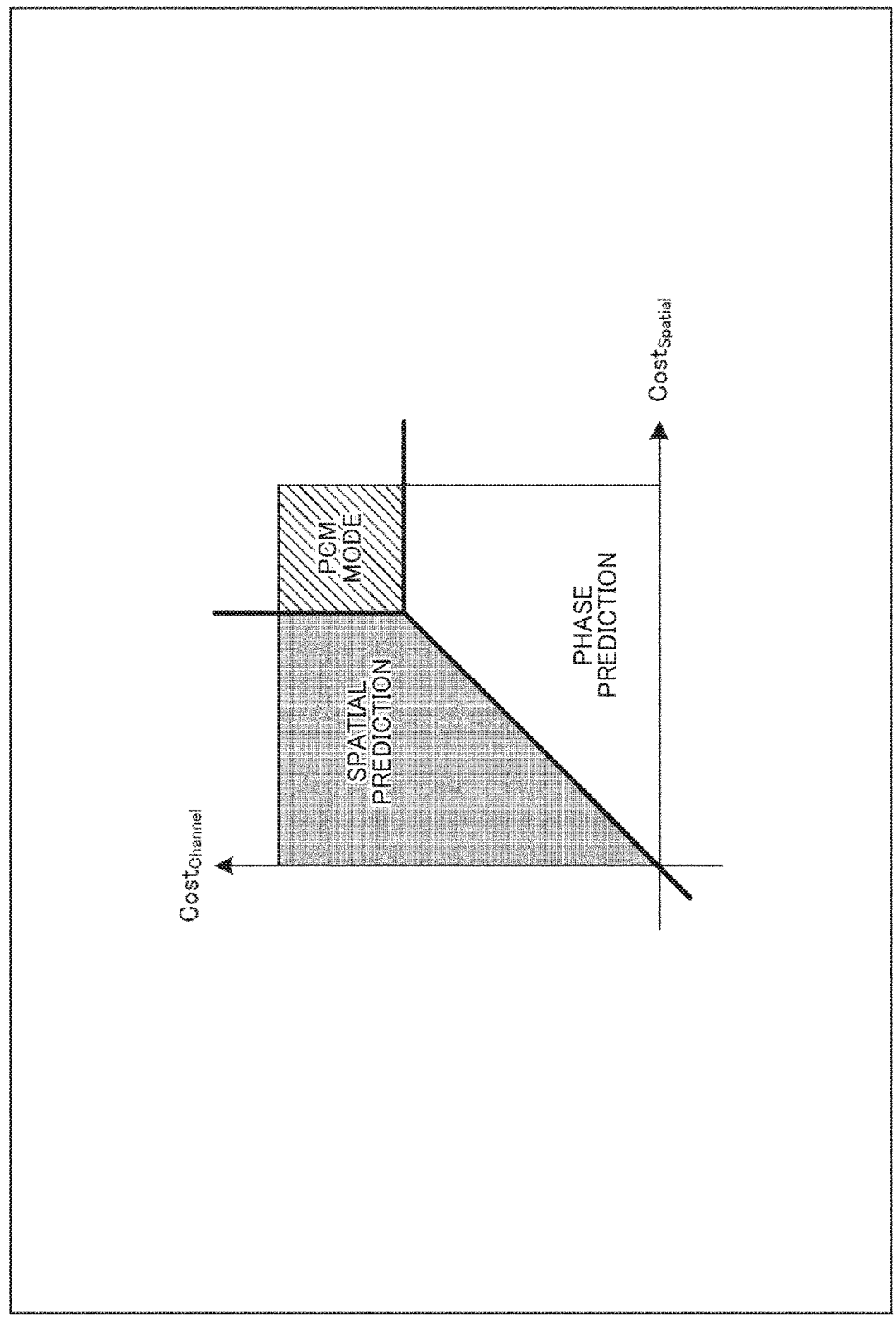
FIG. 56 is a diagram illustrating prediction method selection.

For example, if both the spatial prediction cost and the phase prediction cost are greater than a predetermined threshold, the PCM mode may be selected, as in the graph illustrated in FIG. 56. Additionally, in this case too, if both the spatial prediction cost and the phase prediction cost are less than the predetermined threshold, a predetermined prediction method (phase prediction, in this case) may be selected, as in the graph illustrated in FIG. 37B. Of course, spatial prediction may be selected.

In other words, in this case, the prediction method flag can be configured to be able to take on at least three values, and can therefore specify spatial prediction, phase prediction, and the PCM mode. Then, if both the spatial prediction cost and the phase prediction cost are greater than the predetermined threshold, the prediction method setting unit 112 (the selection unit 213) sets the prediction method flag to a value indicating the PCM mode, as in the graph illustrated in FIG. 56.

The prediction unit 113 makes the prediction based on the prediction method flag in the same manner as in the first embodiment. Accordingly, if the prediction method flag is a value indicating the PCM mode, for example, the prediction unit 113 executes the PCM mode. In other words, the prediction for the pixel to be processed is omitted.

Figure 57:
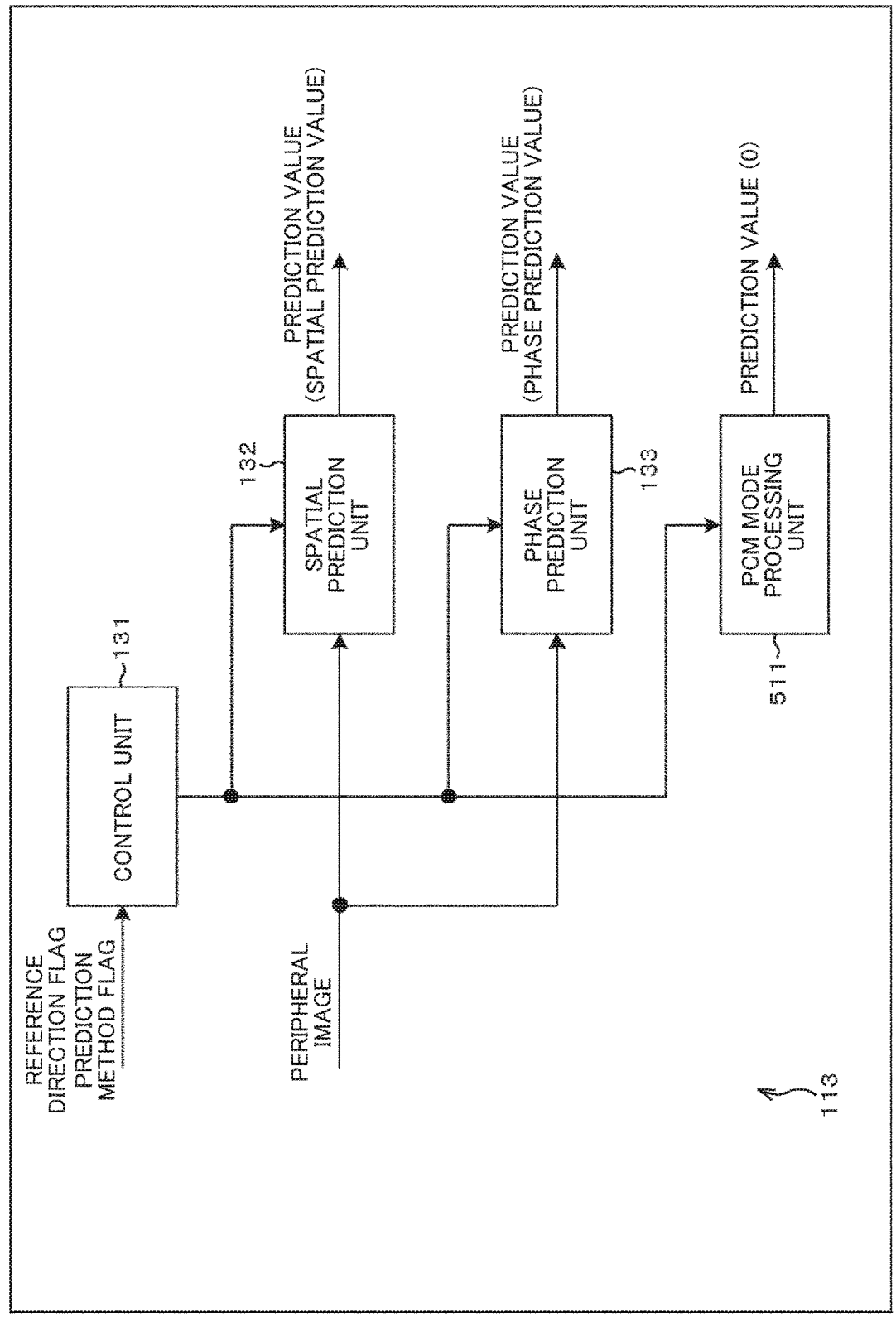
FIG. 57 is a block diagram illustrating an example of the main configuration of a prediction unit.

FIG. 57 illustrates an example of the main configuration of the prediction unit 113 in this case. As illustrated in FIG. 57, in this case, the prediction unit 113 includes a PCM mode processing unit 511 in addition to the configuration illustrated in FIG. 8. Under the control of the control unit 131, the PCM mode processing unit 511 executes the PCM mode. In other words, if, for example, the PCM mode is specified by the prediction method flag, the control unit 131 controls the PCM mode processing unit 511 to execute the PCM mode.

Figure 58:
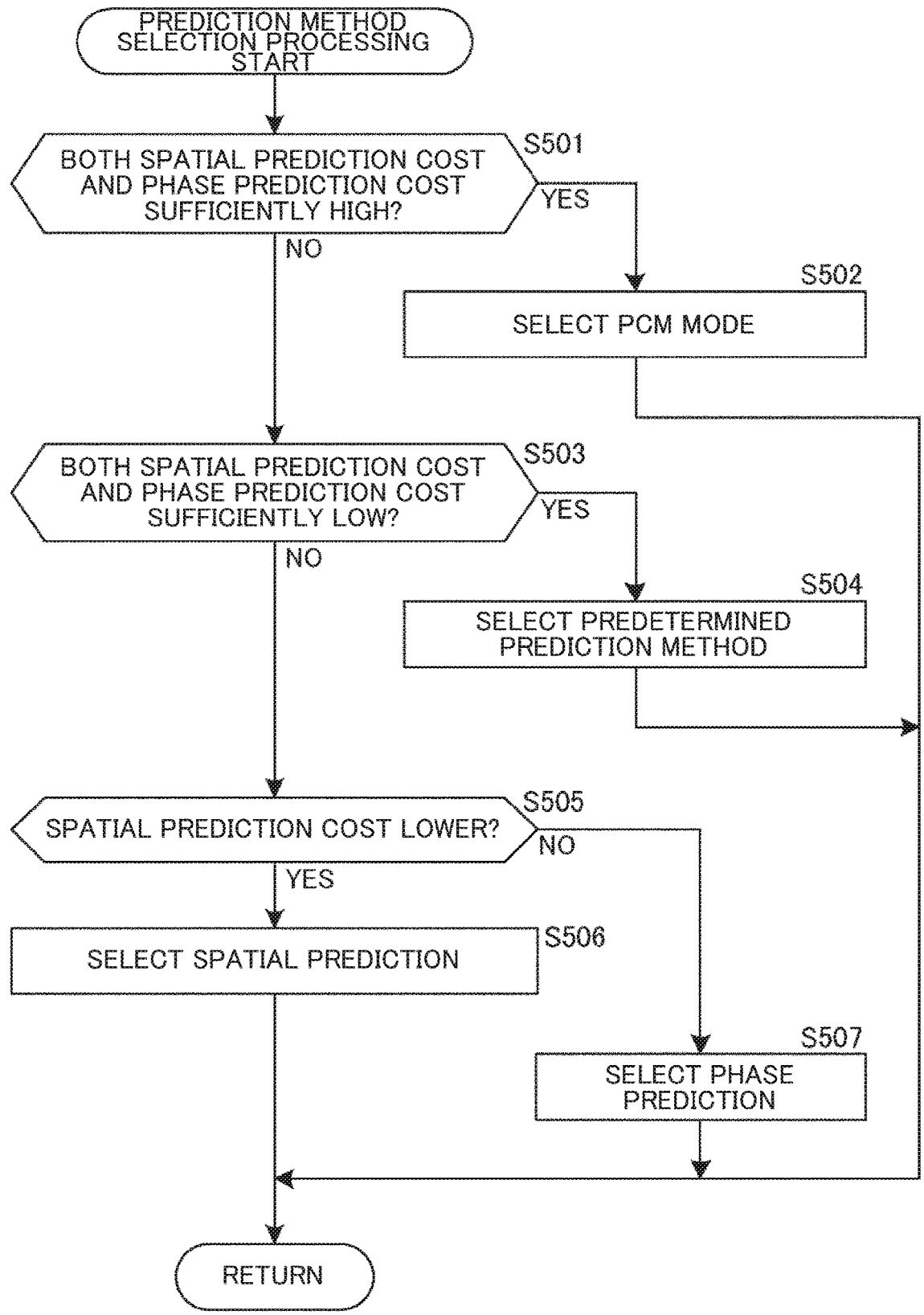
FIG. 58 is a flowchart illustrating an example of the flow of prediction method selection processing.

An example of the flow of the prediction method selection processing (step S133 in FIG. 42) in this case will be described with reference to the flowchart in FIG. 58. Note that the example in this flowchart corresponds to the example of the flowchart in FIG. 50 (the example in FIG. 37B). In other words, this is a combination of an example in which a predetermined prediction method (e.g., phase prediction) is selected when the spatial prediction cost and the phase prediction cost are determined to be sufficiently low, and an example in which the PCM mode is applied when the spatial prediction cost and the phase prediction cost are sufficiently high (the example in FIG. 56). When the prediction method selection processing is started, in step S501, the selection unit 213 determines whether both the spatial prediction cost and the phase prediction cost are sufficiently high. For example, using a predetermined threshold, the selection unit 213 determines whether both the spatial prediction cost and the phase prediction cost are greater than that threshold. If both the spatial prediction cost and the phase prediction cost are determined to be sufficiently high, the processing moves to step S502. In step S502, the selection unit 213 selects the PCM mode. In other words, the selection unit 213 sets the prediction method flag to a value indicating the PCM mode. Once the processing of step S502 ends, the prediction method selection processing ends, and the processing returns to FIG. 42.

Note that in step S501, if at least one of the spatial prediction cost and the phase prediction cost is determined not to be sufficiently high, i.e., if at least one of the spatial prediction cost and the phase prediction cost is less than or equal to the threshold, the processing moves to step S503.

Figure 50:
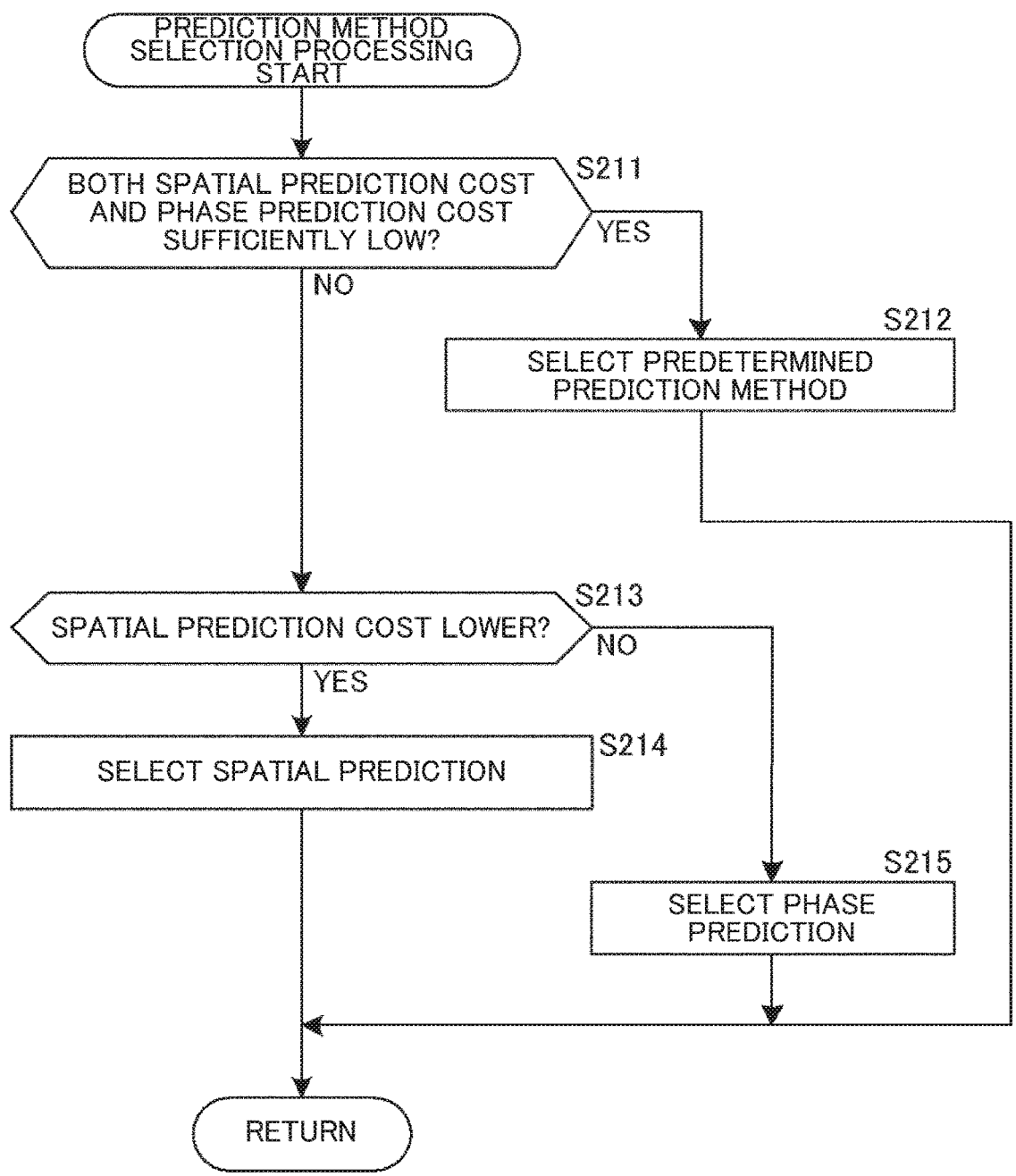
FIG. 50 is a flowchart illustrating an example of the flow of prediction method selection processing.

The processing of step S503 to step S507 is executed in the same manner as the processing of step S211 to step S215 in FIG. 50. Once the processing of step S506 or step S507 ends, the prediction method selection processing ends, and the processing returns to FIG. 42.

Figure 49:
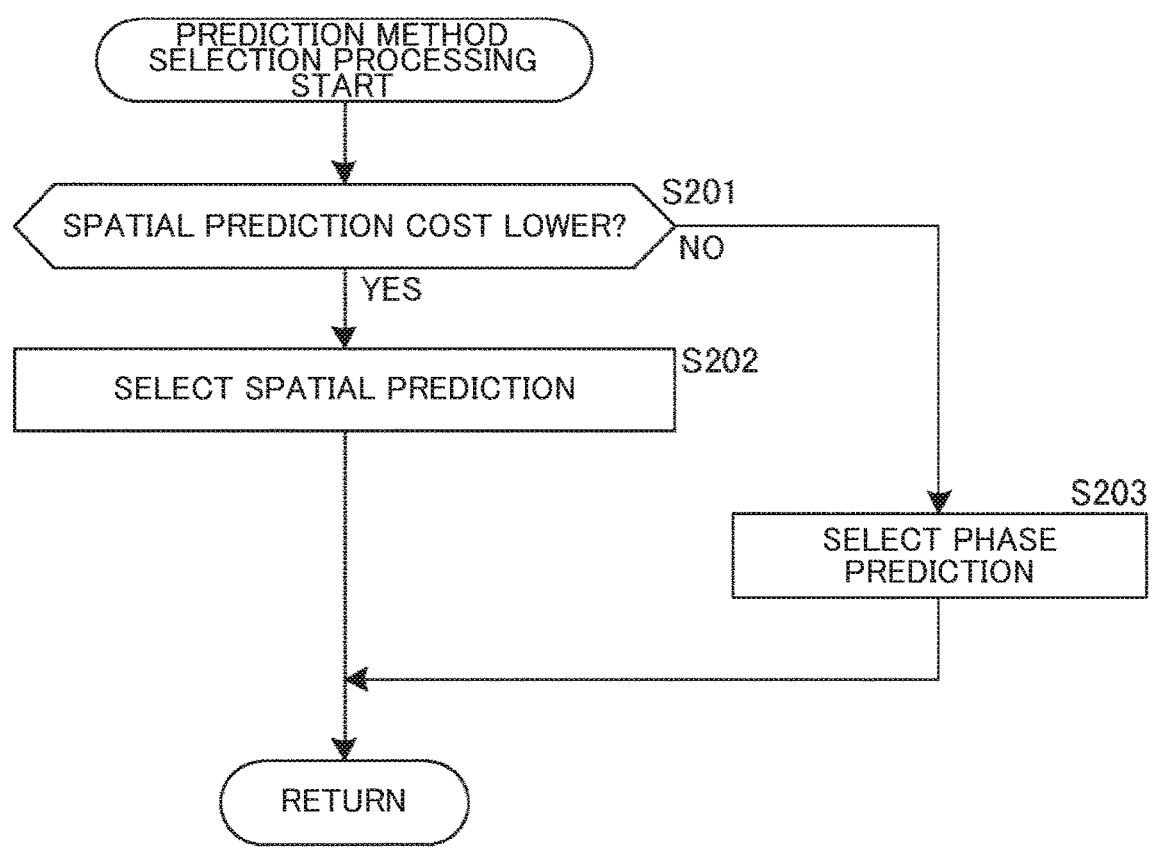
FIG. 49 is a flowchart illustrating an example of the flow of prediction method selection processing.

Note that in step S501, if at least one of the spatial prediction cost and the phase prediction cost is determined not to be sufficiently high, the processing may be performed as in the example illustrated in FIG. 49. In other words, the example in which the spatial prediction cost and the phase prediction cost are not determined to be sufficiently low (the example in FIG. 37A) may be combined with the example in which the PCM mode is applied when the spatial prediction cost and the phase prediction cost are sufficiently high (the example in FIG. 56). In this case, the processing of step S503 and step S504 is omitted. In other words, if, in step S501, at least one of the spatial prediction cost and the phase prediction cost is determined not to be sufficiently high, the processing may move to step S505.

Figure 59:
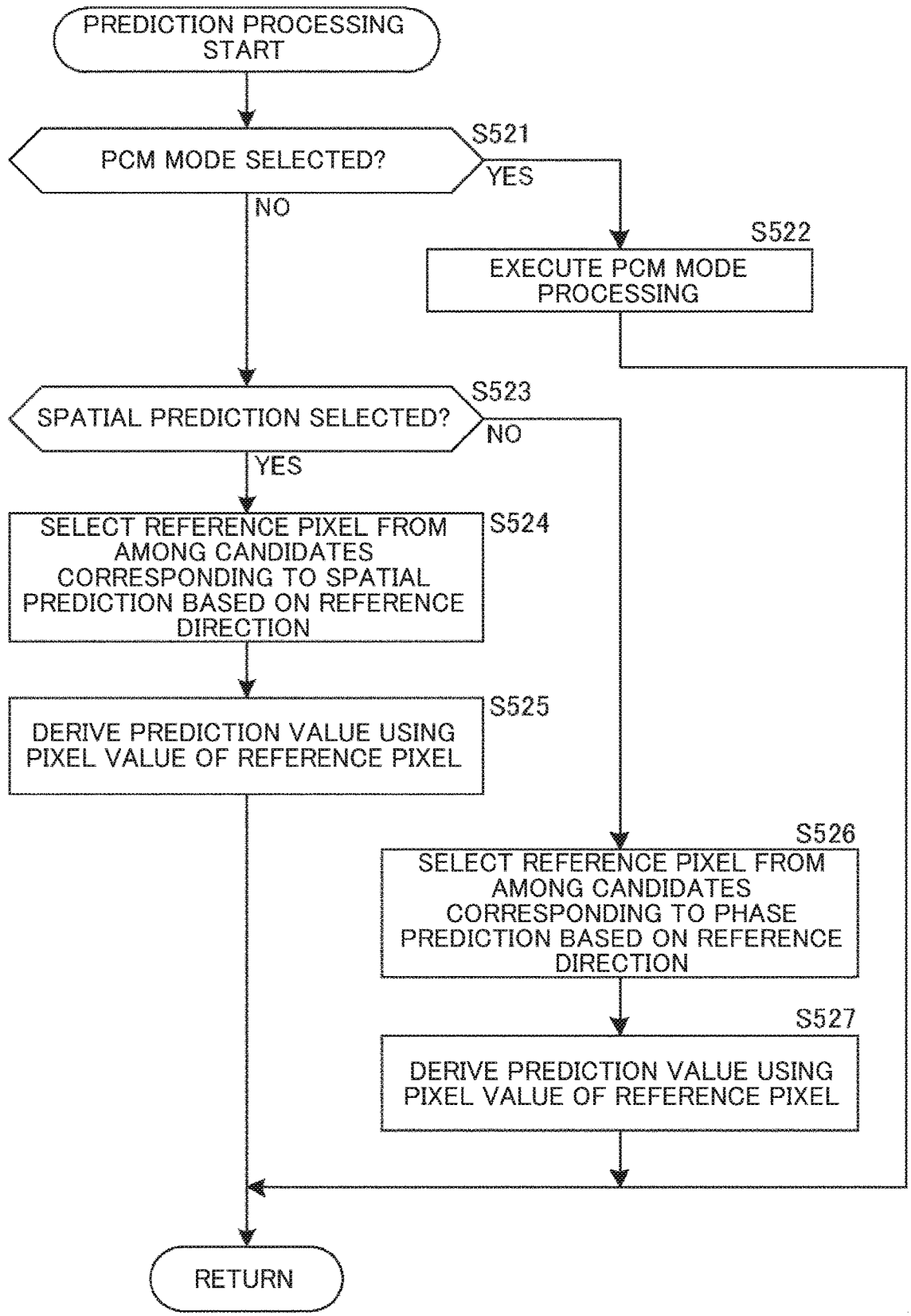
FIG. 59 is a flowchart illustrating an example of the flow of prediction processing.

An example of the flow of the prediction processing in a case where the PCM mode is applied when the spatial prediction cost and the phase prediction cost are sufficiently high will be described with reference to the flowchart in FIG. 59. This example corresponds to the example of the flowchart in FIG. 51. When the prediction processing is started, in step S521, the control unit 131 determines whether the PCM mode has been selected based on the prediction method flag. If it is determined that the PCM mode has been selected, the processing moves to step S522. In step S522, the PCM mode processing unit 511 executes PCM mode processing. Once the processing of step S522 ends, the prediction processing ends, and the processing returns to FIG. 40.

If, in step S521, it is determined that the PCM mode has not been selected, the processing moves to step S523. The processing of step S523 to step S527 is executed in the same manner as the processing of step S231 to step S235 in FIG. 51. Once the processing of step S525 or step S527 ends, the prediction processing ends, and the processing returns to FIG. 40.

By making it possible to apply the PCM mode in this manner, the image encoding device 100 can ensure a minimum level of image quality for data in which the effect of the prediction is low.

Additionally, in the image decoding device 400, the PCM mode may be made applicable, as indicated in the seventh row from the top of the table in FIG. 6 (Method 2-2). For example, the prediction unit 412 may apply the PCM mode based on information indicating that the PCM mode is to be applied, included in the bitstream.

Figure 60:
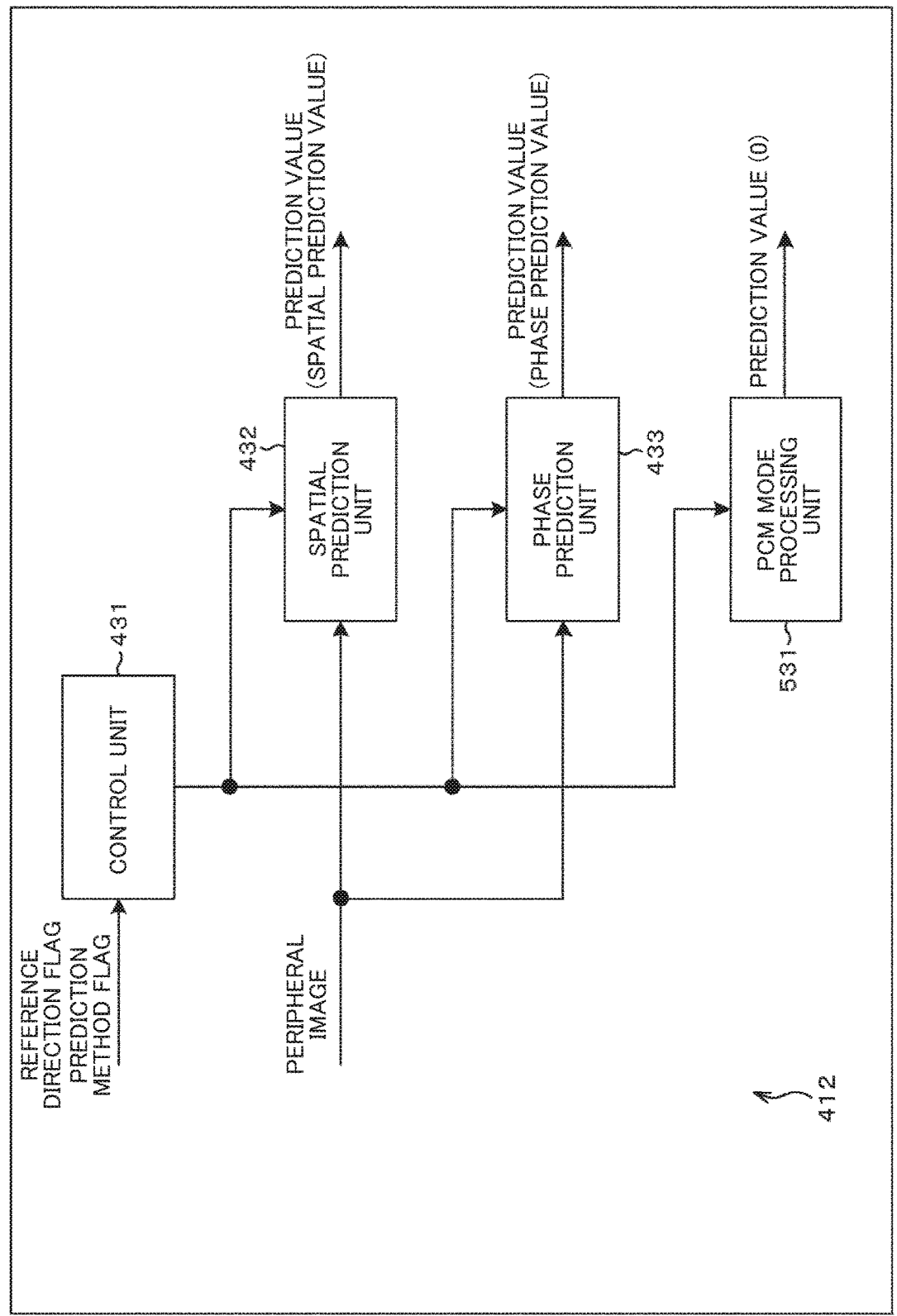
FIG. 60 is a block diagram illustrating an example of the main configuration of a prediction unit.

FIG. 60 illustrates an example of the main configuration of the prediction unit 412 in this case. As illustrated in FIG. 60, in this case, the prediction unit 412 includes a PCM mode processing unit 531 in addition to the configuration illustrated in FIG. 53. Under the control of the control unit 431, the PCM mode processing unit 531 executes the PCM mode. In other words, in this case, the prediction method flag can be configured to be able to take on at least three values, and can therefore specify spatial prediction, phase prediction, and the PCM mode. Then, if, for example, the PCM mode is specified by the prediction method flag, the control unit 431 controls the PCM mode processing unit 531 to execute the PCM mode.

Figure 61:
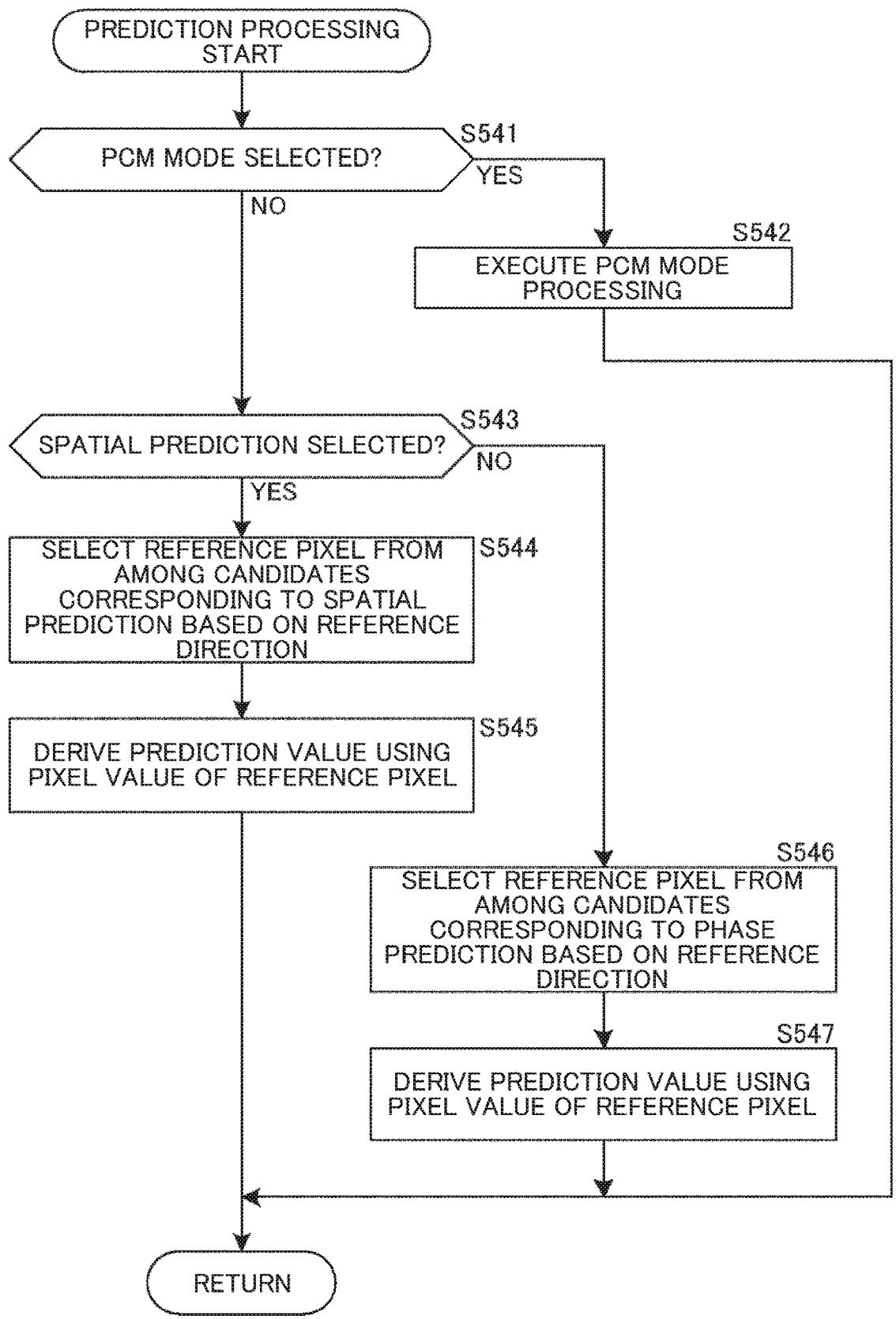
FIG. 61 is a flowchart illustrating an example of the flow of prediction processing.

The prediction processing in this case is performed as indicated in the flowchart illustrated in FIG. 61. In other words, if the prediction method flag indicates that the PCM mode is selected, the PCM mode processing is executed, as in step S541 and step S542. Otherwise, the processing is performed in the same manner as in FIG. 55. In other words, the processing of step S541 to step S547 is executed in the same manner as the processing of step S521 to step S527 in FIG. 59.

By making it possible to apply the PCM mode in this manner, the image decoding device 400 can ensure a minimum level of image quality for data in which the effect of the prediction is low.

5. Application Examples of Present Technique

<Block Configuration>

Figure 62B:
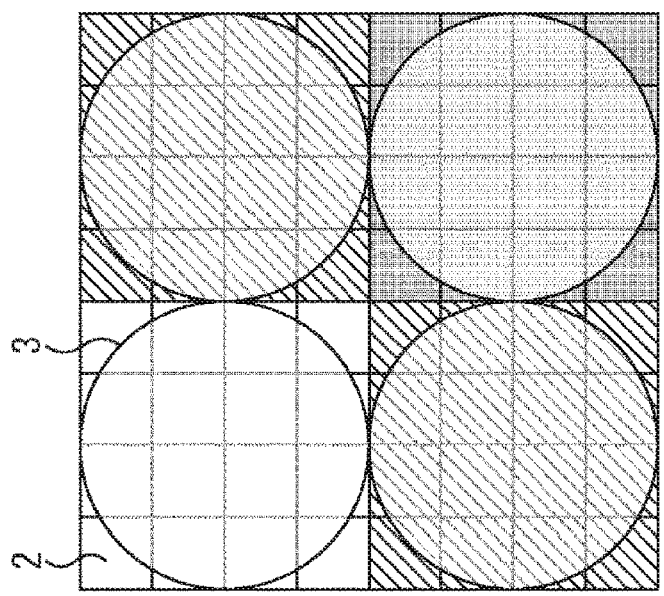
FIGS. 62A and 62B are diagrams illustrating an example of a pixel configuration.
Figure 62A:
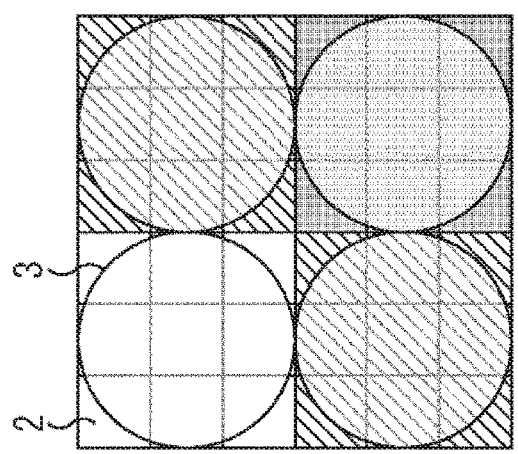

Although the foregoing has described the block of the pixel array of the image sensor that generates the RAW image (i.e., the block of the RAW image) as being constituted by 2×2 pixels, the block may be constituted by any number of pixels. For example, the block may be constituted by 3×3 pixels, as illustrated in FIG. 62A, or the block may be constituted by 4×4 pixels, as illustrated in FIG. 62B. In other words, a single microlens may be formed for 3×3 pixels, or a single microlens may be formed for 4×4 pixels. In other words, the present invention is not limited to a 2×2 OCL, and can be applied to any N×N OCL format (where N is an integer of 2 or more). In this case too, each of the plurality of pixels in the block has a filter having identical transmission wavelength characteristics. Additionally, although the foregoing describes filters that transmit red, green, and blue wavelength bands as examples of the filters, the transmission wavelength bands are not limited thereto, and the filters may have any transmission wavelength bands as long as the pixels in the block have identical transmission wavelength characteristics. In other words, a filter that transmits a wavelength band other than red, green, and blue may be applied as the filter formed for each pixel. Additionally, although the Bayer format has been described as an example of the arrangement pattern for pixels having filters with identical transmission wavelength characteristics, the arrangement pattern is not limited thereto, and any arrangement pattern that uses units of blocks (an arrangement pattern in which the pixels in the block have the same transmission wavelength characteristics) may be used. For example, the arrangement of the blocks constituted by pixels of each color is not limited to the examples in FIG. 1 and FIG. 4. In addition, there may be any number of types (colors) of transmission wavelength characteristics in the block, and the number is not limited to the above-described example of three colors (a block constituted by red pixels, a block constituted by green pixels, and a block constituted by blue pixels). For example, the pixel array of the image sensor that generates the RAW image may be constituted by four or more types of blocks.

<Image Processing System>

Figure 63:
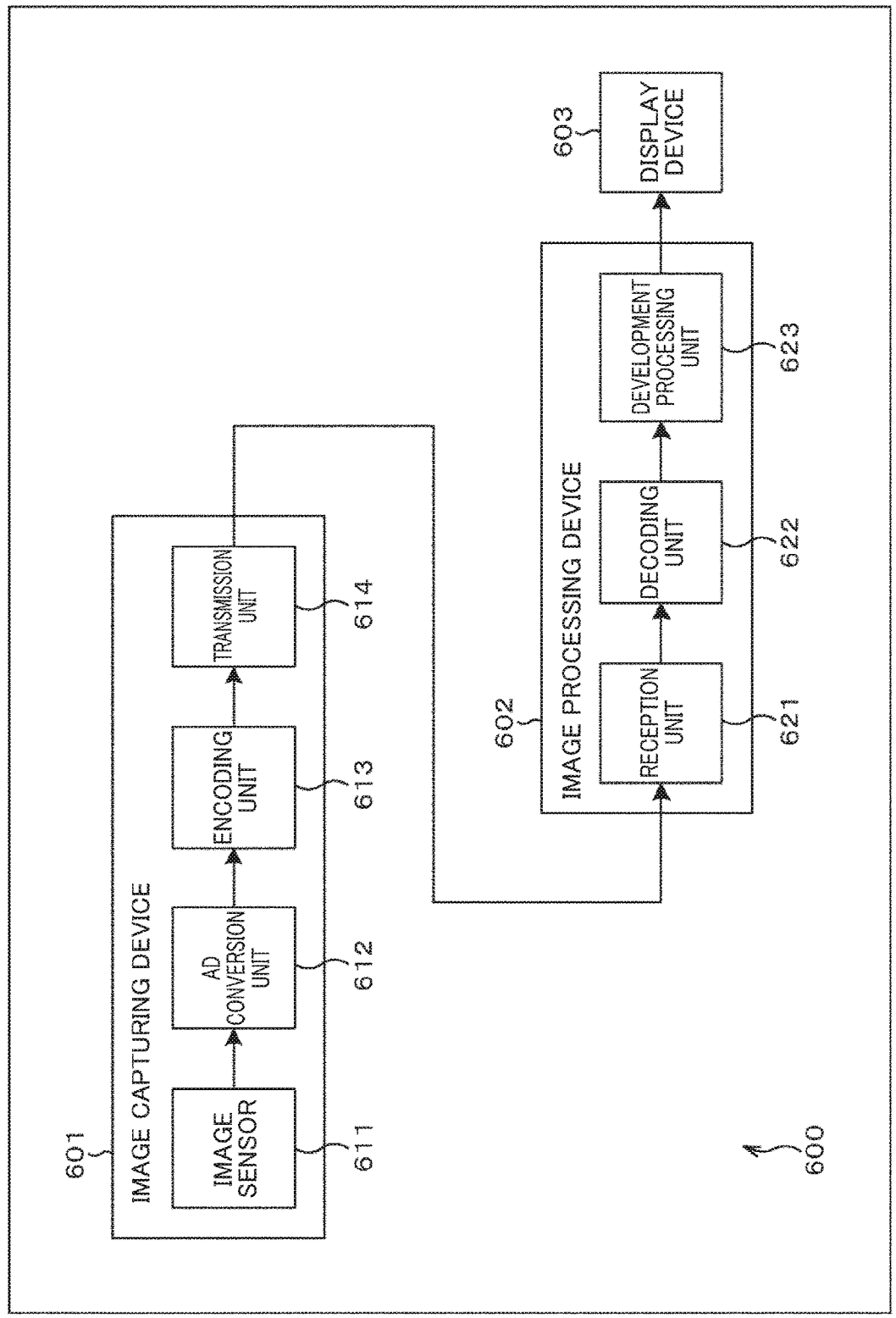
FIG. 63 is a diagram illustrating an example of the main configuration of an image processing system.
Figure 64:
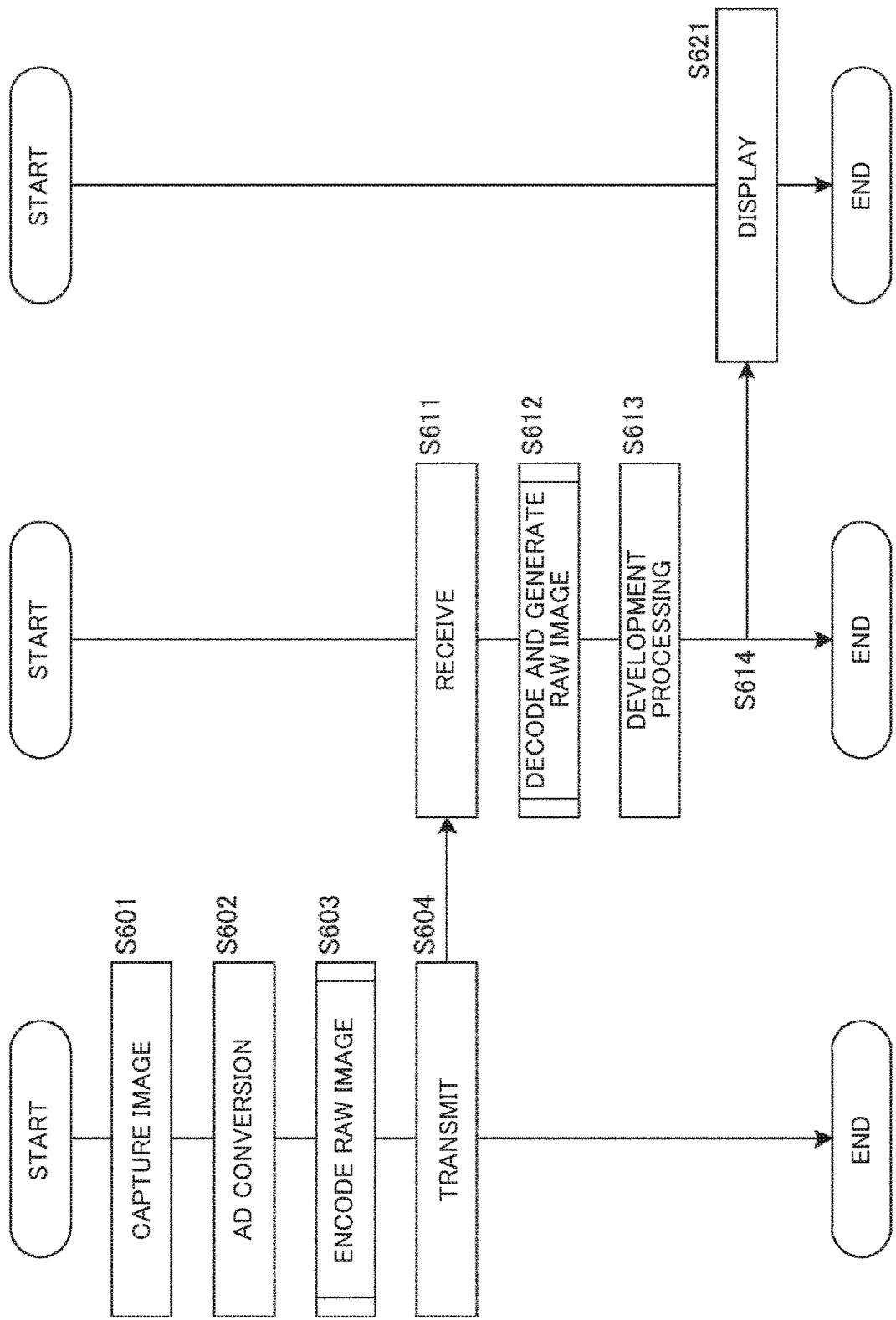
FIG. 64 is a flowchart illustrating an example of the flow of image processing.

The present technique can be applied in any desired configuration. For example, the present technique can be applied in data transmission between devices in an image processing system 600 illustrated in FIG. 63. An image capturing device 601, an image processing device 602, and a display device 603 of the image processing system 600 perform processing as indicated by the flowchart illustrated in FIG. 64, and a RAW image generated by an image sensor 611 is transmitted from the image capturing device 601 to the image processing device 602. At this time, the RAW image is transmitted to the image processing device 602 as encoded data (a bitstream).

To be more specific, the image capturing device 601 includes the image sensor 611, an AD conversion unit 612, an encoding unit 613, and a transmission unit 614. The image sensor 611 captures an image of a subject and generates a RAW image (step S601). The AD conversion unit 612 AD-converts the RAW image and generates a digital data RAW image (step S602). The encoding unit 613 encodes the RAW image (digital data) and generates a bitstream (step S603). The transmission unit 614 transmits the bitstream (step S604).

The image processing device 602 includes a reception unit 621, a decoding unit 622, and a development processing unit 623. The reception unit 621 receives the bitstream transmitted from the image capturing device 601 (the transmission unit 614) (step S611). The decoding unit 622 decodes the bitstream and generates (restores) the RAW image (step S612). The development processing unit 653 performs development processing and the like on the RAW image and generates a display image (step S613). The development processing unit 653 supplies the display image to the display device 603 (step S614). The display device 603 displays the display image (step S621).

The present technique may be applied in such an image processing system 600. In other words, the image sensor 611 is a 2×2 OCL image sensor in a quad configuration and generates a RAW image configured as in the example illustrated in FIGS. 1 and 4, and the image encoding device 100 described above may be applied as the encoding unit 613. The image decoding device 400 described above may be applied as the decoding unit 622.

Doing so makes it possible to perform the prediction taking into account the pixel value distribution characteristics unique to 2×2 OCL (the occurrence of deviation). In other words, phase prediction, which has a higher prediction accuracy for parts where deviation occurs as described with reference to FIGS. 3 and 4, can be applied to those parts, whereas spatial prediction, which has a higher prediction accuracy for parts where deviation does not occur, can be applied to those parts. In other words, the prediction method having the higher prediction accuracy can be applied to both parts where deviation occurs and parts where no deviation occurs. This makes it possible to suppress a drop in the prediction accuracy, and therefore suppress a drop in the encoding efficiency. Of course, the block configuration of the image sensor 611 (i.e., the RAW image) is not limited to 2×2, and may be N×N (where N is an integer of 2 or more), as described above.

Figure 65:
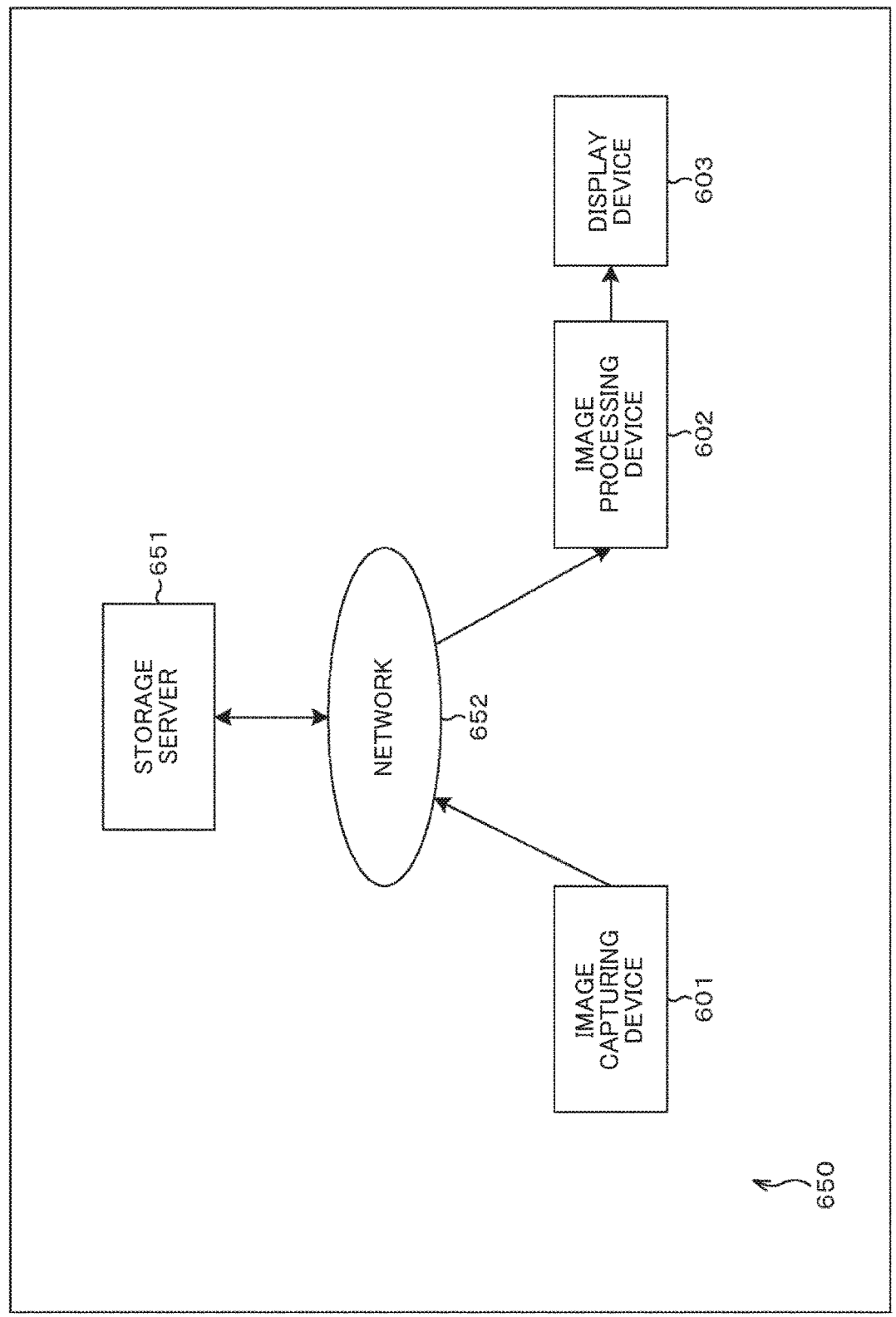
FIG. 65 is a diagram illustrating an example of the main configuration of an image processing system.

Note that this data transmission may be performed via a storage server 651, as in an image processing system 650 illustrated in FIG. 65. In other words, the image capturing device 601 uploads the bitstream to the storage server 651 over a network 652. The image processing device 602 downloads the bitstream from the storage server 651 over the network 652.

In such a case as well, the present technique can be applied in the same manner as in the case of the image processing system 600. Applying the present technique makes it possible to perform the prediction taking into account the pixel value distribution characteristics unique to 2×2 OCL (the occurrence of deviation). In other words, phase prediction, which has a higher prediction accuracy for parts where deviation occurs as described with reference to FIGS. 3 and 4, can be applied to those parts, whereas spatial prediction, which has a higher prediction accuracy for parts where deviation does not occur, can be applied to those parts. In other words, the prediction method having the higher prediction accuracy can be applied to both parts where deviation occurs and parts where no deviation occurs. This makes it possible to suppress a drop in the prediction accuracy, and therefore suppress a drop in the encoding efficiency.

Figure 66:
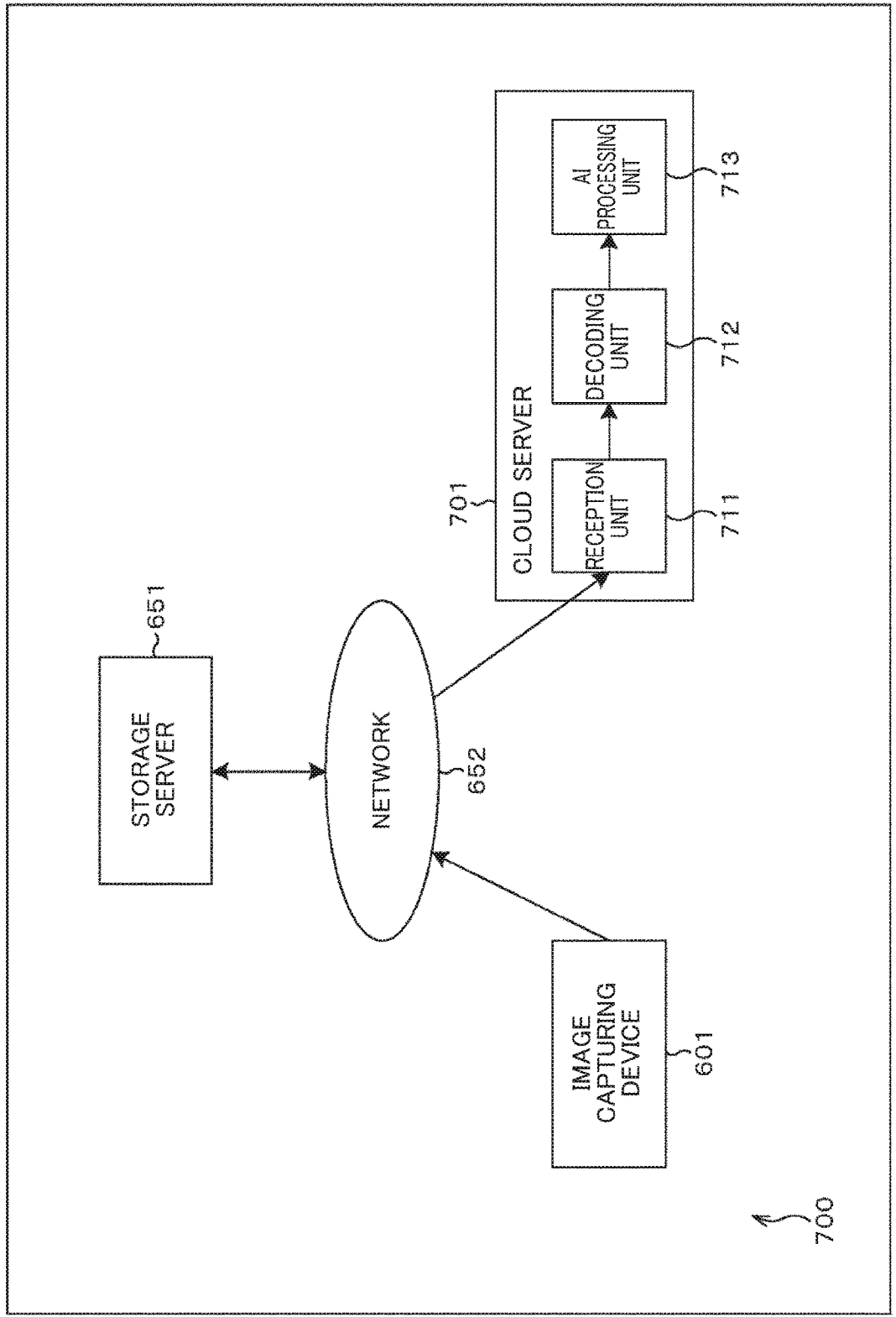
FIG. 66 is a diagram illustrating an example of the main configuration of an image processing system.

Note that the bitstream may be supplied from a cloud server 701, as in an image processing system 700 illustrated in FIG. 66. The image processing system 700 includes the cloud server 701 in place of the image processing device 602 and the display device 603 of the image processing system 650 (FIG. 65). The cloud server 701 downloads the bitstream from the storage server 651, decodes the downloaded bitstream, and performs training processing using the decoded image.

To be more specific, the cloud server 701 includes a reception unit 711, a decoding unit 712, and an Artificial Intelligence (AI) processing unit 713. The reception unit 711 downloads the bitstream from the storage server 651 over the network 652. The decoding unit 712 decodes the downloaded bitstream and generates (restores) the RAW image. The AI processing unit 713 performs training processing using the RAW image. The present technique may be applied to such a cloud server 701. In other words, the image decoding device 400 may be applied as the decoding unit 712.

Doing so makes it possible to perform the prediction taking into account the pixel value distribution characteristics unique to 2×2 OCL (the occurrence of deviation). In other words, phase prediction, which has a higher prediction accuracy for parts where deviation occurs as described with reference to FIGS. 3 and 4, can be applied to those parts, whereas spatial prediction, which has a higher prediction accuracy for parts where deviation does not occur, can be applied to those parts. In other words, the prediction method having the higher prediction accuracy can be applied to both parts where deviation occurs and parts where no deviation occurs. This makes it possible to suppress a drop in the prediction accuracy, and therefore suppress a drop in the encoding efficiency.

<Image Processing Device>

The present technique can also be applied when holding and storing a RAW image in a device.

Figure 67:
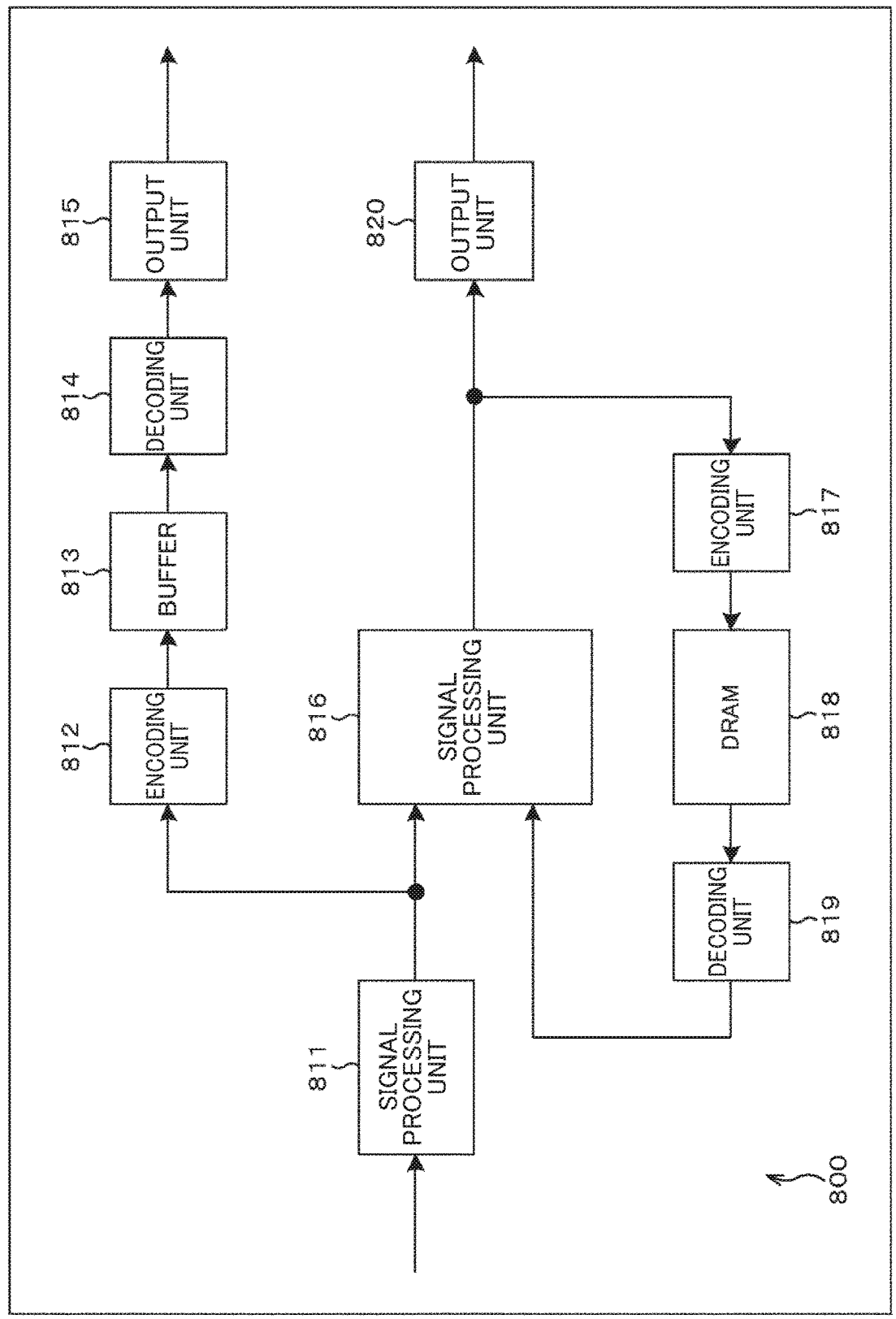
FIG. 67 is a block diagram illustrating an example of the main configuration of an image processing device.

For example, an image processing device 800 illustrated in FIG. 67 includes a signal processing unit 811, an encoding unit 812, a buffer 813, a decoding unit 814, an output unit 815, a signal processing unit 816, an encoding unit 817, a Dynamic Random Access Memory (DRAM) 818, a decoding unit 819, and an output unit 820.

Figure 68:
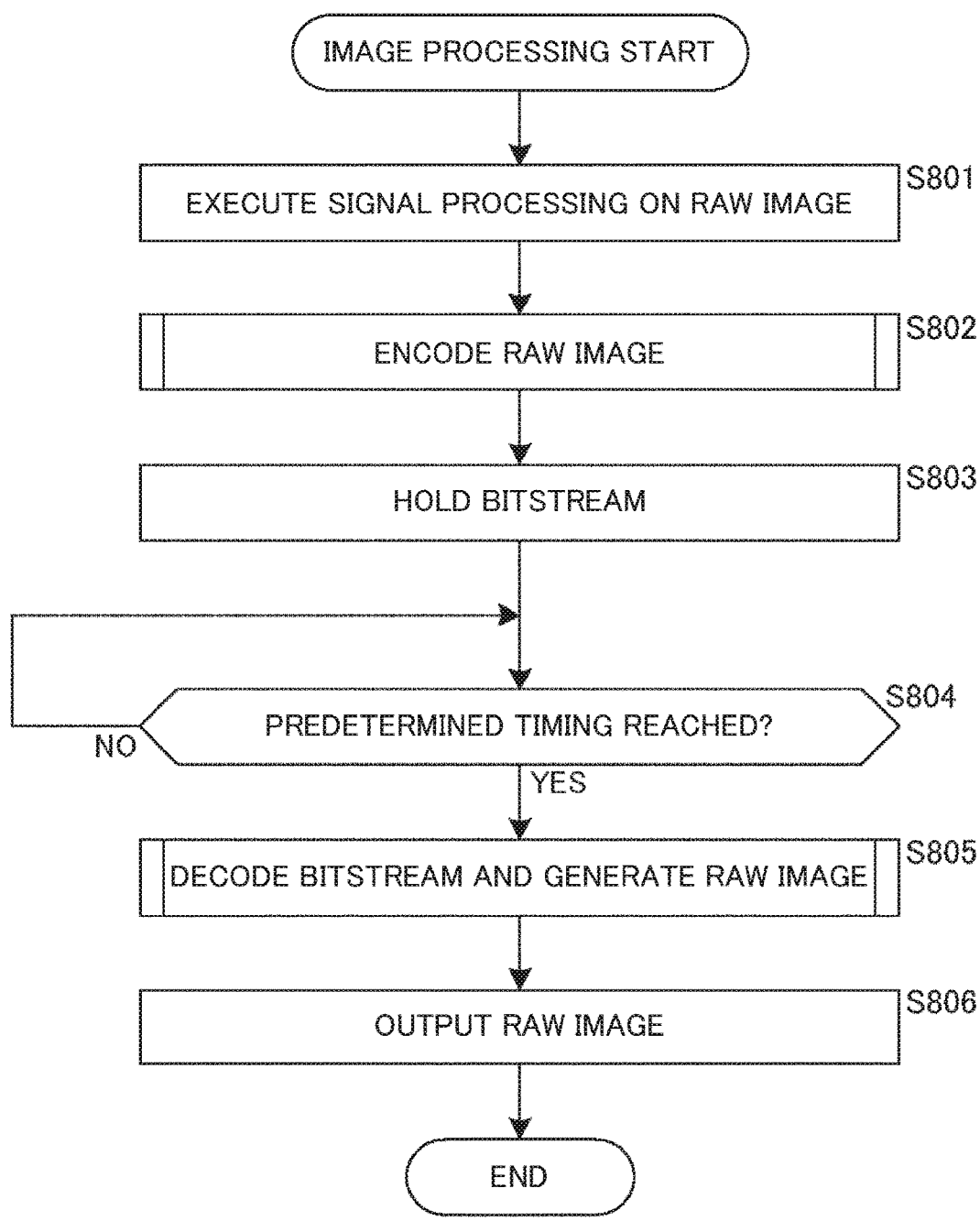
FIG. 68 is a flowchart illustrating an example of the flow of image processing.

In such an image processing device 800, image processing may be executed as in the flowchart illustrated in FIG. 68. In other words, the signal processing unit 811 obtains a RAW image generated by an image sensor having a quad-configuration 2×2 OCL pixel array (a RAW image configured as in the example in FIGS. 1 and 4). The signal processing unit 811 then performs predetermined signal processing on the RAW image (step S801). The encoding unit 812 encodes the RAW image subjected to the signal processing by the signal processing unit 811 and generates a bitstream (step S802). The buffer 813 holds the bitstream (step S803). The decoding unit 814 stands by until a predetermined timing is reached (step S804), and at the predetermined timing, reads out and decodes the bitstream to generate (restore) the RAW image (step S805). The output unit 815 outputs the restored RAW image (step S806).

Holding the RAW image in the buffer 813 in this manner makes it possible for the image processing device 800 to control the timing at which the RAW image is output. The encoding unit 812 then encodes the RAW image and holds the encoded RAW image in the buffer 813 as a bitstream, which makes it possible to suppress an increase in the necessary storage capacity in the buffer 813. This in turn makes it possible to suppress an increase in the circuit scale, the manufacturing cost, and the like of the image processing device 800.

The present technique may be applied at this time. In other words, the image encoding device 100 may be applied as the encoding unit 812. Likewise, the image decoding device 400 may be applied as the decoding unit 814. Doing so makes it possible to perform the prediction taking into account the pixel value distribution characteristics unique to 2×2 OCL (the occurrence of deviation). In other words, phase prediction, which has a higher prediction accuracy for parts where deviation occurs as described with reference to FIGS. 3 and 4, can be applied to those parts, whereas spatial prediction, which has a higher prediction accuracy for parts where deviation does not occur, can be applied to those parts. In other words, the prediction method having the higher prediction accuracy can be applied to both parts where deviation occurs and parts where no deviation occurs. This makes it possible to suppress a drop in the prediction accuracy, and therefore suppress a drop in the encoding efficiency. Accordingly, an increase in the necessary storage capacity in the buffer 813 can be further suppressed.

Figure 69:
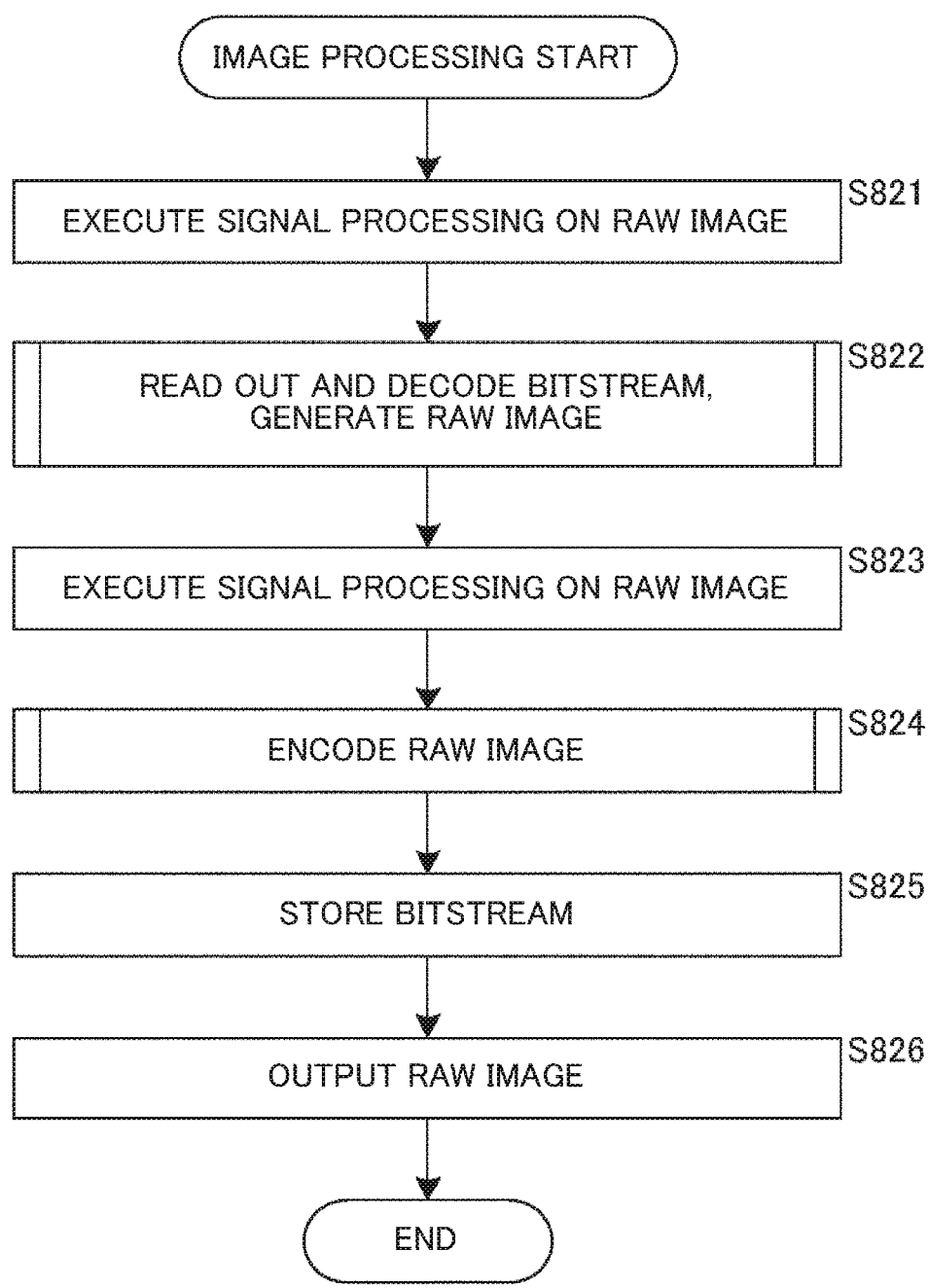
FIG. 69 is a flowchart illustrating an example of the flow of image processing.

In this image processing device 800, image processing may be executed as in the flowchart illustrated in FIG. 69 as well. In other words, the signal processing unit 811 obtains a RAW image generated by an image sensor having a quad-configuration 2×2 OCL pixel array (a RAW image configured as in the example in FIGS. 1 and 4). The signal processing unit 811 then performs predetermined signal processing on the RAW image (step S821). The signal processing unit 811 supplies the RAW image subjected to signal processing to the signal processing unit 816. The decoding unit 819 reads out and decodes the bitstream temporarily stored in the DRAM 818 at any desired timing and generates (restores) the RAW image (step S822). The decoding unit 819 feeds back the restored RAW image to the signal processing unit 816. The signal processing unit 816 performs predetermined signal processing on the RAW image supplied from the signal processing unit 811 using the RAW image fed back from the decoding unit 819 (step S823). The encoding unit 817 encodes the RAW image subjected to the signal processing by the signal processing unit 816 and generates a bitstream (step S802). The buffer 813 holds the bitstream (step S803). The signal processing unit 816 supplies the RAW image subjected to the signal processing to the encoding unit 817 and the output unit 820. The encoding unit 817 encodes the RAW image subjected to the signal processing by the signal processing unit 816 and generates a bitstream (step S824). The DRAM 818 temporarily stores the bitstream (step S825). The decoding unit 819 reads out and decodes the bitstream, temporarily stored in the DRAM 818, in the processing of step S822 for another processing target, and feeds the result back to the signal processing unit 816. The output unit 820 outputs the RAW image subjected to the signal processing by the signal processing unit 816 (step S826).

Storing the RAW image temporarily in the DRAM 818 in this manner makes it possible for the image processing device 800 to feed the RAW image back to the signal processing unit 816 at any desired timing. In other words, the image processing device 800 can use the processed RAW image for processing performed by the signal processing unit 816 at a later point in time. The encoding unit 817 then encodes the RAW image and temporarily holds the encoded RAW image in the DRAM 818 as a bitstream, which makes it possible to suppress an increase in the necessary storage capacity in the DRAM 818. This in turn makes it possible to suppress an increase in the circuit scale, the manufacturing cost, and the like of the image processing device 800.

The present technique may be applied at this time. In other words, the image encoding device 100 may be applied as the encoding unit 817. Likewise, the image decoding device 400 may be applied as the decoding unit 819. Doing so makes it possible to perform the prediction taking into account the pixel value distribution characteristics unique to 2×2 OCL (the occurrence of deviation). In other words, phase prediction, which has a higher prediction accuracy for parts where deviation occurs as described with reference to FIGS. 3 and 4, can be applied to those parts, whereas spatial prediction, which has a higher prediction accuracy for parts where deviation does not occur, can be applied to those parts. In other words, the prediction method having the higher prediction accuracy can be applied to both parts where deviation occurs and parts where no deviation occurs. This makes it possible to suppress a drop in the prediction accuracy, and therefore suppress a drop in the encoding efficiency. Accordingly, an increase in the necessary storage capacity in the DRAM 818 can be suppressed.

In the case of this image processing device 800 too, the block configuration of the RAW image (i.e., the image sensor that generates the RAW image) is not limited to 2×2, and may be N×N (where N is an integer of 2 or more), as described above.

6. Supplementary Notes

<Computer>

The series of processing described above can be executed by hardware, or can be executed by software. When the series of processing is executed by software, a program that constitutes the software is installed on a computer. Here, the computer includes, for example, a computer built in dedicated hardware and a general-purpose personal computer in which various programs are installed to be able to execute various functions.

Figure 70:
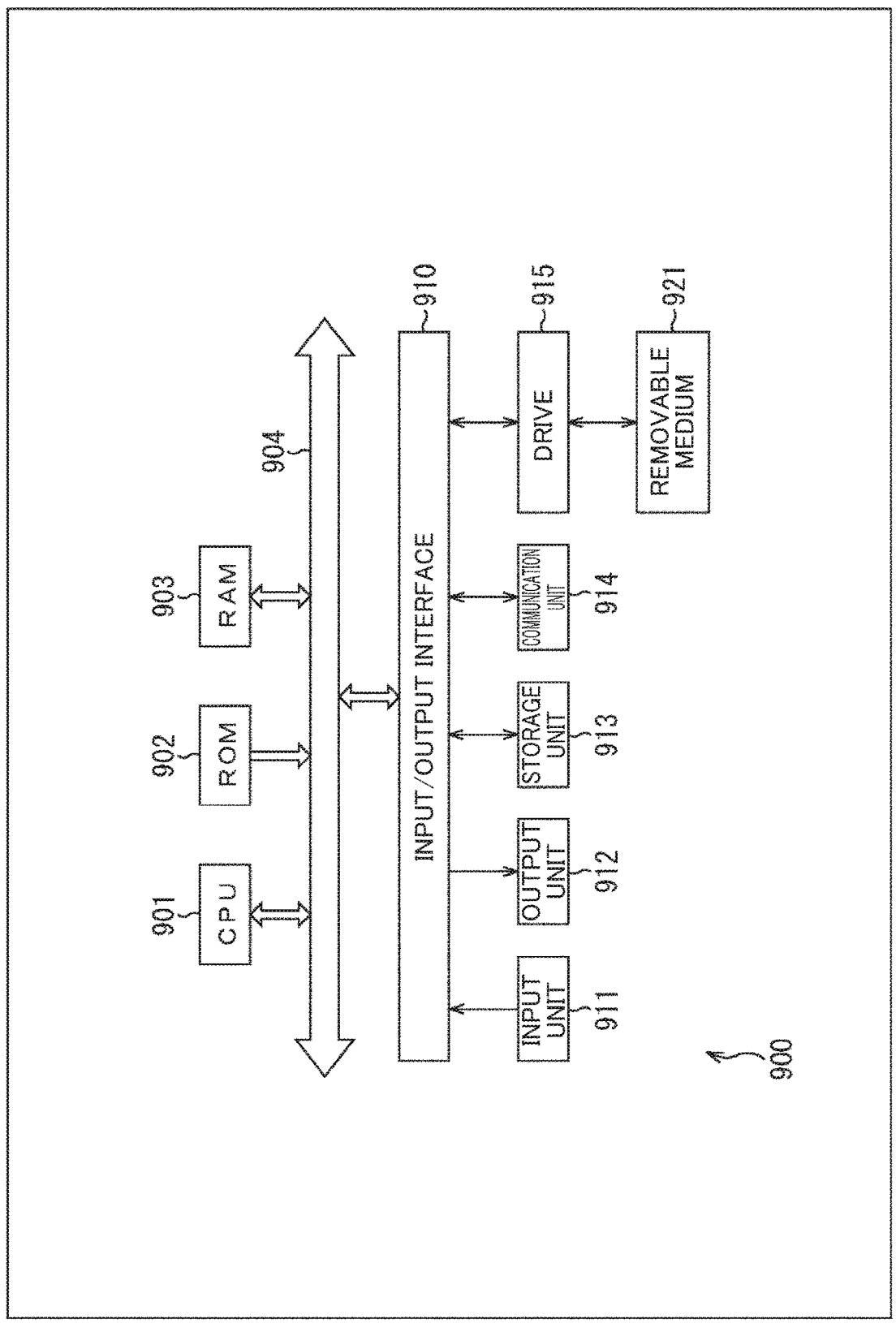
FIG. 70 is a block diagram illustrating an example of the main configuration of a computer.

FIG. 70 is a block diagram illustrating an example of the hardware configuration of a computer that executes the series of processing described above according to a program.

In a computer 900 illustrated in FIG. 70, a Central Processing Unit (CPU) 901, Read Only Memory (ROM) 902, and Random Access Memory (RAM) 903 are connected to each other by a bus 904.

An input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, and non-volatile memory. The communication unit 914 includes, for example, a network interface. The drive 915 drives a removable medium 921 such as a magnetic disk, an optical disk, a magneto-optical disk, semiconductor memory, or the like.

In the computer that has the above configuration, for example, the CPU 901 executes the above-described series of processing by loading a program stored in the storage unit 913 to the RAM 903 via the input/output interface 910 and the bus 904 and executing the program. Data and the like necessary for the CPU 901 to execute the various kinds of processing is also stored as appropriate in the RAM 903.

The program executed by the computer can be recorded in, for example, the removable medium 921 as a package medium or the like and provided in such a form. In this case, the program may be installed in the storage unit 913 via the input/output interface 910 by inserting the removable medium 921 into the drive 915.

Additionally, the program may also be provided via a wired or wireless transmission medium such as a local area network, the Internet, or digital satellite broadcasting. In this case, the program can be received by the communication unit 914 and installed in the storage unit 913.

In addition, this program can be installed in advance in the ROM 902, the storage unit 913, or the like.

<Application of the Present Technique>

The present technique can be applied in any image encoding/decoding method. In other words, the various types of processing pertaining to image encoding, such as coefficient transforms (inverse coefficient transforms), quantization (inverse quantization), encoding, prediction, and the like, may have any specifications, and are not limited to the examples described above, as long as such specifications do not conflict with the present technique described above. In addition, some of the processing may be omitted as long as doing so does not conflict with the present technique described above.

The present technique can be applied in a multi-viewpoint image encoding system that encodes a multi-viewpoint image including images from multiple viewpoints (views). The present technique can also be applied in a multi-viewpoint image decoding system that decodes the encoded data of a multi-viewpoint image including images from multiple viewpoints (views). In this case, the present technique may be applied in the encoding and decoding of each viewpoint (view).

Furthermore, the present technique can be applied in a hierarchical image encoding (scalable encoding) system that encodes a hierarchical image having a plurality of (hierarchical) layers so as to have a function for scalability with respect to a predetermined parameter. The present technique can also be applied in a hierarchical image decoding (scalable decoding) system that decodes the encoded data of a hierarchical image having a plurality of (hierarchical) layers so as to have a function for scalability with respect to a predetermined parameter. In this case, the present technique may be applied in the encoding and decoding of each layer.

The present technique can be applied in any desired configuration.

For example, the present technique can be applied in various electronic devices such as transmitters and receivers (e.g., television receivers and cellular phones) in satellite broadcasting, wired broadcasting such as cable TV, transmission on the Internet, transmission to terminals according to cellular communication, and the like, or devices (e.g., hard disk recorders and cameras) that record images in media such as an optical disk, a magnetic disk, and a flash memory or reproduce images from these storage media.

Additionally, for example, the present technique can be implemented as a configuration of a part of a device such as a processor (e.g., a video processor) of a system large scale integration (LSI) circuit, a module (e.g., a video module) using a plurality of processors or the like, a unit (e.g., a video unit) using a plurality of modules or the like, or a set (e.g., a video set) with other functions added to the unit.

For example, the present technique can also be applied in a network system constituted by a plurality of devices. The present technique may be implemented as, for example, cloud computing for processing shared among a plurality of devices via a network. For example, the present technique may be implemented in a cloud service that provides services pertaining to images (moving images) to any terminals such as a computer, an audio visual (AV) device, a mobile information processing terminal, and an Internet-of-Things (IoT) device or the like.

Note that in the present specification, "system" means a set of a plurality of constituent elements (devices, modules (components), or the like), and it does not matter whether or not all the constituent elements are provided in the same housing. Therefore, a plurality of devices contained in separate housings and connected over a network, and one device in which a plurality of modules are contained in one housing, are both "systems".

<Fields and Applications in which Present Technique is Applicable>

A system, a device, a processing unit, or the like in which the present technique is applied can be used in any field, such as, for example, transportation, medical care, crime prevention, agriculture, livestock industry, mining, beauty, factories, home appliances, weather, nature monitoring, and the like. The application of the present technique can also be implemented as desired.

For example, the present technique can be applied in systems and devices used for providing content for viewing and the like. In addition, for example, the present technique can be applied in systems and devices used for transportation, such as traffic condition monitoring and autonomous driving control. Furthermore, for example, the present technique can be applied in systems and devices used for security. In addition, for example, the present technique can be applied to systems and devices used for automatically controlling machines and the like. Furthermore, for example, the present technique can be applied in systems and devices used for the agriculture and livestock industries. In addition, the present technique can also be applied, for example, in systems and devices for monitoring natural conditions such as volcanoes, forests, oceans, wildlife, and the like. Furthermore, for example, the present technique can be applied in systems and devices used for sports.

<Other>

Note that the term "flag" as used in the present specification refers to information used to identify a plurality of states, and includes not only information used when identifying two states, i.e., true (1) or false (0), but also information capable of identifying three or more states. Accordingly, the value this "flag" can take may be, for example, a binary value of I/O, or three or more values. In other words, the number of bits constituting this "flag" can be set as desired, as one bit or multiple bits. Additionally, the identification information (including flags) is assumed to include not only the identification information in the bitstream, but also the difference information of the identification information relative to given reference information in the bitstream, and thus "flag" and "identification information" in the present specification include not only that information, but also the difference information relative to that reference information.

Additionally, various types of information (metadata and the like) pertaining to encoded data (a bitstream) may be transmitted or recorded in any form as long as the information is associated with the encoded data. Here, the term "associate" means, for example, to make one piece of data usable (linkable) for another piece of data when processing the other piece of data. In other words, data associated with each other may be grouped together as a single piece of data, or may be separate pieces of data. For example, information associated with encoded data (an image) may be transmitted over a different transmission path than the encoded data (the image). Additionally, for example, information associated with encoded data (an image) may be recorded in a different recording medium (or in a different recording area of the same recording medium) than the encoded data (the image). Note that this "association" may be for part of the data instead of the entirety of the data. For example, an image and information corresponding to the image may be associated with a plurality of frames, one frame, or any unit such as a part within the frame.

In the present specification, a term such as "combining," "multiplexing," "adding," "integrating," "including," "storing," "pushing," "entering," or "inserting" means that a plurality of things is collected as one, for example, encoded data and metadata are collected as one piece of data, and means one method of the above-described "associating".

Additionally, the embodiments of the present technique are not limited to the above-described embodiments, and various modifications can be made without departing from the essential spirit of the present technique.

For example, configurations described as one device (or one processing unit) may be divided to be configured as a plurality of devices (or processing units). Conversely, configurations described as a plurality of devices (or processing units) in the foregoing may be collectively configured as one device (or one processing unit). Configurations other than those described above may of course be added to the configuration of each device (or each processing unit). Furthermore, part of the configuration of one device (or one processing unit) may be included in the configuration of another device (or another processing unit) as long as the configuration or operation of the entire system is substantially the same.

Additionally, for example, the program described above may be executed on any device. In this case, the device may have necessary functions (function blocks and the like) and may be capable of obtaining necessary information.

Additionally, for example, each step of a single flowchart may be executed by a single device, or may be executed cooperatively by a plurality of devices. Furthermore, if a single step includes a plurality of processes, the plurality of processes may be executed by a single device or shared by a plurality of devices. In other words, the plurality of kinds of processing included in the single step may be executed as processing for a plurality of steps. Conversely, processing described as a plurality of steps may be collectively executed as a single step.

Furthermore, the program to be executed by a computer may have the following features. For example, the processing of steps described in the program may be executed in chronological order according to the order described in the present specification. Additionally, the processing of some steps described in the program may be executed in parallel. Furthermore, the processing of steps described in the program may be individually executed at the necessary timing, such as when called. That is, as long as no contradiction arises, the processing steps may be executed in an order different from the order described above. Additionally, the processing of some steps described in this program may be executed in parallel with the processing of another program. Furthermore, the processing of steps described in this program may be executed in combination with the processing of another program.

Additionally, for example, the multiple techniques related to the present technique can be implemented independently on their own, as long as no contradictions arise. Of course, any number of modes of the present technique may be used in combination. For example, part or all of the present technique described in any of the embodiments may be implemented in combination with part or all of the present technique described in the other embodiments. Furthermore, part or all of any of the above-described modes of the present technique may be implemented in combination with other techniques not described above.

Note that the present technique can also be configured as follows.

(1) An image processing device including:
   a prediction method setting unit that sets one of spatial prediction and phase prediction as a prediction method for a pixel to be processed in image data generated by a pixel array in which blocks, each including a plurality of pixels adjacent to each other, are arranged in a predetermined pattern;
   a prediction unit that derives a prediction value for the pixel to be processed by applying the prediction method set by the prediction method setting unit; and
   an encoding unit that encodes a prediction residual obtained by subtracting the prediction value derived by the prediction unit from each of pixel values in the image data,
   wherein each of the plurality of pixels in the block has a filter having identical transmission wavelength characteristics, and is configured to photoelectrically convert incident light incident through a single on-chip lens corresponding to the plurality of pixels and the filter,
   the spatial prediction is a prediction method that performs prediction by referring to a pixel value of a pixel which is in a block located in a periphery of the pixel to be processed and which is near the pixel to be processed, and
   the phase prediction is a prediction method that performs prediction by referring to a pixel value of a pixel which is in a block located in a periphery of the pixel to be processed and which has a same location in the block as the pixel to be processed.

(2) The image processing device according to (1), wherein the prediction method setting unit sets one of the spatial prediction and the phase prediction as the prediction method for the pixel to be processed based on a cost of each prediction method.

(3) The image processing device according to (2), wherein the prediction method setting unit sets the prediction method, among the spatial prediction and the phase prediction, for which the cost is lower as the prediction method for the pixel to be processed.

(4) The image processing device according to (3), wherein when the cost of the spatial prediction and the cost of the phase prediction are sufficiently low, the prediction method setting unit sets a predetermined prediction method among the spatial prediction and the phase prediction as the prediction method for the pixel to be processed.

(5) The image processing device according to (3) or (4), wherein when the cost of the spatial prediction and the cost of the phase prediction are sufficiently high, the prediction method setting unit sets a Pulse Code Modulation (PCM) mode.

(6) The image processing device according to any one of (2) to (5), wherein for each of the spatial prediction and the phase prediction, the prediction method setting unit derives the prediction value, calculates the cost based on the prediction value derived, and sets one of the spatial prediction and the phase prediction as the prediction method for the pixel to be processed based on the cost calculated for each prediction method.

(7) The image processing device according to (6), wherein the prediction method setting unit quantizes the prediction value derived, and calculates the cost based on the prediction value quantized.

(8) The image processing device according to any one of (2) to (5), wherein for each of the spatial prediction and the phase prediction, the prediction method setting unit calculates the cost based on a correlation between peripheral pixels located in a periphery of the pixel to be processed, and sets one of the spatial prediction and the phase prediction as the prediction method for the pixel to be processed based on the cost calculated for each prediction method.

(9) The image processing device according to (8), wherein the prediction method setting unit calculates the cost of the spatial prediction based on a correlation between pixels in the block, and calculates the cost of the phase prediction based on a correlation between pixels at identical locations in the block.

(10) The image processing device according to any one of (1) to (9), wherein the prediction method setting unit sets the prediction method for each of predetermined regions in a frame.

(11) The image processing device according to any one of (1) to (9), wherein the prediction method setting unit sets the prediction method for each of frames.

(12) The image processing device according to any one of (1) to (11), further including:
a reference direction setting unit that sets a reference direction,
wherein the prediction unit is configured to derive the prediction value of the pixel to be processed by referring to a pixel, among peripheral pixels located in a periphery of the pixel to be processed, that corresponds to the prediction method and the reference direction.

(13) The image processing device according to any one of (1) to (12), further including:
a bitstream generation unit that generates a bitstream including encoded data of the prediction residual generated by the encoding unit and information indicating the prediction method set by the prediction method setting unit.

(14) The image processing device according to (13), wherein the bitstream generation unit generates the bitstream further including information indicating a reference direction.

(15) An image processing method including:
setting one of spatial prediction and phase prediction as a prediction method for a pixel to be processed in image data generated by a pixel array in which blocks, each including a plurality of pixels adjacent to each other, are arranged in a predetermined pattern;
deriving a prediction value for the pixel to be processed by applying the prediction method set; and
encoding a prediction residual obtained by subtracting the prediction value from each of pixel values in the image data,
wherein each of the plurality of pixels in the block has a filter having identical transmission wavelength characteristics, and is configured to photoelectrically convert incident light incident through a single on-chip lens corresponding to the plurality of pixels and the filter,
the spatial prediction is a prediction method that performs prediction by referring to a pixel value of a pixel which is in a block located in a periphery of the pixel to be processed and which is near the pixel to be processed, and
the phase prediction is a prediction method that performs prediction by referring to a pixel value of a pixel which is in a block located in a periphery of the pixel to be processed and which has a same location in the block as the pixel to be processed.

(16) An image processing device including:
a decoding unit that, by decoding a bitstream, generates a prediction residual obtained by subtracting a prediction value from each of pixel values in image data generated by a pixel array in which blocks, each including a plurality of pixels adjacent to each other, are arranged in a predetermined pattern;
a prediction unit that derives the prediction value of a pixel to be processed in the image data by applying one of spatial prediction and phase prediction; and an image data generation unit that generates the image data by adding the prediction value derived by the prediction unit to the prediction residual generated by the decoding unit,
wherein each of the plurality of pixels in the block has a filter having identical transmission wavelength characteristics, and is configured to photoelectrically convert incident light incident through a single on-chip lens corresponding to the plurality of pixels and the filter,
the spatial prediction is a prediction method that performs prediction by referring to a pixel value of a pixel which is in a block located in a periphery of the pixel to be processed and which is near the pixel to be processed, and the phase prediction is a prediction method that performs prediction by referring to a pixel value of a pixel which is in a block located in a periphery of the pixel to be processed and which has a same location in the block as the pixel to be processed.

(17) The image processing device according to (16), wherein the prediction unit selects and applies one of the spatial prediction and the phase prediction based on information indicating the prediction method for the pixel to be processed, the information being included in the bitstream.

(18) The image processing device according to (17), wherein the prediction unit selects and applies one of the spatial prediction and the phase prediction based further on information indicating a reference direction, the information being included in the bitstream.

(19) The image processing device according to (18), wherein the prediction unit applies a Pulse Code Modulation (PCM) mode based on information indicating that the PCM mode is to be applied, the information being included in the bitstream.

(20) An image processing method including:
generating, by decoding a bitstream, a prediction residual obtained by subtracting a prediction value from each of pixel values in image data generated by a pixel array in which blocks, each including a plurality of pixels adjacent to each other, are arranged in a predetermined pattern;
deriving the prediction value of a pixel to be processed in the image data by applying one of spatial prediction and phase prediction; and
generating the image data by adding the prediction value derived to the prediction residual generated,
wherein each of the plurality of pixels in the block has a filter having identical transmission wavelength characteristics, and is configured to photoelectrically convert incident light incident through a single on-chip lens corresponding to the plurality of pixels and the filter,
the spatial prediction is a prediction method that performs prediction by referring to a pixel value of a pixel which is in a block located in a periphery of the pixel to be processed and which is near the pixel to be processed, and
the phase prediction is a prediction method that performs prediction by referring to a pixel value of a pixel which is in a block located in a periphery of the pixel to be processed and which has a same location in the block as the pixel to be processed.

REFERENCE SIGNS LIST

100 Image encoding device
111 Reference direction setting unit
112 Prediction method setting unit
113 Prediction unit
114 Computation unit
115 Quantization unit
116 Encoding unit
117 Multiplexing unit
118 Inverse quantization unit
119 Computation unit
120 Reference buffer
131 Control unit
132 Spatial prediction unit
133 Phase prediction unit
171 Channel division unit
172 Correlation direction derivation unit
173 Reference direction setting unit
211 Spatial prediction cost calculation unit
212 Phase prediction cost calculation unit
213 Selection unit
400 Image decoding device
411 Applied prediction information extraction unit
412 Prediction unit
413 Decoding unit
414 Inverse quantization unit
415 Computation unit
416 Reference buffer
431 Control unit
432 Spatial prediction unit
433 Phase prediction unit
511 PCM mode processing unit
531 PCM mode processing unit
600 Image processing system
601 Image capturing device
602 Image processing device
603 Display device
613 Encoding unit
622 Decoding unit
701 Cloud server
712 Decoding unit
800 Image processing unit
812 Encoding unit
814 Decoding unit
817 Encoding unit
819 Decoding unit
900 Computer

The invention claimed is:

1. An image processing device, comprising:
at least one processor configured to:
set, as a prediction method, one of a spatial prediction method or a phase prediction method based on a first cost associated with the spatial prediction method and a second cost associated with the phase prediction method, wherein
one of the spatial prediction method or the phase prediction method is set for a first pixel, of a plurality of pixels, to be processed in image data,
the image data is generated by a pixel array in which a plurality of blocks are arranged in a specific pattern,
the plurality of blocks includes the plurality of pixels,
each block of the plurality of blocks includes a first plurality of pixels of the plurality of pixels,
the first pixel is in a first block of the plurality of blocks,
the first pixel of the plurality of pixels is adjacent to a second pixel of the plurality of pixels;
determine a prediction value for the first pixel based on the set prediction method;
determine a prediction residual based on a subtraction of the determined prediction value from each pixel value of a plurality of pixel values of the plurality of pixels; and
encode the determined prediction residual, wherein
the plurality of pixels in the plurality of blocks includes a plurality of filters,
the plurality of filters have identical transmission wavelength characteristics,
each pixel of the plurality of pixels includes a filter of the plurality of filters, the filter is configured to photoelectrically convert incident light incident through a single on-chip lens, the single on-chip lens corresponds to the plurality of pixels and the filter, the spatial prediction method executes spatial prediction based on a pixel value of a third pixel of the plurality of pixels, the third pixel is in a second block, of the plurality of blocks, that is in a periphery of the first pixel, the third pixel near the first pixel, the phase prediction method executes phase prediction based on a pixel value of a fourth pixel of the plurality of pixels, the fourth pixel is in a third block, of the plurality of blocks, that is the periphery of the first pixel, and a location of the fourth pixel in the third block is same as a location of the first pixel in the first block.

2. The image processing device according to claim 1, wherein the at least one processor is further configured to:
determine whether the first cost is lower than the second cost;
in a case where the first cost is lower than the second cost, set the spatial prediction method as the prediction method for the first pixel; and
in a case where the second cost is lower than the first cost, set the phase prediction method as the prediction method for the first pixel.

3. The image processing device according to claim 2, wherein
the at least one processor is further configured to:
determine that each of the first cost and the second cost is lower than a threshold value; and
set, based on the determination that each of the first cost and the second cost is lower than the threshold value, a specific prediction method as the prediction method for the first pixel, wherein the set specific prediction method is one of the spatial prediction method or the phase prediction method.

4. The image processing device according to claim 2, wherein the at least one processor is further configured to:
determine that each of the first cost and the second cost is higher than a threshold value; and
set, based on the determination that each of the first cost and the second cost is higher than the threshold value, a Pulse Code Modulation (PCM) mode as the prediction method for the first pixel.

5. The image processing device according to claim 1, wherein the at least one processor is further configured to:
determine, for the spatial prediction method, a first prediction value;
calculate the first cost based on the determined first prediction value;
determine, for the phase prediction method, a second prediction value; and
calculate the second cost based on the determined second prediction value, wherein the determined prediction value is one of the determined first prediction value or the determined second prediction value.

6. The image processing device according to claim 5, wherein the at least one processor is further configured to:
in a case where the spatial prediction method is set as the prediction method,
quantize the determined first prediction value, and
calculate the first cost based on the quantized first prediction value; and in a case where the phase prediction method is set as the prediction method,
quantize the determined second prediction value, and
calculate the second cost based on the quantized second prediction value.

7. The image processing device according to claim 1, wherein the at least one processor is further configured to:
calculate the first cost based on a correlation between a first plurality of peripheral pixels in a first plurality of peripheral blocks, wherein
the plurality of blocks includes the first plurality of peripheral blocks,
the first plurality of peripheral blocks includes the second block,
the first plurality of peripheral pixels includes the third pixel, and
the plurality of pixels includes the first plurality of peripheral pixels; and
calculate the second cost based on a correlation between a second plurality of peripheral pixels in each of a second plurality of peripheral blocks, wherein
the plurality of blocks includes the second plurality of peripheral blocks,
the second plurality of peripheral blocks includes the third block;
the second plurality of peripheral pixels includes the fourth pixel, and
the plurality of pixels includes the second plurality of peripheral pixels.

8. The image processing device according to claim 7, wherein a location of each pixel of the second plurality of peripheral pixels in each block of the second plurality of peripheral blocks is identical to the location of the first pixel in the first block.

9. The image processing device according to claim 1, wherein the at least one processor is further configured to set the prediction method for each of a plurality of specific regions in a frame.

10. The image processing device according to claim 1, wherein the at least one processor is further configured to set the prediction method for each of a plurality of frames.

11. The image processing device according to claim 1, wherein
the at least one processor is further configured to: r
set a reference direction; and
determine the prediction value of the first pixel based on a fifth pixel, of the plurality of pixels, that is in the periphery of the first pixel, and
the fifth pixel corresponds to the set prediction method and the reference direction.

12. The image processing device according to claim 1, the at least one processor is further configured to generate a bitstream including encoded data of the prediction residual and information that indicates the set prediction method.

13. The image processing device according to claim 12, wherein the bitstream further includes information that indicates a reference direction.

14. An image processing method, comprising:
setting, as a prediction method, one of a spatial prediction method or a phase prediction method based on a first cost associated with the spatial prediction method and a second cost associated with the phase prediction method, wherein
one of the spatial prediction method or the phase prediction method is set for a first pixel, of a plurality of pixels, to be processed in image data, the image data is generated by a pixel array in which a plurality of blocks are arranged in a specific predetermined pattern, the plurality of blocks includes the plurality of pixels, each block of the plurality of blocks includes a first plurality of pixels of the plurality of pixels, the first pixel is in a first block of the plurality of blocks, the first pixel of the plurality of pixels is adjacent to a second pixel of the plurality of pixels;

determining a prediction value for the first pixel based on the set prediction method;

determining a prediction residual based on a subtraction of the determined prediction value from each pixel value of a plurality of pixel values of the plurality of pixels; and encoding the determined prediction residual, wherein the plurality of pixels in the plurality of blocks includes a plurality of filters, the plurality of filters have identical transmission wavelength characteristics, each pixel of the plurality of pixels includes a filter of the plurality of filters, the filter is configured to photoelectrically convert incident light incident through a single on-chip lens, the single on-chip lens corresponds to the plurality of pixels and the filter, the spatial prediction method executes spatial prediction based on a pixel value of a third pixel of the plurality of pixels, the third pixel is in a second block, of the plurality of blocks, that is in a periphery of the first pixel, the third pixel is near the first pixel, the phase prediction method executes phase prediction based on a pixel value of a fourth pixel of the plurality of pixels, the fourth pixel is in a third block, of the plurality of blocks, that is in the periphery of the first pixel, and a location of the fourth pixel in the third block is same as a location of the first pixel in the first block.

15. An image processing device, comprising:

at least one processor configured to:

decode a bitstream that comprises each of encoded data and information that indicates a specific prediction method, wherein the encoded data comprises an encoded prediction residual, and the specific prediction method is one of a spatial prediction method or a phase prediction method;

generate a prediction residual based on the decoded bitstream, wherein the encoded prediction residual is a result of subtraction of a prediction value from each pixel value of a plurality of pixel values, the plurality of pixel values is associated with a plurality of pixels in image data, the image data is generated by a pixel array in which a plurality of blocks are arranged in a specific pattern, the plurality of blocks includes the plurality of pixels, each block of the plurality of blocks includes a first plurality of pixels of the plurality of pixels, a first pixel of the plurality of pixels is adjacent to a second pixel of the plurality of pixels;

select one of the spatial prediction method and the phase prediction method based on the information that indicates the specific prediction method;

determine a first prediction value of the first pixel, of the plurality of pixels, based on one of the spatial prediction method and the phase prediction method, wherein the first pixel is to be processed in the image data, and the first pixel is in a first block of the plurality of blocks; and generate the image data based on addition of the determined first prediction value the generated prediction residual, wherein the plurality of pixels in the plurality of blocks includes a plurality of filters, the plurality of filters have identical transmission wavelength characteristics, each pixel of the plurality of pixels includes a filter of the plurality of filters, the filter is configured to photoelectrically convert incident light incident through a single on-chip lens, the single on-chip lens corresponds to the plurality of pixels and the filter, the spatial prediction method executes spatial prediction based on a pixel value of a third pixel of the plurality of pixels, the third pixel is in a second block, of the plurality of blocks, that is in a periphery of the first pixel, the third pixel is near the first pixel, the phase prediction method executes phase prediction based on a pixel value of a fourth pixel of the plurality of pixels, the fourth pixel is in a third block, of the plurality of blocks, that is in the periphery of the first pixel, and a location of the fourth pixel in the third block is same as a location of the first pixel in the first block.

16. The image processing device according to claim 15, wherein the bitstream further comprises information that indicates a reference direction, and the at least one processor is further configured to select one of the spatial prediction method or the phase prediction method based on the information that indicates the reference direction.

17. The image processing device according to claim 16, wherein the bitstream further includes information that indicates that a Pulse Code Modulation (PCM) mode is to be applied, and the at least one processor is further configured to apply the PCM mode based on the information that indicates that the PCM mode is to be applied.

18. An image processing method, comprising:

decoding a bitstream that comprises each of encoded data and information indicating a specific prediction method, wherein the encoded data comprises an encoded prediction residual, and the specific prediction method is one of a spatial prediction method or a phase prediction method;

generating a prediction residual based on the decoded bitstream, wherein the encoded prediction residual is a result of subtraction of a prediction value from each pixel value of a plurality of pixel values, the plurality of pixel values is associated with a plurality of pixels in image data, the image data is generated by a pixel array in which a plurality of blocks are arranged in a specific pattern, the plurality of blocks includes the plurality of pixels, each block of the plurality of blocks includes a first plurality of pixels of the plurality of pixels, a first pixel of the plurality of pixels is adjacent to a second pixel of the plurality of pixels;

selecting one of the spatial prediction method and the phase prediction method based on the information that indicates the specific prediction method;

determining a first prediction value of the first pixel, of the plurality of pixels, based on one of the spatial prediction method and the phase prediction method, wherein the first pixel is to be processed in the image data, and the first pixel is in a first block of the plurality of blocks; and generating the image data by adding the first prediction value to the generated prediction residual, wherein the plurality of pixels in the plurality of blocks includes a plurality of filters, the plurality of filters have identical transmission wavelength characteristics, each pixel of the plurality of pixels includes a filter of the plurality of filters, the filter is configured to photoelectrically convert incident light incident through a single on-chip lens, the single on-chip lens corresponds to the plurality of pixels and the filter, the spatial prediction method executes spatial prediction based on a pixel value of a third pixel of the plurality of pixels, the third pixel is in a second block, of the plurality of blocks, that is in a periphery of the first pixel, the third pixel is near the first pixel, the phase prediction method executes phase prediction based on a pixel value of a fourth pixel of the plurality of pixels, the fourth pixel is in a third block, of the plurality of blocks, that is in the periphery of the first pixel, and a location of the fourth pixel in the third block is same as a location of the first pixel in the first block.

* * * * *